US007375366B2

(12) United States Patent
Ohki et al.

(10) Patent No.: US 7,375,366 B2
(45) Date of Patent: May 20, 2008

(54) CARBON NANOTUBE AND METHOD FOR PRODUCING THE SAME, ELECTRON SOURCE AND METHOD FOR PRODUCING THE SAME, AND DISPLAY

(75) Inventors: Hiroshi Ohki, Tokyo (JP); Tsunaki Tsunesada, Suita (JP); Masao Urayama, Tenri (JP); Takashi Kyotani, Natori (JP); Keitarou Matsui, Sendai (JP); Akira Tomita, Sendai (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 873 days.

(21) Appl. No.: 10/204,670

(22) PCT Filed: Feb. 22, 2001

(86) PCT No.: PCT/JP01/01326

§ 371 (c)(1),
(2), (4) Date: Dec. 12, 2002

(87) PCT Pub. No.: WO01/62665

PCT Pub. Date: Aug. 30, 2001

(65) Prior Publication Data

US 2003/0143398 A1     Jul. 31, 2003

(30) Foreign Application Priority Data

Feb. 25, 2000    (JP)    ............................. 2000-048807
Jul. 3, 2000     (JP)    ............................. 2000-200425

(51) Int. Cl.
  *B82B 1/00*        (2006.01)
(52) U.S. Cl. ........................................ 257/10; 977/952
(58) Field of Classification Search ............ 423/447.1; 977/DIG. 1, 952; 257/10
See application file for complete search history.

(56) References Cited

U.S. PATENT DOCUMENTS

| 3,665,241 | A | | 5/1972 | Spindt et al. | |
| 5,698,175 | A | * | 12/1997 | Hiura et al. | ............. 423/447.1 |
| 6,250,984 | B1 | * | 6/2001 | Jin et al. | ...................... 445/51 |
| 6,346,303 | B1 | * | 2/2002 | Shih et al. | .................. 427/571 |

FOREIGN PATENT DOCUMENTS

| EP | 0 913 508 A2 | 5/1999 |
| JP | 8-151207 A | 6/1996 |
| JP | 10-12124 A | 1/1998 |
| JP | 10-012124 A | 1/1998 |
| JP | 11-194134 A | 7/1999 |
| JP | 2000-57934 A | 2/2000 |
| JP | 2000-208028 A | 7/2000 |
| WO | WO 89/07163 A1 | 8/1998 |

OTHER PUBLICATIONS

Kyotani et al., American Chemical Society, vol. 8, pp. 2109-2113, 1996.*
Kyotani et al., American Chemical Society, vol. 8, pp. 2109-2113, (1996).
Hattori et al., Carbon, vol. 37, pp. 1033-1038, (1999).
Kyotami et al., Institute for Chemical Reaction Science, No. 180, pp. 266-272, (1997).
Che et al., Chem Matter, vol. 10, pp. 260-267, (1998).
Kastner et al., Int. Winter. Sch. Eletron. Pro. Novel. Mater, pp. 126-129, (1994).
Rinzlet et al., Science, vol. 269, pp. 1550-1553, (1995).
Iijima, S., "Helical Microtubules of Graphite Carbon," Nature, Nov. 7, 1991, pp. 56-58, vol. 354.
Endo, M. et al., "The Growth Mechanism and Properties of Vapor-Grown Carbon Fiber," Solid State Physics, 1977, pp. 1-12, vol. 12, No. 1 (with English translation of relevant portion).
Saito, Y., "Field Emission from Carbon Nanotubes; Purified Single-Walled and Multi-Walled Tubes," Ultramicroscopy 73, 1998, pp. 1-6, Elsevier Science B.V.
De Heer, Walt A. et al., "A Carbon Nanotube Field-Emission Electron Source," Science, Nov. 17, 1995, pp. 1179-1180.
Masuda, H., et al., "Highly Ordered Nanochannel-Array Architecture in Anodic Alumina," Appl. Phys. Lett., Nov. 10, 1997, vol. 71, No. 19.
Fowler, R.H., et al., "Electron Emission in Intense Electric Fields," Proc. R. Soc. London, Mar. 31, 1928, pp. 173-181, Ser. A119.
Spindt, C.A., "Field-Emitter Arrays for Vacuum Microelectronics," IEEE Transactions on Electron Devices, Oct. 1991, pp. 2355-2363, vol. 38, No. 10.
Davydov, D.N. et al., "Field Emitter Based on Porous Aluminum Oxide Template," Journal of Applied Physics, Oct. 1, 1999, pp. 3983-3987, vol. 86, No. 7, American Institute of Physics.
Davydov, D.N. et al., "Field Emitters Based on Porous Aluminum Oxide Templates," Journal of Applied Physics, Oct. 1999, pp. 3983-3987, vol. 86, No. 7, American Institute of Physics.
Wang et al., "Field Emission From Nanotube Bundle Emitters at Low Fields," Appl. Phys. Lett., vol. 70 No. 24, Jun. 16, 1997, pp. 3308-3310.

* cited by examiner

*Primary Examiner*—Stuart Hendrickson
(74) *Attorney, Agent, or Firm*—Birch, Stewart, Kolasch & Birch, LLP

(57) ABSTRACT

A carbon nanotube has a carbon network film of polycrystalline structure divided into crystal regions along the axis of the tube, and the length along the tube axis of each crystal region preferably ranges from 3 to 6 nm. An electron source includes a carbon nanotube having a cylindrical shape and the end of which on the substrate side is closed and disposed in a fine hole. The end on the substrate side of the tube is firmly adhered to the substrate. The carbon nanotube is produced by a method in which carbon is deposited under the condition that no metal catalyst is present in the fine hole and produced by a method in which after the carbon deposition the end of the carbon deposition film is modified by etching the carbon deposition film using a plasma. Therefore, an electron source excellent in the evenness of field emission characteristics in a field emission region (pixel) in the device plane and driven with low voltage can be provided, and a display operated with ultralow power consumption exhibiting ultrahigh luminance can be provided.

10 Claims, 33 Drawing Sheets

20nm

|←──────→|
500nm

|←——— 500nm ———→|

|←——— 500nm ———→|

|←——500nm——→|

|←——— 500nm ———→|

|←——————→|
500nm

|←———————→|
500nm

CARBON NANOTUBE AND METHOD FOR PRODUCING THE SAME, ELECTRON SOURCE AND METHOD FOR PRODUCING THE SAME, AND DISPLAY

This application is the national phase under 35 U.S.C. § 371 of PCT International Application No. PCT/JP01/01326 which has an International filing date of Feb. 22, 2001, which designated the United States of America.

FIELD OF THE INVENTION

The present invention relates to a carbon nanotube and a method for producing same. The invention also relates to an electron source, for use and suitable in field emission displays, using the carbon nanotube in its field emission part and a method for producing same, and a display using such an electron source.

BACKGROUND OF THE INVENTION

Currently, an electron source that undergoes field emission in response to a strong electric field rather than thermionic emission in response to large heat energy as in a cathode ray tube has been under active research from the perspectives of both device and material. An example of such a conventional electron source can be found in C. A. Spindt (U.S. Pat. No. 3,665,241), which discloses a pyramid-shaped metal electron source. As a material of the metal electron source, a refractory metal such as molybdenum is used, for example. The metal electron source is formed in a hole of about 1 µm. According to the experiment on field emission characteristics conducted by C. A. Spindt (C. A. Spindt, IEEE TRANSACTIONS ON ELECTRON DEVICES, 38, 2355 (1991)), the molybdenum metal electron source that was formed in a gate opening of about a 1 µm diameter is capable of producing emission currents of about 90 µA/tip at a gate voltage of 212 V, which is not low for an operating voltage. Further, the metal electron source using such a refractory metal (known as a Spindt type metal electron source) has a high degree of operating vacuum of $1.33 \times 10^{-7}$ Pa ($10^{-9}$ Torr). In addition, the metal electron source has weak resistance against ion bombardment and therefore reliability is poor. These drawbacks have been a serious obstacle, preventing the electron source from being put to actual applications.

Recently discovered by Iijima et al. is a carbon nanotube as a by-product of a fullerene synthesis by carbon arc discharge (S. Iijima, Nature, 354, 56 (1991)). The carbon nanotube, when observed under a transmission electron microscope (TEM), has an encased structure of graphite layers that are coiled cylindrically (Y. Saito, Ultramicroscopy, 73, 1(1998)). Such a carbon nanotube is called a multi-walled carbon nanotube.

As a producing method of another type of carbon nanotube, there is a technique in which an organic material is applied on a freestanding anodic aluminum oxide film, and then the anodic aluminum oxide film (anodic aluminum oxide layer) is dissolved and removed to separate the carbon nanotubes, as disclosed in Japanese Publication for Unexamined Patent Application No. 151207/1996 (Tokukaihei 8-151207). The carbon nanotubes produced by this method have open ends with a diameter of 1 µm or less and a length of about 1 µm to 100 µm.

There has been active research on electron source using such a carbon nanotube. W. A. de Heer et al. has reported that field emission occurs at an electric field intensity of about 10 V/µm with a degree of vacuum of $1.33 \times 10^{-4}$ Pa ($10^{-6}$ Torr) and an emission current (voltage: 25 V/µm) with a current density of 10 mA/cm$^2$ is generated (W. A. de Heer et al., Science, 270, 1179 (1995)). Such a carbon nanotube electron source is realized by providing carbon nanotubes on a casting film. The carbon nanotube electron source of this teaching undergoes emission at a degree of vacuum that is smaller by triple digits or so than the degree of vacuum required for the metal electron source, and has an emission start voltage and an operating voltage that are smaller by at least one digit than those of the metal electron source. These are superior characteristics as the electron source material. Where a carbon nanotube electron source that undergoes emission of a large current at a low voltage is desired, orientation control of carbon nanotubes becomes an important technique.

Orientation control of carbon nanotubes is an important technique to obtain a carbon nanotube electron source that undergoes emission of a large current at a low driving voltage. Japanese Publication for Unexamined Patent Application No. 12124/1998 (Tokukaihei 10-12124) (Japanese Patent No. 3008852) discloses an electron source wherein carbon nanotubes are provided in the pores of the anodic aluminum oxide film and a gate electrode is provided at the opening of the pores. This carbon nanotube electron source has carbon nanotubes that grow from a metal catalyst, a growth point, that is embedded in the pores of the anodic aluminum oxide film. This carbon nanotube electron source is superior in terms of orientation control (order of orientation) of the carbon nanotubes, and therefore has a promising future. Further, this carbon nanotube electron source has improved stability over time of emission current density. The carbon nanotube electron source also has a greatly improved electron source density that is several thousand times greater than that of the conventional Spindt type metal electron source.

As with the foregoing Tokukaihei 10-12124, D. N. Davydov et al. (D. N. Davydov et al., J. Appl. Phys., 86, 3983 (1999)) discloses producing carbon nanotubes whereby growth of carbon nanotubes originates from a metal catalyst that is provided on the bottom of the pores of the anodic aluminum oxide film and thereafter a portion of the anodic aluminum oxide film is removed to obtain carbon nanotubes with exposed tips.

As schematically shown in FIG. 38 and FIG. 39, the carbon nanotubes that are produced by such a method grow upward from the bottom of the pores of an anodic aluminum oxide film 35 which is provided on an aluminum substrate 30. The carbon nanotubes grow into two different shapes depending on the growth time (extent of growth). That is, when growth of the carbon nanotubes is stopped before it reaches a sufficient level, carbon nanatubes 38 (oriented carbon nanotubes) that are formed in parallel in the pores of the anodic aluminum oxide film 35 are obtained, as schematically shown in FIG. 38. On the other hand, by allowing sufficient growth, carbon nanatubes 36 (random carbon nanotubes) that are interwound randomly on the anodic aluminum oxide film 35 are obtained, as schematically shown in FIG. 39. According to the study done by D. N. Davydov et al., the emission start electric field intensities of these two types of carbon nanotubes were different; 30 V/µm to 45 V/µm for the oriented carbon nanotubes and 3 V/µm to 4 V/µm for the random carbon nanotubes (D. N. Davydov et al., J. Appl. Phys., 86, 3983 (1999)).

However, the conventional electron source using the carbon nanotubes, while it requires a lower operating voltage (device driving voltage: applied voltage at which a practical emission current density (about 10 mA/cm$^2$) is obtained) than the conventional Spindt type metal electron source, still requires a driving voltage of several hundred volts, which is still high. This is because the emission start electric field intensity or operating electric field intensity of the conventional carbon nanotubes (electric field intensity required to obtain a practical emission current density (about 10 mA/cm$^2$)) is not low enough (e.g., carbon nanotubes formed by a conventional arc discharge method have an emission start electric field intensity of 10 V/μm and an operating electric field intensity of 25 V/μm). Insufficiently low driving voltages have put restrictions on drivers or device structures. Thus, there is a need to further reduce emission start electric field intensity and operating electric field intensity.

The present invention was made in view of the foregoing problem and an object of the present invention is to provide carbon nanotubes that require less emission start electric field intensity and less operating electric field intensity, and to provide an electron source, using such carbon nanotubes, that can be driven at a lower voltage. A further object of the present invention is to provide a lower power consuming display that uses the carbon nanotubes in the electron source.

In the producing method of a carbon nanotube electron source using a metal catalyst as disclosed in D. N. Davydov et al., varying manufacture conditions bring about non-uniformity in the shape of carbon nanotubes. That is, the carbon nanotube electron source produced by this method has poor emission uniformity. Such poor emission uniformity becomes particularly prominent when a large device (e.g., a large screen display) is manufactured from the carbon nanotubes produced by this method.

The reason varying manufacture conditions bring about poor emission uniformity is explained below in detail. In the conventional producing method of the electron source, carbon nanotubes grow from the metal catalyst. Therefore, depending of the extent of growth, two different shapes of carbon nanotubes; the oriented carbon nanatubes 38 as shown in FIG. 38 and the random carbon nanatubes 36 as shown in FIG. 39 are produced. Thus, when carbon nanotubes that are formed by the foregoing conventional method are used in an electron source device, for example, such as a display as exemplified by a FED (field emission display), there are cases where varying manufacture conditions cause the oriented carbon nanotubes and the random carbon nanotubes to coexist. The emission start electric field intensities of these two different types of carbon nanotubes, 30 V/μm to 45 V/μm for the former and 3 V/μm to 4 V/μm for the latter, are greatly different. The coexistence of the oriented carbon nanotubes and the random carbon nanotubes in the electron source device has a detrimental effect on uniformity of emission characteristics and causes various problems such as display flicker. The cause of this coexistence of the oriented carbon nanotubes and the random carbon nanotubes resides in a growth mechanism of the carbon nanotubes. Specifically, it is known to be caused by the growth of carbon nanotubes that originate from a transition metal catalyst such as nickel, iron, and cobalt.

The producing method of an electron source disclosed in Tokukaihei 10-12124 also forms carbon nanotubes using a metal catalyst, and therefore has the same problem as the producing method of D. N. Davydov.

Another object of the present invention is to provide a producing method of an electron source having superior uniformity in emission characteristics within a device plane or an emission area (pixels).

DISCLOSURE OF THE INVENTION

In order to achieve the foregoing main objects, a carbon nanotube according to the present invention includes at least one layer of a cylindrical carbon network film, wherein the carbon network film has a polycrystalline structure which is divided into a plurality of crystal areas in a tube axis (central axis of the tube) direction (first feature).

A carbon network film of conventional carbon nanotubes includes only sp$^2$ bonds (sp$^2$-hybridized carbon-carbon bonds), and is structured as continuous crystals of a single sheet. Such a carbon network film is also known as a graphene sheet, which has a two-dimensional network structure of a monoatomic layer structured from the six membered ring of the carbon.

In contrast, the carbon network film of the carbon nanotube according to the present invention includes dangling bonds (bonds not forming covalent bonds, i.e., unpaired electrons) or sp$^3$ bonds (sp$^3$-hybridized carbon-carbon bonds) in high density, and therefore the carbon network film (made up of sp$^2$ bonds) has a discontinuous structure which is divided into a plurality of crystal areas in the tube axis direction by the dangling bonds or sp$^3$ bonds. In other words, the carbon network film of the carbon nanotube according to the present invention has a polycrystalline structure in which a plurality of separate graphene sheets (monocrystals) are disposed on one cylindrical plane. Note that, it is believed that adjacent graphene sheets, between which no covalent bonds exist, are held by interactions by the van der Waals' force, that is strong enough to maintain the tube structure.

Preferably, each crystal area is on the order of nm (particularly, several nm to several tens of nm), and more preferably in a range of 3 nm to 6 nm in the tube axis direction. It is particularly preferable that a length of each crystal area in the tube axis (central axis of the carbon nanotube) direction is not more than the tube diameter (outer diameter of the carbon nanotube; on the order of nm). By the length of each crystal area in the tube axis direction much shorter than the crystal length (equal to the tube length; on the order of nm) in the tube axis direction of each crystal area of conventional carbon nanotubes, it is ensured that carbon nanotubes with a reduced emission start electric field intensity and a reduced operating electric field intensity can be provided.

Note that, the carbon nanotube may be a multi-walled carbon nanotube that is made up of multi-walled (two to several tens of walls) carbon network films, or a single-walled carbon nanotube made up of a single-walled carbon network film. Further, the carbon nanotube may be a cylinder with closed ends, or a cylinder with a closed one end and an opened other end, or a cylinder with open ends.

An electron source according to the present invention includes a carbon nanotube with the foregoing first feature as a field emission part, thereby providing a lower voltage drive electron source using the carbon nanotube.

Note that, as the terms are used herein, "field emission part" refers to the substance (field emission source) itself that emits electrons, and "electron source" refers to an element (field emission element) produced by supporting the carbon nanotube on a support member.

A display according to the present invention includes a plurality of carbon nanotubes with the foregoing first feature as a field emission part, and electric field applying means for applying an electric field to each carbon nanotube so as to cause each carbon nanotube to emit electrons. This enables the electron source to be driven at a lower voltage, thereby providing a lower power consuming display.

It is preferable that the electric field applying means can individually control the electric field intensity of each carbon nanotube. This enables display to be carried out using each carbon nanotube as a single pixel.

The following explains crystallinity of the carbon network film of the carbon nanotube according to the present invention and size of the crystal areas in detail. First, the carbon network film of the carbon nanotube according to the present invention will be defined and its crystallinity characterized.

It has been confirmed by the Raman spectrometry that the Raman spectrum of the carbon nanotube according to the present invention has a peak in a G band (Graphite band; 1580 $cm^{-1}$) that derives from graphite. The result of Raman spectrum analysis has characterized the carbon nanotube according to the present invention to have a relatively large peak in a D band (Disorder band; 1360 $cm^{-1}$) that derives from a disordered crystal structure of the carbon network film (graphite structure).

The inventors of the present invention have proven by an experiment that in a suitable embodiment of the carbon nanotube according to the present invention that a ratio ($I_{1360}/I_{1580}$) of the peak intensity ($I_{1360}$) of the D band to the peak intensity ($I_{1580}$) of the G band is in a range of from 0.5 to 1. This ratio is about 5 times to 10 times greater than that of a conventional carbon nanotube that is formed by arc discharge, for example.

Further, although comparisons are not quantitative, the Raman spectrum of the carbon nanotube according to the present invention has a distinct spectrum in which the peak is broader than that of conventional carbon nanotubes and the G band near 1580 $cm^{-1}$ has shifted to the high frequency side (1600 $cm^{-1}$).

Such a Raman spectrum of the carbon nanotube according to the present invention indicates that the carbon nanotube according to the present invention has low crystallinity and a polycrystalline carbon network film, i.e., a carbon network film of a structure that is divided into large numbers of micro crystal areas.

Next, in order to explain polycrystallinity of the carbon network film of the carbon nanotube according to the present invention, the size of the crystal areas of the carbon network film is defined. A width of a diffraction line obtained by X-ray diffraction (XRD; X-ray Diffractiometry) spectrometry is used to determine a crystallite size. This crystallite size is used to characterize polycrystallinity of the carbon network film of the carbon nanotube according to the present invention.

In a preferred embodiment of the carbon nanotube according to the present invention, the crystallite size (La) in the tube axis direction (direction of film plane) of the carbon network film is in a range of from 3 nm to 6 nm, which is notably smaller than the crystallite size (on the order of $\mu$m) in the tube axis direction of the carbon network film of conventional carbon nanotubes. Further, in a preferred embodiment of the carbon nanotube according to the present invention, the crystallite size (La) in the tube axis direction (direction of film plane) of the carbon network film is in a range of from 3 nm to 6 nm, which is notably smaller than the crystallite size (several mm to several cm) of the bulk graphite.

Further, Japanese Patent No. 2982819 (WO89/07163) discloses a carbon fibril that is in the form of a fine thread tube with a plurality of graphite layers (equivalent to the carbon network film of the present invention) essentially parallel to the fibril axis, i.e., a plurality of graphite layers that are essentially concentric to the fibril axis (circular cylinder axis) as shown in FIG. 2 of this publication, and the length of the graphite layers along the fibril axis (equivalent to the crystallite size La in the tube axis direction in the present invention) is two times or greater than the fibril diameter (3.5 nm to 75 nm). Thus, the crystallite size in the fibril axis direction of the carbon fibril is larger by about one digit than that of the carbon nanotube of the present invention.

Further, in a preferred embodiment of the carbon nanotube according to the present invention, the crystallite size Lc in the thickness direction (direction perpendicular to the carbon network film) of the carbon network film as determined from a width of the diffraction line obtained by the X-ray diffraction spectrometry is in a range of from 1 nm to 3 nm, which is notably smaller than that of the bulk graphite (having a crystallite side of about several mm to several cm).

The crystallite size La and Lc characterizes the carbon nanotube according to the present invention that crystallinity is low and the carbon nanotube has a polycrystalline carbon network film, i.e., a carbon network film that is divided into micro crystal areas on the order of nm. Thus, it can be said that the carbon nanotube according to the present invention is a carbon nanotube with a carbon network film of a polycrystalline graphite structure that is divided at a nano level, i.e., a polycrystalline carbon nanotube.

Further, the low crystallinity of the carbon nanotube according to the present invention can easily be explained in relation to plane intervals (002 diffraction line; d(002)) of the carbon network film obtained from the X-ray diffraction spectrum.

The bulk graphite has a laminated structure of network planes of condensed benzene rings (graphene sheets), wherein plane A and plane B are alternately laminated at slightly shifted positions. The distance between plane A and plane B of the carbon nanotube according to the present invention, i.e., the plane interval (d(002)) of the carbon network film is in a range of from 0.34 nm to 0.4 nm, which is larger than that of the bulk graphite (d(002)=0.3354 nm). It is thus envisaged that the carbon nanotube of the present invention has low crystallinity, i.e., a low crystalline graphite structure.

This result of analysis supporting the low crystallinity does not contradict to the polycrystalline structure of the carbon network film of the carbon nanotube of the present invention. The polycrystalline structure of the carbon network film of the carbon nanotube of the present invention can be quantitively explained from the Raman band intensity ratio of D band to G band ($I_{1360}/I_{1600}$) of the Raman spectrometry and from the crystallite size Lc and La. These property values of the carbon nanotube of the present invention, compared with the property values of conventional carbon nanotubes, are sufficient to explain the low crystallinity.

The carbon nanotube of the present invention having the foregoing structure cannot be obtained by a method of forming carbon nanotubes at high temperatures (e.g., several thousand degrees Celsius used to form carbon nanotubes by conventional arc discharge), or a method in which carbon nanotubes are formed inside the pores of a porous material using a metal catalyst. The carbon nanotube according to the present invention having the foregoing structure was made available for the first time by a producing method of a carbon nanotube according to the present invention, in which the carbon nanotube is formed inside the pores of a porous material in the absence of a metal catalyst, at a temperature of preferably not less than 600° C., or more preferably in a temperature range of 600° C. to 900° C. In the producing method of the carbon nanotube according to the present invention, the crystal areas only grow to the diameter of the carbon nanotube.

A producing method of a carbon nanotube according to the present invention includes the step of: depositing carbon inside large numbers of pores of a porous material so as to form a carbon deposition film of a cylindrical shape, wherein the carbon is deposited (carbon nanotube is formed) in the absence of a metal catalyst in the pores.

Unlike conventional producing methods, the foregoing method does not use a metal catalyst, and therefore can obtain a carbon nanotube with the polycrystalline (low crystallinity) carbon network film, that grows inside the pores by a distinct growth mechanism. Further, because carbon is deposited in the absence of a metal catalyst, the method requires less cost. Further, a step of providing a catalyst is not required, simplifying the producing steps of the carbon nanotube.

Conventionally preferred methods of producing a carbon nanotube include a method, such as arc discharge, which involves high temperatures anywhere from one thousand several hundred degrees Celsius to two-thousand degrees Celsius, and a laser evaporation method or a vapor-phase carbon deposition method using a transition metal such as nickel, cobalt, or iron as a catalyst. The carbon nanotubes produced by these methods had a problem of controlling the shape (diameter, length) of the tubes. The method of the present invention by which the carbon nanotube is produced using a porous material with pores in the absence of a metal catalyst is the solution to this problem. The producing method of the carbon nanotube according to the present invention is highly effective because it uses a porous material with pores and thus eliminates a metal catalyst and enables the shape of the tube to be controlled.

It is preferable that the producing method of the carbon nanotube further includes an anodic oxidation step for obtaining the porous material; and a heating step of not less than 600° C. after the anodic oxidation step. Further, it is preferable in the producing method of the carbon nanotube that the carbon is deposited by vapor-phase carbon deposition in which gaseous hydrocarbon is carbonized by pyrolysis. In this way, the carbon nanotube with the carbon network film of a polycrystalline structure can be obtained more reliably. Further, by the heating step of not less than 600° C. after the anodic oxidation step, the anodic aluminum oxide film can undergo a phase transition to γ-alumina (particles that are scattered between carbon nanotubes, to be described later). In the case where carbon is deposited by vapor-phase carbon deposition in which gaseous hydrocarbon is carbonized by pyrolysis, a temperature of vapor-phase carbon deposition, which varies depending on the type of hydrocarbon (type of reaction gas), is preferably in a range of from 600° C. to 900° C., when the gaseous hydrocarbon is a propylene gas.

Note that, D. N. Davydov et al. carbonizes acetylene at 700° C. using a metal catalyst. This differs from the method of the present invention including the anodic oxidation step for obtaining a porous material, followed by carbonization of gaseous hydrocarbon (preferably propylene) at a temperature of not less than 600° C. (preferably 600° C. to 900° C.) in the absence of a metal catalyst, using the porous material with pores as a template.

Further, it is preferable in the producing method of the carbon nanotube that the carbon network film is plasma etched so as to modify the tip of the carbon network film (carbon nanotube). By thus modifying the end face of the carbon nanotube making up the field emission area, field emission efficiency can be increased and a carbon nanotube with a reduced emission start electric field intensity and with a reduced operating electric field intensity can be obtained.

It is preferable that oxygen plasma is used for the etching. This enables the tip of the carbon network film (carbon nanotube) to be opened as well as oxidized, thus providing a carbon nanotube with a further reduced emission start electric field intensity and with a further reduced operating electric field intensity.

A producing method of an electron source of the present invention is based on a method in which a porous material (obtained in a step of forming a porous layer on a predetermined area of the metal wires in a preferred embodiment) is used as a support member for supporting the carbon nanotube and carbon is deposited inside the pores of the porous material (preferably by a vapor-phase carbon deposition method) to form the carbon nanotube.

The electron source with the carbon nanotube provided in the pores of the porous material can also be produced by a method in which isolated carbon nanotubes are inserted in the pores of the porous material. For example, a freestanding porous layer is prepared beforehand and carbon nanotubes are formed in the porous layer by the vapor-phase carbon deposition method. Thereafter, the porous layer is completely removed to isolate the carbon nanotubes, which are then placed in the pores of another porous layer by a method such as electrophoresis. However, the producing method using such isolated carbon nanotubes have a problem of accumulation or sticking, etc., and is not necessarily a more desirable method than the foregoing producing method.

In contrast, in the producing method of the electron source of the present invention, a porous material is used as a support member for supporting the carbon nanotube and carbon is deposited inside the pores of the porous material (preferably by the vapor-phase carbon deposition), so as to form the carbon nanotube.

That is, the producing method of an electron source of the present invention is a method of producing a carbon nanotube which includes a carbon nanotube as a field emission part, and a support member for supporting the carbon nanotube, and the method includes the steps of forming the support member from a porous material with large numbers of pores, and depositing carbon inside the pores in the absence of a metal catalyst in the pores, so as to form the carbon deposition film of a cylindrical shape.

With this method, the carbon nanotube can have a uniform shape in the emission area and in the device plane. Specifically, an electron source with carbon nanotubes having a uniform diameter and a uniform length can be provided.

Carbon nanotubes of a conventional electron source have the shapes as illustrated in FIG. 38 and FIG. 39, depending on the growth time. The shapes shown in FIG. 38 and FIG. 39 are of those carbon nanotubes that grew from a metal catalyst, specifically, such as nickel, iron, and cobalt, as an origin of growth. (D. N. Davydov et al., J. Appl. Phys., 86, 3983 (1999)). The following explains the growth mechanism of such carbon nanotubes. At the early stage of growth, the carbon nanotubes grow from a metal catalyst as an origin of growth. In the example of FIG. 38, the carbon nanotubes grow in a straight line in the pores. When the carbon nanotubes continue to grow past the pores, the carbon nanotubes above the pores are curled as they grow, as shown in FIG. 39. As explained, the carbon nanotubes that grow in a vapor phase from a metal catalyst as an origin of growth are in a straight shape in the early stage of growth as shown in FIG. 38. The carbon nanotubes, when grow past the pores, become curled as shown in FIG. 39. The carbon nanotubes of the straight line shape as shown in FIG. 38 have an emission start electric field intensity of several tens of V/μm, whereas the carbon nanotubes of the curled shape as shown in FIG. 39 have an emission start electric field intensity of several V/μm. This may cause large non-uniformity of emission start electric field intensity in the emission area or device plane. Thus, in order to control the shape of the carbon nanotubes in the emission area or device plane, the process of forming the carbon nanotubes needs to be strictly managed.

Contrary to the conventional method of forming the carbon nanotubes as explained above, the producing method of an electron source of the present invention does not cause the growth-time-induced shape non-uniformity. That is, the producing method of the present invention does not use a metal catalyst and the carbon nanotubes do not grow like the random carbon nanotubes to extend past the pores, even when the growth time is long. Thus, the carbon nanotubes are always formed by the transfer of the pore shape of the porous material and retain the diameter and length of the pores of the anodic aluminum oxide film. Thus, with the producing method of an electron source of the present invention, the carbon nanotubes grow by an entirely different growth mechanism from that of the conventional carbon nanotubes that grow from a metal catalyst as an origin of growth, and there will be no non-uniformity in shape of the carbon nanotubes caused by non-uniform producing processes. As a result, it is possible to obtain an electron source with superior uniformity of emission characteristics in the device plane or emission area (pixels).

Further, in the foregoing producing method, by the distinct carbon nanotube growth mechanism that does not use a metal catalyst, the carbon nanotubes adhere to the inner wall and entire bottom of the pores. Thus, when the porous material is a porous layer, provided on a substrate, with large numbers of through-pores, the carbon nanotubes are formed in a cylindrical shape inside the pores with an closed end on the side of the substrate, and the carbon nanotubes adhere to the surface of the substrate on the entire side face on the side of the substrate (carbon network film of the outermost layer). Thus, an electron source with the carbon nanotubes firmly adhering to the support member can be provided. Further, in the case where the substrate or a conductive layer on the surface of the substrate is used as an electrode for applying an emission electric field, an electron source in which no electrical connection failure occurs between the carbon nanotubes and the electrode can be provided. Thus, the electron source, not only when it is simply used as an electron source device but also when it is installed in other electrical devices or optical devices, can provide devices with highly reliable electrical connections.

In the producing methods of an electron source as disclosed in Tokukaihei 10-12124 and D. N. Davydov, an electrical connection failure may occur between the carbon nanotubes and the base electrode when the metal catalyst at the bottom of the pores of the porous layer is not provided properly. That is, in these methods, a metal catalyst is embedded in the pores of the anodic aluminum oxide film that is formed on the base electrode, and the carbon nanotubes grow upward from the metal catalyst that is provided in the pores of the anodic aluminum oxide film. Thus, when the metal catalyst is not embedded to the bottom of the pores of the anodic aluminum oxide film but stops midway inside the pores (not the bottom of the pores), the carbon nanotubes grow upward from a midway position inside the pores. As a result, no electrical connection can be made between the carbon nanotubes and the base electrode (cathode electrode), which not only degrades reliability of the electron source but lowers production yield.

Further, the foregoing producing method does not use a metal catalyst and thus the carbon that was generated by a method such as vapor-phase carbon deposition (pyrolysis) of a hydrocarbon deposits on the inner wall of the pores of the porous material such as the anodic aluminum oxide film. As a result, an electron source with the carbon nanotubes firmly supported on the support member (porous material) can be provided.

On the other hand, in the carbon nanotubes using a metal catalyst, as disclosed in Tokukaihei 10-12124 and Tokukaihei 11-194134, the carbon nanotubes grow without touching the inner wall of the anodic aluminum oxide film, i.e., regardless of the pore shape of the anodic aluminum oxide film (template). Thus, the carbon nanotubes cannot be firmly adhered to the anodic aluminum oxide film.

Further, in the method in which the carbon nanotubes grow from particles of a metal catalyst as an origin of growth inside the pores of the porous layer, in the event where a plurality of grains exist in a single pore, a plurality of carbon nanotubes are formed in a single pore, corresponding to the plurality of metal catalyst particles (grains). In contrast, in the producing method of the carbon nanotube of the present invention, the carbon nanotubes do not grow from the metal catalyst particles as an origin of growth but grow along the inner wall of the pores. Thus, a single carbon nanotube is formed per pore of the porous layer, transferring the shape of the inner wall of the pores.

Further, it is preferable that the step of forming carbon nanotubes with respect to the pores of the porous material in the producing method of an electron source of the present invention includes the step of removing the carbon deposition film that was formed on the surface of the porous material, in addition to the step of depositing carbon on the porous material (preferably vapor-phase carbon deposition step).

The carbon deposition film deposited on the inner wall of the porous material (low crystallinity or polycrystalline carbon network film) is similar in film property to the carbon deposition film deposited on the surface of the porous material, and by selectively removing the carbon deposition film on the surface of the porous material, the carbon deposition film deposited on the inner wall of the porous material is maintained. This step determines the basic shape of the carbon nanotube of the present invention, and only the carbon network film of the carbon nanotube and the cross section in the vertical direction is exposed in air.

Such a mode is preferable in the producing method of an electron source of the present invention. That is, the mode is preferable in terms of surface modification of the emission area, making it possible to selectively carry out surface modification only on the carbon network film of the carbon nanotube and the cross section in the vertical direction. Specifically, the inventors of the present invention have proven by experiment that the step of removing the carbon deposition film deposited on the surface of the porous material is preferably carried out by etching (dry etching) using plasma, such as reactive ion etching (RIE; Reactive Ion Etching), because it was most effective to improve the field emission characteristics.

That is, it is preferable in the producing method of the present invention that the tip of the carbon deposition film (carbon nanotube) be modified by carrying out plasma etching. By thus modifying the end face of the carbon nanotube which becomes the field emission area, emission efficiency can be improved. As a result, an electron source with reduced levels of emission start electric field intensity and operating electric field intensity can be obtained.

Further, the step of forming the carbon nanotube with respect to the pores of the porous material in the producing method of the electron source of the present invention may further include the step of partially removing the porous material, in addition to the step of depositing carbon on the porous material and the step of removing the carbon deposition film.

Further, a producing method of a carbon nanotube of the present invention is adapted to deposit carbon inside the pores of the porous material having large numbers of pores so as to form the carbon deposition film of a cylindrical shape, wherein the tip of the carbon deposition film is modified by etching the carbon deposition film using plasma.

In this way, the end face of the carbon nanotube which makes up the field emission part can be modified, thus providing the carbon nanotube with improved field emission characteristics. The inventors of the present invention have confirmed that the composition ratio (O/C) of oxygen to carbon can be increased to 0.15 or greater by carrying out plasma etching with respect to a carbon nanotube whose composition ratio (O/C) of oxygen to carbon is less than 0.15.

The composition ratio (O/C) of oxygen to carbon in the field emission area of the carbon nanotube obtained by the foregoing producing method, which is experimentally decided by the X-ray photoelectron spectrometry (XPS), is generally in a range of from 0.1 to 0.3. A preferable range of the composition ratio (O/C) of oxygen to carbon is from 0.15 to 0.2. A carbon nanotube with a composition ratio (O/C) of oxygen to carbon 0.15 to 0.2 can emit electrons at a low voltage.

The carbon nanotube that can emit electrons at a low voltage has a peak (bond energy near 284.6 eV) that derives from $sp^2$-hybridized carbon atoms (C1s). The peak becomes broad when the carbon nanotubes is subjected to plasma etching. Further, by plasma etching, the peak (bond energy near 286 eV) that derives from the C—O bonds of the carbon nanotube becomes notably high. It is envisaged that such a characteristic is distinct to the carbon nanotube that can emit electrons at a low voltage.

It is preferable in the foregoing producing method that the etching is carried out using oxygen plasma. This enables the tip of the carbon deposition film (carbon nanotube) to be opened as well as oxidized. Thus, the end face of the carbon nanotube (cross section that results from cutting the carbon network film in a direction perpendicular to the film plane) that was made by opening the tip constitutes the field emission area, and the end face making up the field emission area includes oxygen rich carbon. As a result, the carbon nanotube with further improved field emission characteristics can be obtained.

In a producing method of an electron source of the present invention, the resulting carbon nanotubes are used as the field emission part and the porous material is used as the support member for supporting the carbon nanotubes. That is, the producing method of the electron source of the present invention is a method for producing an electron source which includes a carbon nanotube as the field emission part, and a support member for supporting the carbon nanotube, and method includes the steps of: forming the support member using a porous material with large numbers of pores; and forming a carbon deposition film of a cylindrical shape by depositing carbon in the pores of the porous material, and plasma etching the carbon deposition film so as to modify a tip of the carbon deposition film.

By thus modifying the end face of the carbon nanotube which becomes the field emission area, emission efficiency can be improved. As a result, an electron source with reduced levels of emission start electric field intensity and operating electric field intensity can be obtained.

An electron source of the present invention includes a plurality of carbon nanotubes that are disposed parallel to one another as a field emission part, and the electron source further includes: particles (preferably γ-alumina grains), dispersed between the carbon nanotubes, that bind side surfaces of the carbon nanotubes adjacent to one another (third feature).

Tokukaihei 10-12124 and D. N. Davydov et al. disclose electron sources of a structure in which the carbon nanotube is entirely encased in the pores of the anodic aluminum oxide film (Example 1 of Tokukaihei 10-12124), and of a structure in which the tips of the carbon nanotubes extend out of the pores of the anodic aluminum oxide film (extends out of the film plane) (Example 2 of Tokukaihei 10-12124 and D. N. Davydov et al.). These are structures in which all or most of the side wall of the carbon nanotubes are covered with the anodic aluminum oxide film. For example, it can be seen from the SEM photograph of the carbon nanotube of D. N. Davydov et al. that a flat surface of anodic aluminum oxide film remains in the structure (D. N. Davydov et al., J. Appl. Phys., 86, 3983 (1999)).

In a structure like these, the electric field does not easily concentrate on the carbon nanotubes, and the electron source having such a structure has a high operating electric field intensity.

In contrast, in the electron source having the foregoing third feature, particles are dispersed between the carbon nanotubes. Thus, an area (tips) of the side wall of the carbon nanotubes except for the area of the face adhered to the particles is exposed to air. That is, the side wall has a large exposed area. In other words, the carbon nanotube is sufficiently exposed to air. This enables the electric field to concentrate on the carbon nanotube, thereby providing the electron source that can be driven at a low voltage.

Further, the electron source having the third feature whereby the carbon nanotubes are anchored via dispersed particles (isolation particles) can provide a structure that can improve packing density of the carbon nanotubes (structure that allows for a large emission current density).

A display of the present invention includes an electron source that is provided with a plurality of carbon nanotubes having the foregoing structure, and electric field applying means for applying an electric field to each carbon nanotube so as to cause each carbon nanotube to emit electrons. This enables the electron source to be driven at a low voltage, thus providing a low power consuming display.

An electron source of the present invention includes a carbon nanotube as a field emission part, and a support member for supporting the carbon nanotube, wherein the support member is a porous material with large numbers of pores, and the carbon nanotube at least partially adheres to the inner wall of the pores (fourth feature).

This provides a highly reliable electron source with the carbon nanotube firmly supported by the support member.

The carbon nanotube that adheres to the inner wall of the pores was produced for the first time by the producing method of the present invention by which the pore shape of the porous material is transferred and the carbon nanotube is formed by the growth mechanism that is completely different from the conventional growth mechanism in which the carbon nanotube grows from a metal catalyst as an origin of growth.

In the carbon nanotube using a metal catalyst as taught by Davydov et al., a porous anodic aluminum oxide film is used to grow the carbon nanotube in a straight line from a metal catalyst as an origin of growth. It is believed that another reason Davydov et al. uses the porous anodic aluminum oxide film is to provide the metal catalyst in the form of individual particles. By dispersing particles of the metal catalyst by gas disposition etc., followed by electric field assisted carbonization, the carbon nanotube grows in a straight line from the particles of the metal catalyst as an origin of growth as in Davydov et al., without the porous anodic aluminum oxide film. In these methods, the shape of the carbon nanotube is determined by the particle size of the metal particles. Particularly, in the carbon nanotube disclosed in Davydov et al., the shape is largely dependent on growth time (deposition time), and the tip is curled when the growth time is long. Further, in the carbon nanotube disclosed in Davydov et al., the tip of the tube is closed.

The carbon nanotube of the present invention is formed by the adhesion and deposition of carbides on the side wall of the pores of the porous anodic aluminum oxide film, and the shape of the carbon nanotube is determined by the diameter and length of the pores of the porous anodic aluminum oxide film. Further, the carbon nanotube formed in the present invention is not dependent on growth time (deposition time) and always has the same diameter and the same length. However, the thickness ((outer diameter−inner diameter)/2) of the carbon nanotube formed in the present invention becomes different depending on the growth time (deposition time).

As described, the growth mechanism of the carbon nanotube of the present invention greatly differs from that of the carbon nanotube disclosed in Davydov et al. Accordingly, the producing method (transferred onto a template), the shape (tip is opened immediately after the carbon nanotube is formed), and the ease of shape control (always the same diameter and length) of the present invention also differ from those taught in Davydov et al.

A display of the present invention includes a plurality of carbon nanotubes as a field emission part, an electron source provided with a support member for supporting each carbon nanotube, and electric field applying means for applying an electric field to each carbon nanotube so as to cause each carbon nanotube to emit electrons, wherein the support member is a porous material with large numbers of pores, and each carbon nanotube at least partially adheres to the inner wall of the pores.

As a result, a highly reliable display with the carbon nanotubes firmly supported by the support member can be provided.

An electron source of the present invention includes a carbon nanotube as a field emission part, and a support member for supporting the carbon nanotube, wherein: the support member is a porous layer, formed on a substrate, having large numbers of through-pores, and the carbon nanotube is formed in a cylindrical shape inside the pores so that one end of the carbon nanotube is closed on the side of the substrate and an end face of the carbon nanotube on the side of the substrate adheres to a surface of the substrate.

As a result, an electron source with the carbon nanotube firmly adhering to the support member can be provided. It is therefore possible to improve the reliability of electrical connection between the carbon nanotube and the support member, when the substrate is used as the electrode in particular.

Such a structure of the carbon nanotube in which the carbon network film, with the end on the side of the pore bottom closed, adhered to the substrate is difficult to realize with the technique taught in Tokukaihei 8-151207.

That is, the electron source of the prior art is produced by a method in which a metal catalyst is provided on the bottom of the pores of the porous anodic aluminum oxide film and the carbon nanotube grows from the metal catalyst as an origin of growth. As such, at the bottom of the pores, the metal catalyst particles are two-dimensionally bonded to the under layer, and the carbon nanotube either adheres in the form of a ring or adheres to the under layer via the metal catalyst. Such a state of bonding of the carbon film with respect to the bottom of the pores has been confirmed by the TEM image of a carbon nanotube using a freestanding anodic aluminum oxide film which has been removed from an aluminum substrate (such an anodic aluminum oxide film with pores with closed one end is produced by forming the anodic aluminum oxide film on a barrier layer, without later removing the underlying barrier layer).

It is preferable in the electron source that the surface of the support member adhering to the carbon nanotube be made of at least one kind of material selected from the group consisting of silicon, silicon carbide, silicon oxide, and silicon nitride.

A display of the present invention includes: an electron source, which includes a plurality of carbon nanotubes as a field emission part and a support member for supporting each carbon nanotube; and electric field applying means for applying an electric field to each carbon nanotube so as to cause each carbon nanotube to emit electrons, wherein: the support member is a porous layer, formed on a substrate, having large numbers of through-pores, and each carbon nanotube is formed in a cylindrical shape inside the pores so that one end of the carbon nanotube is closed on the side of the substrate and an end face of the carbon nanotube on the side of the substrate adheres to a surface of the substrate. As a result, a display with the carbon nanotube firmly adhering to the support member can be realized. It is therefore possible to improve reliability of electrical connection between the carbon nanotube and the support member, particularly when the substrate is used as the electrode.

The electron source and display having the foregoing first, third, and fourth features, produced by the producing method having the foregoing second feature, by their physical and chemical characteristics, have an emission characteristic with an emission start electric field intensity in a range of from 0.25 V/μm to 0.5 V/μm, and an emission characteristic with an emission current density in a range of from 10 mA/cm$^2$ to 100 mA/cm$^2$ (driving electric field intensity of 1V/μm).

However, there has not been a theoretical support as to the direct cause of the large current electrons emitted at a low voltage from the electron source and display having the foregoing first, third, and fourth features, produced by the producing method having the foregoing second feature using oxygen plasma (etching with oxygen plasma). Thus, no clear cause-and-effect relationship has been established between the foregoing first through fourth features and the emission characteristics of emitting large current electrons at a low voltage.

However, the reasons the electron source produced by the producing method having the foregoing second feature using oxygen plasma and having the foregoing first, third, and fourth features emits large current electrons at a low voltage are believed to have been caused by (1) the carbon nanotubes that are polycrystalline (low crystallinity) (first feature), (2) the opened and oxidized tips of the carbon nanotubes by modification of the tips (field emission area) by the oxygen plasma process (carbon-oxygen bonds are selectively formed at the tips of the carbon nanotubes so that the composition of the tips of the carbon nanotubes is oxygen rich) (second feature), and (3) the anchored carbon nanotubes by the scattered particles between the carbon nanotubes (third feature), promoting the low-voltage and large-current field emission.

There has not been any theoretical support as to which of these factors is the direct cause. However, according to experiments conducted so far by the inventors of the present invention, the improvement of emission characteristics is believed to have been greatly influenced by the first feature, i.e., the polycrystallinity (low crystallinity) associated with carbon nanotube defects (formation of amorphous areas). The defects of the carbon nanotubes are believed to have been brought about by the presence of dangling bonds or $sp^3$ hybridization (diamond configuration).

Further, the electron source that emits large current electrons at a low voltage can only be realized by the growth mechanism of the carbon nanotube distinct to the foregoing producing method of the carbon nanotube, i.e., by the carbon nanotube that is formed by carbon deposition (particularly vapor-phase carbon deposition) in the absence of a metal catalyst, utilizing the inner wall of the porous material. It was impossible to realize the foregoing electron source with conventional carbon nanotubes, for example, such as the carbon nanotube which grows from the metal catalyst as an origin of growth inside the pores of the porous layer, and the carbon nanotube that is formed by arc discharge.

It is preferable that the electron source of the present invention has a resistivity in a range of from 1 k$\Omega$/cm to 100 k$\Omega$/cm and a resistivity higher than that of conventional electron sources. Vacuum devices, particularly display devices, must be provided with an emission current control mechanism of some form, and conventional display devices are provided with a thin film as a resistor layer under the electron source. In the carbon nanotube electron source of the present invention, the carbon nanotube itself has a high resistance, and thus the conventionally required resistor layer for controlling a current may not be required depending on device design.

The following explains the structure of the porous material (or porous layer) used in the producing method of the carbon nanotube and the producing method of the electron source of the present invention. In the producing method of the present invention, the shape of the pores of the porous material (or porous layer) is transferred to the carbon nanotube, and therefore the structure of the porous material (or porous layer) is important.

The material of the porous material (or porous layer) used in the producing methods of the present invention, which is not limited as long as it has continuous pores or randomly connected discontinuous pores, is preferably an insulating material. Such an insulating porous material (or porous layer) can be formed by proving pores, by a method such as a high energy ion injection method, in the insulating layer made of an insulating material, for example, such as glass, organic polymer, or ceramic. However, considering cost and convenience, an anodic oxidation method is preferable. The anodic oxidation method is a method in which a base member of an oxidizable inorganic material is oxidized by anodic oxidation so as to oxidize the base member and form pores therein.

Examples of the base member that can be formed into a porous material (or porous layer) by anodic oxidation include tantalum (Ta), silicon (Si), and aluminum (Al). Of these materials, aluminum (Al) is most preferable as the base member of the porous material (or porous layer) used in the producing methods of the present invention, because an aluminum (Al) base member can form pores in a straight line with a nano level diameter by anodic oxidation. Further, the anodic aluminum oxide film that is formed by anodic oxidation of aluminum, when subjected to heat treatment of around 600° C., undergoes a phase transition to γ-alumina (particles). Thus, the anodic aluminum oxide film that is formed by anodic oxidation of aluminum (Al) is considered to be a suitable material for realizing the electron source with the third feature of the present invention (individual carbon nanotubes are anchored to one another by the dispersed particles).

A producing method of the electron source of the present invention can also be characterized by the step of forming the anodic oxidation stopping layer under the porous layer. That is, the producing method of the electron source of the present invention is a method for producing an electron source which includes a carbon nanotube as a field emission part and a base substrate for supporting the carbon nanotube, and the method includes the steps of forming on the base substrate a base layer made of an oxidizable base material; forming a porous layer with large numbers of pores by causing the base layer to undergo anodic oxidation; forming the carbon nanotube inside the pores; and forming on the base substrate an anodic oxidation stopping layer for stopping anodic oxidation of the base substrate, before the base layer undergoes anodic oxidation.

The anodic oxidation stopping layer serves as the barrier layer in anodic oxidation and it achieves uniform anodic oxidation in a device plane. Thus, an electron source having superior uniformity in emission characteristics in a device plane or an emission area (pixels) can be realized.

The anodic oxidation stopping layer is preferably silicon, silicon carbide, silicon oxide, or silicon nitride, or a mixture of these compounds.

The carbon nanotube of the present invention has a large resistance by itself. However, when the device requires a larger resistance by device design, one can structure the device in such a manner that the anodic oxidation stopping layer serves as the high resistor layer. That is, the anodic oxidation stopping layer of the present invention may serve as the barrier layer of anodic oxidation during the production process and as the high resistor layer during device operations.

Further, the carbon nanotube electron source of the present invention, because it emits electrons at a low electric field intensity of around 0.25 V/µm to 0.5 V/µm, electrons are emitted in response to the applied voltage to the anode electrode. Thus, driving of the carbon nanotube electron source of the present invention requires a driving method that shields the electric field between the cathode electrode and the anode electrode. The carbon nanotube electron source of the present invention is structured to include a gate electrode between the cathode electrode and the anode electrode, wherein the gate electrode is driven by a driving method that shields the electric field from the anode electrode. Further, the carbon nanotube electron source of the present invention that is driven by such a driving method can use a TFT driver used in conventional liquid crystal devices, and can realize a display containing about 1,000,000 carbon nanotube electron sources integrated in a pixel area which is XY addressed by the cathode electrode and gate electrode.

An electron source of the present invention includes a carbon nanotube as a field emission part, wherein the carbon nanotube is discontinuous graphite that is divided into micro areas in the tube axis direction. Another electron source of the present invention includes a carbon nanotube as a field emission part, wherein the carbon nanotube partially includes an amorphous area in its graphite structure. With this structure, the emission start electric field intensity and the operating voltage (device driving voltage) can be reduced. The amorphous area can be regarded as an area in which micro crystal defects exist (micro defect area). Thus, the carbon nanotube can be said to include the micro crystal area by having micro defects (crystal defects) in the graphite crystal structure.

Further, the electron source of the present invention can be said to use a carbon nanotube which includes graphite areas (crystal areas) having $sp^2$ bonds, and areas (amorphous areas) which connects one graphite area to another by a dangling bond. That is, the carbon nanotube is considered to include the graphite areas (crystal areas) having $sp^2$ bonds, which are not orderly bonded over the entire area of the carbon nanotube making up the electron source but divided into micro areas, so that the emission voltage can be reduced. In contrast, the conventional carbon nanotube as disclosed in Tokukaihei 10-12124 has a basic structure of graphite and does not have the amorphous areas.

Further, in the electron source of the present invention, the carbon nanotube has a resistivity (specific resistance) preferably in a range of from 1 k$\Omega$·cm to 100 k$\Omega$·cm. That is, the resistivity of the carbon nanotube is markedly higher than that of a conventional carbon nanotube, for example, such as the carbon nanotube formed by arc discharge (generally known to have a resistivity of $5 \times 10^{-4}$ k$\Omega$·cm). With this characteristic, an electron source that can emit electrons at a markedly low voltage can be provided. More preferably, the resistivity of the carbon nanotube is in a range of from 50 k$\Omega$·cm to 70 k$\Omega$·cm.

Further, it is preferable in the electron source of the present invention that the field emission part is made up of only carbon atoms. In this way, an electron source with no metal catalyst (metal catalyst free) can be provided.

Further, it is preferable that the electron source of the present invention includes a plurality of carbon nanotubes, and an inorganic material covering the side wall of the carbon nanotubes is provided, so as to electrically insulate the carbon nanotubes from one another. In this way, when the carbon nanotubes are to be connected to the cathode electrode to make a device, the carbon nanotubes that are integrated in high density can be connected to the cathode electrode in parallel to improve reliability of the device. The inorganic material is preferably an anodic aluminum oxide film. In this way, stability and reproducibility of orientation control can be improved and reliability of the electron source (device) can be further improved.

The producing method of the electron source of the present invention may further include the steps of: forming an inorganic material that has through-pores on the both ends; forming carbon nanotubes on the inner wall of the pores by vapor-phase carbon deposition (pyrolytic carbon deposition) of a gaseous hydrocarbon in the pores of the inorganic material; and depositing the inorganic material between the carbon nanotubes. With this producing method, an electron source with reduced levels of emission start voltage and operating voltage (device driving voltage) can be produced, both inexpensively and conveniently.

Further, it is preferable in the producing method of the electron source that the carbon nanotubes be formed using a template of an inorganic material having through-pores on the both ends. In this way, a highly reliable carbon nanotube with a high level of orientation control can be produced stably and with good reproducibility.

It is preferable in the producing method of the electron source that the step of forming an inorganic material having through-pores on the both ends is carried out by an anodic oxidation method. That is, the step of forming an inorganic material having through-pores on the both ends preferably includes the anodic oxidation step. In this way, it is possible to provide a producing method of an electron source which uses a carbon nanotube that cannot be patterned by the microfabrication technique of the semiconductor process.

Further, the electron source of the present invention may includes: a base substrate, provided with a cathode electrode; a high resistor layer, which is provided on the cathode electrode; an inorganic thin film having pores, provided on the high resistor layer; and the carbon nanotube, which is provided as a field emission part (field emission electron source) in the pores, wherein a surface of the carbon nanotube in the vicinity of its tip is modified. With this arrangement, the emission voltage can be further reduced and the electron source can be driven at a low voltage without being restricted by the carbon nanotube structure and the producing method.

Further, the producing method of the present invention may include the steps of: forming a cathode electrode wiring on a substrate; forming a high resistor layer on the cathode electrode wiring; forming an inorganic material thin film in a field emission area on the high resistor layer; forming pores through the inorganic material thin film; disposing the carbon nanotube inside the pores; and modifying a surface of the carbon nanotube. With this method, an electron source that can be driven at a low voltage can be produced.

Further, the producing method of the electron source of the present invention may be adapted so that the step of forming the pores through the inorganic material thin film is carried out after the step of forming the inorganic material thin film in the field emission area on the high resistor layer, and is carried out by anodic oxidation of the inorganic material thin film, and the high resistor layer is an anodic oxidation stopping layer for stopping the anodic oxidation when the pores are formed by anodic oxidation, and the anodic oxidation stopping layer is made of at least one kind of material which is selected from the group consisting of silicon, silicon carbide, silicon oxide, and silicon nitride. By providing the anodic oxidation stopping layer under the carbon nanotube, the anodic oxidation of the upper layer of the inorganic material can be stopped easily, in addition to controlling the emission current. As a result, reliability of the device can be improved.

Further, a metal thin film may be provided on the anodic oxidation stopping layer and the metal thin film may be subjected to anodic oxidation. Then, a carbon nanotube may be provided in the pores of the anodic oxidation film to completely oxidize the metal thin film by anodic oxidation. In this way, the anodic oxidation film can be prevented from being detached, and orientation control and patterning of the carbon nanotube can be easily carried out.

It is preferable in the foregoing producing method that the carbon nanotube be disposed in the pores of the anodic oxidation film without using a catalyst.

In this way, an electrically opened state between the carbon nanotube and the cathode electrode can be prevented. Further, compared with the producing methods using a catalyst as disclosed in D. N. Davydov et al. and Tokukaihei 10-12124, less cost is required. Further, the production process is simpler than that of the producing method of the electron source of Tokukaihei 10-12124, which involves complex production processes because the method includes the step of depositing a metal catalyst inside the pores of the anodic oxidation film (electrolytic coloring step).

It is preferable in the producing method of the electron source that the step of modifying a surface of the carbon nanotube is carried out by etching using oxygen plasma. In this way, it is possible to provide a producing method of an electron source that can be driven at a yet lower voltage.

It is preferable that the electron source having the carbon nanotube as the field emission part be driven by a driving method which controls field emission by inserting a gate electrode between the cathode electrode and the anode electrode between which an electric field is emitted and by shielding the electric field from the anode electrode by the gate electrode. In this way, field emission of a yet lower voltage driving electron source can be controlled.

The producing method of the carbon nanotube of the present invention is a method in which carbon is deposited inside the pores of a porous material with large numbers of pores, so as to form a carbon deposition film of a cylindrical shape, wherein the method includes: the anodic oxidation step for obtaining the porous material; and the heating step of not less than 600° C. after the anodic oxidation step.

This method is different from the method of D. N. Davydov, in which acetylene is carbonized at 700° C.

For a fuller understanding of the nature and advantages of the invention, reference should be made to the ensuing detailed description taken in conjunction with the accompanying drawings.

BEST MODE FOR CARRYING OUT THE INVENTION

First Embodiment

Referring to FIG. 1 through FIG. 7, the following will describe one embodiment of a producing method of an electron source (may be called "carbon nanotube electron source" hereinafter) using a carbon nanotube according to the present invention, i.e., a producing method of an electron source in which a plurality of carbon nanotubes are anchored by alumina particles. FIG. 1 through FIG. 7 are step-by-step cross sectional views of the producing method of the electron source that is realized by a carbon nanotube array in which a plurality of carbon nanotubes are anchored by alumina particles.

Note that, in the present embodiment, a template (porous layer, porous material) used to form the carbon nanotubes is a porous anodic aluminum oxide film. The template, however, may be of other materials such as porous tantalum oxide or porous silicon. Further, the template (porous layer, porous material) may be a film made of a porous insulating material that is obtained by forming pores through an insulating film by such means as ion implantation.

Figure 1:
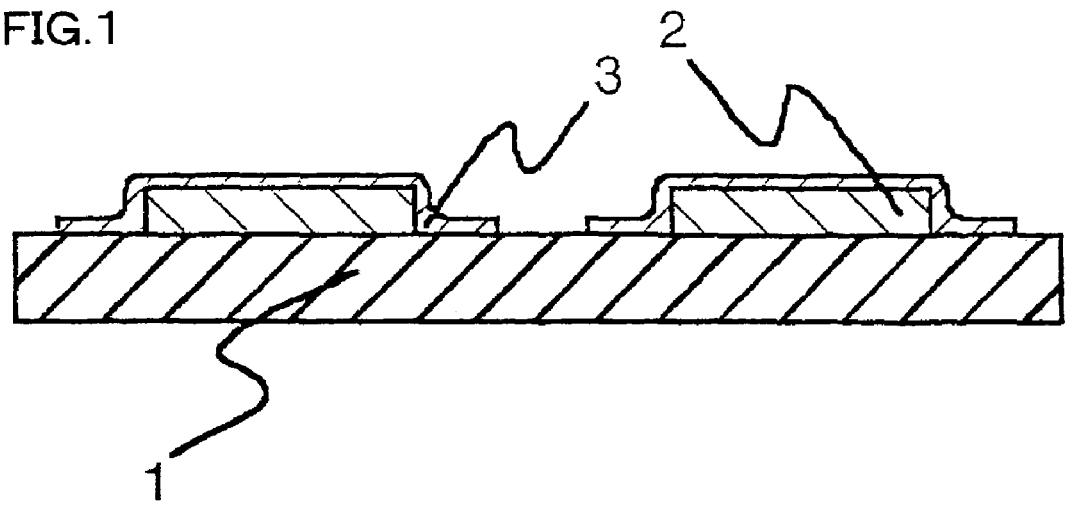
FIG. 1 through FIG. 5 are cross sectional views showing steps according to one embodiment of a producing method of a carbon nanotube electron source, in which carbon nanotubes according to the present invention are anchored by particles.

In the producing method of the electron source according to the present embodiment, first, as shown in FIG. 1, cathode electrode wiring 2 is formed on a base substrate 1, and an anodic oxidation stopping layer 3 is subsequently formed over the cathode electrode wiring 2. FIG. 1 is a cross sectional view showing the step of forming the cathode electrode wiring 2 on the base substrate 1 and then the anodic oxidation stopping layer 3 over the cathode electrode wiring 2.

The base substrate 1 is an insulating substrate, such as a quartz substrate, a glass substrate, or a ceramic substrate, among which the quartz substrate is used in the present embodiment. The cathode electrode wiring 2 may be made of an electrode material used for conventional displays, such as chrome (Cr), tungsten (W), nickel (Ni), molybdenum (Mo), niobium (Nb), and copper (Cu). In the present embodiment, the material of the cathode electrode wiring 2 is copper. The thickness of the cathode electrode wiring 2, which is decided according to such factors as resistivity or wiring resistance, is about 0.1 µm to 1 µm. The cathode electrode wiring 2 is suitably patterned to a predetermined shape (e.g., a plurality of discrete portions as shown in FIG. 1).

The anodic oxidation stopping layer 3 is a layer for stopping progression of anodic oxidation of an aluminum film 4 onto the cathode electrode wiring 2. The material of the anodic oxidation stopping layer 3 is preferably a highly resistive material, capable of limiting the emission current in addition to stopping the anodic oxidation. That is, the anodic oxidation stopping layer 3 preferably serves also as a high resistor layer that limits the emission current. However, in the case where the carbon nanotube of the present invention has a resistance (the carbon nanotubes of the present embodiment have a specific resistance as high as 1 kΩ/cm to 100 kΩ/cm) that coincides with a resistance that is required to limit the current in the device design of the electron source, the anodic oxidation stopping layer 3 is not necessarily required to serve as a high resistor layer. Further, the anodic oxidation stopping layer 3 preferably has a coefficient of thermal expansion that is substantially equal to that of an anodic aluminum oxide film 5. This prevents the anodic aluminum oxide film 5 from being detached from the anodic oxidation stopping layer 3 during the process of vapor-phase carbon deposition.

Further, as taught in Japanese Unexamined Patent Application No. 11-194134, the under layer material of the anodic aluminum oxide film may be made of metal such as titanium (Ti), niobium (Nb), or molybdenum (Mo), to realize the anodic oxidation stopping layer 3.

In the present embodiment, the anodic oxidation stopping layer 3 is an amorphous silicon film (non-doped sputtered silicon) which has the function of a high resistor layer. Results of experiment by the inventors of the present invention have shown that the anodic oxidation stopping layer 3 is preferably made of silicon materials, among which silicon, silicon carbides (SiC), silicon oxides, silicon nitrides, and a mixture of these are particularly preferable in terms of stopping the anodic oxidation in the anodic oxidation step. These silicon compounds are also preferable in respect to their resistance and serve as a high resistor layer. Further, these silicon compounds are also preferable as a base layer for supporting carbon nanatubes 8 in contact with an end face thereof.

When using silicon carbides as a material of the anodic oxidation stopping layer 3, the silicon carbides may be deposited to form the anodic oxidation stopping layer 3, or the silicon film after deposition may be converted to a carbide by the vapor-phase carbon deposition in forming the carbon nanotubes. When using silicon oxides, silicon nitrides, or a mixture of these silicon compounds as the material of the anodic oxidation stopping layer 3, these materials are deposited by a chemical vapor deposition (hereinafter "CVD") method or a sputtering method, which can be easily carried out. In the present embodiment, the anodic oxidation stopping layer 3 is designed to have a resistance that exceeds $10^8 \Omega$ (high resistance). In order to prevent shorting of the cathode electrode wiring 2, the anodic oxidation stopping layer (high resistor layer) 3 is preferably patterned into a predetermined shape according to the patterns of the cathode electrode wiring 2 (e.g., patterns that cover the cathode electrode wiring 2 by surrounding it, as shown in FIG. 1).

Figure 2:
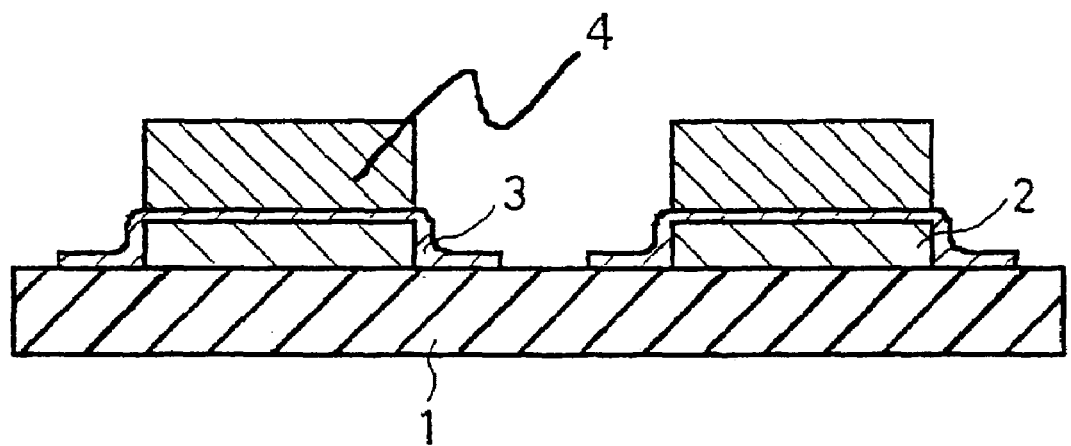

Thereafter, as shown in FIG. 2, the aluminum film 4 is formed on the anodic oxidation stopping layer (high resistor layer) 3, followed by patterning of the aluminum film 4 such that the aluminum film 4 remains in areas over the cathode electrode wiring 2.

FIG. 2 is a cross sectional view showing the step of forming the aluminum film 4 on the anodic oxidation stopping layer (high resistor layer) 3. Note that, the present embodiment uses the aluminum film 4 because the template is the anodic aluminum oxide film. Depending on the type of template, a tantalum film or a silicon film may be used.

Further, the template may be prepared from an insulating film made of an insulating material such as a silicon oxide film, an alumina film, or an organic film, by forming micro pores therethrough by a method such as the ion implantation method.

The aluminum film 4 used to form the anodic aluminum oxide film 5 preferably has a purity of 99% or higher and preferably has a thickness of not less than 1 μm to accommodate pores. In the present embodiment, the thickness of the aluminum film 4 is 2 μm. The aluminum film 4 can be formed by a method using a vacuum device, such as a sputtering method or a vapor deposition method, when the thickness of the aluminum film 4 is not less than 1 μm and less than 10 μm, or particularly from about 1 μm to about 5 μm. However, deposition of the aluminum film 4 becomes difficult when the thickness is 10 μm or more. The aluminum film 4 with a thickness of 10 μm or more can be preferably formed by using an aluminum foil of a predetermined thickness as the aluminum film 4 and attaching the aluminum foil on the anodic oxidation stopping layer (high resistor layer) 3 or the cathode electrode wiring 2 by a method such as an electrostatic bonding method. In either case, the surface of the aluminum film 4 is preferably mirror-finished. Considering this surface roughness of the aluminum film 4, it can be said that the film deposition method such as a sputtering method or a vapor deposition method is a preferable method of forming the aluminum film 4, because it only requires a single step to obtain aluminum film 4 with a mirror finish, but does not require a step of electrolytic polishing to obtain mirror-finished aluminum film 4, which is required in bonding an aluminum foil or an aluminum substrate on the anodic oxidation stopping layer (high resistor layer) 3 or the cathode electrode wiring 2 by the electrostatic bonding method.

Figure 3:
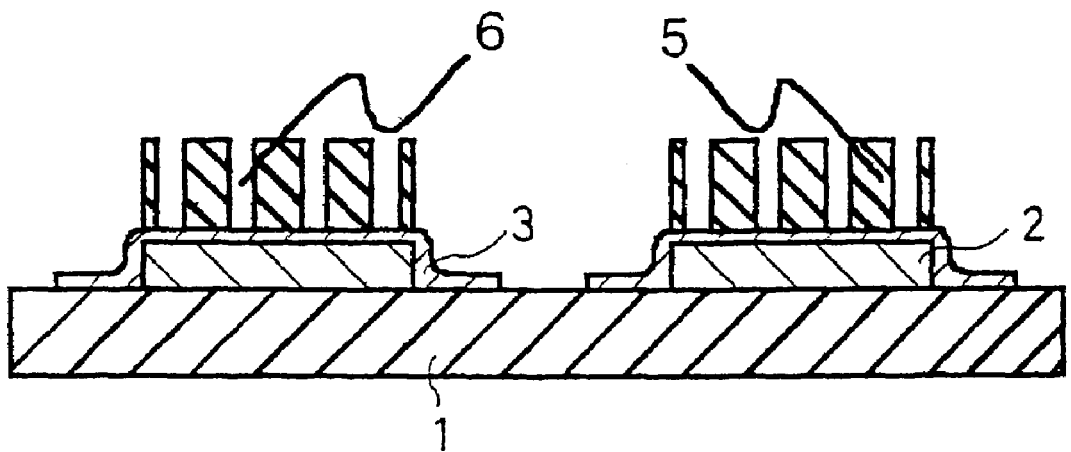

It should be noted here that instead of patterning the aluminum film 4, patterning may be carried out after forming the anodic aluminum oxide film 5 in FIG. 3. The patterning before the anodic oxidation step (patterning of the aluminum film 4) has a merit over the patterning after the anodic oxidation step (patterning of the anodic aluminum oxide film 5) in that sharper patterns are obtained. The demerit of the patterning after the anodic oxidation step (patterning of the anodic aluminum oxide film 5) is poorer uniformity in pattern edge of the anodic aluminum oxide film 5. The patterning of the aluminum film 4 can be readily carried out by wet etching using a mixture of phosphoric acid, nitric acid, and acetic acid.

Subsequently, as shown in FIG. 3, the aluminum film 4 on the anodic oxidation stopping layer (high resistor layer) 3 is subjected to anodic oxidation to obtain the anodic aluminum oxide film 5 with large number of pores 6.

Figure 8:
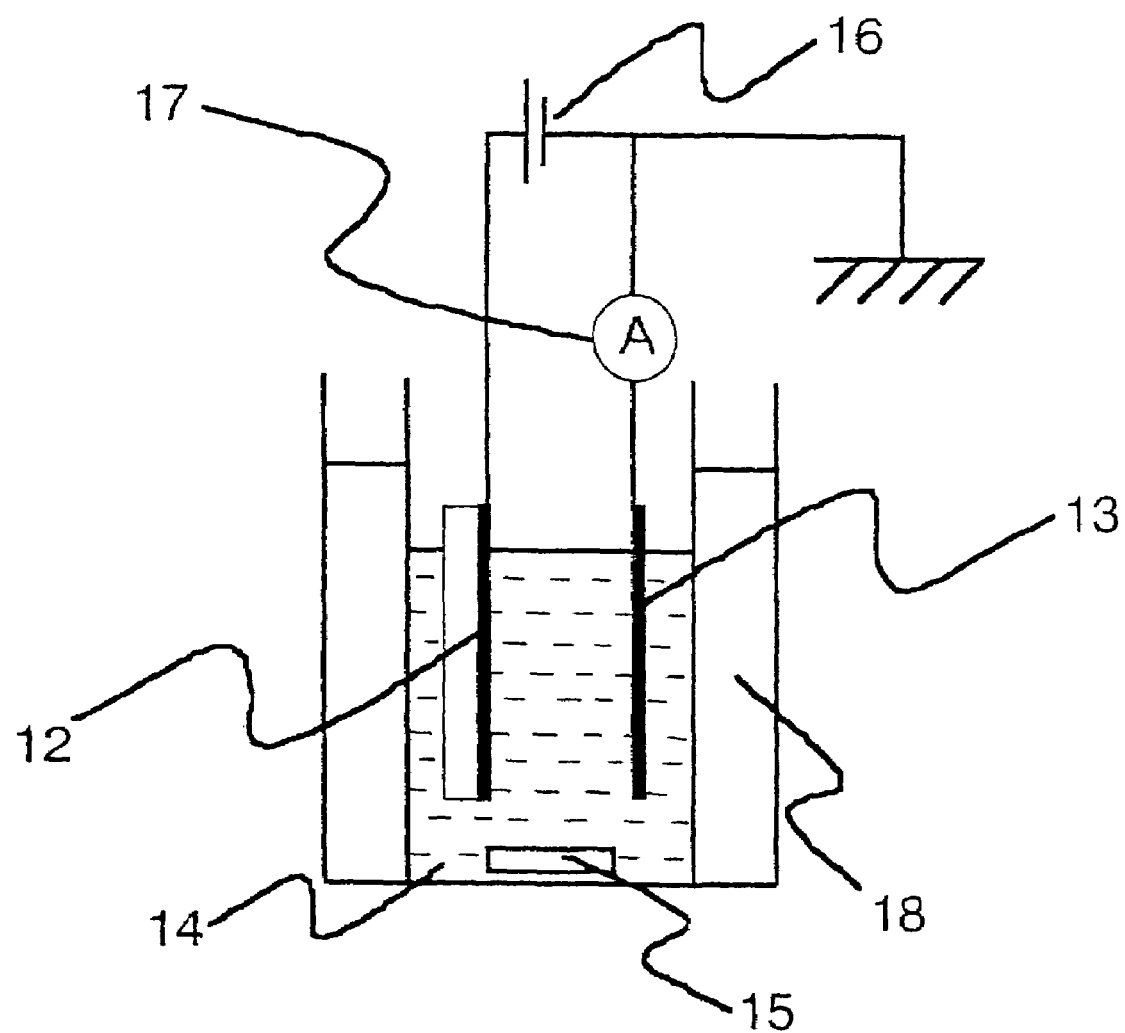
FIG. 8 is a cross sectional view schematically showing an example of an anodic oxidation device used in the present invention.
Figure 9:
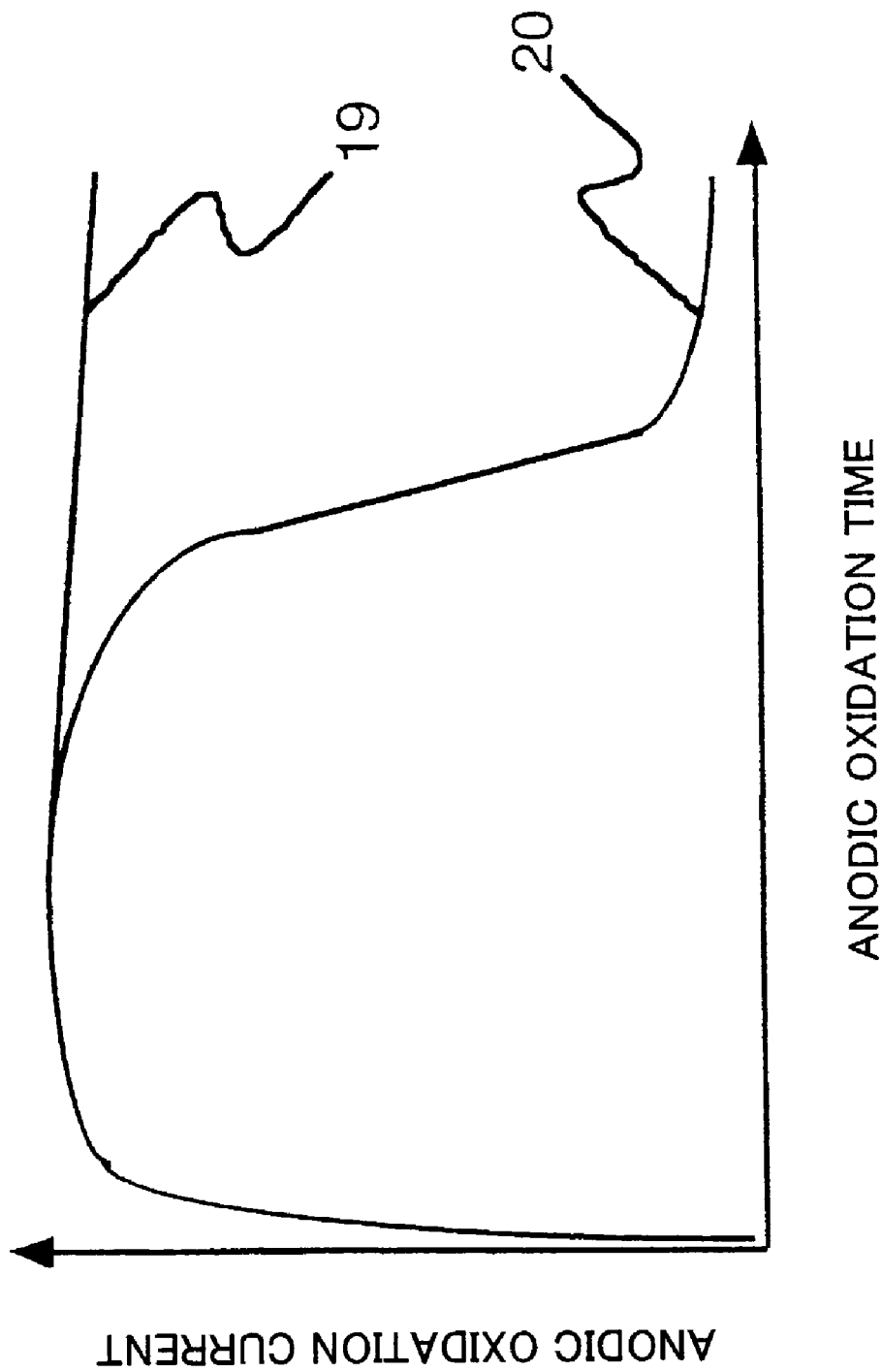
FIG. 9 is a graph showing changes over time of an anodic oxidation current in an anodic oxidation step of the present invention.

FIG. 3 is a cross sectional view showing the step of anodic oxidation of the aluminum film 4 on the anodic oxidation stopping layer (high resistor layer) 3. It is required that the aluminum film 4 be completely oxidized by the anodic oxidation. Avoiding residual aluminum film 4 ensures a time margin for the heat treatment in the producing steps. FIG. 8 schematically shows an anodic aluminum oxidation device used in the present embodiment. A target sample (aluminum film 4) of anodic oxidation is disposed as an anode 12 in a chemical solution 14, and a cathode 13 is provided as a counter electrode opposite the anode 12 in the chemical solution 14. The chemical solution 14 may be sulfuric acid, oxalic acid, and the like. Between the anode 12 and the cathode 13 are provided a power supply 16 and an ammeter 17. Applying a positively biased voltage from the power supply 16 to the anode 12 sets off anodic oxidation. The chemical solution 14 is stirred with a stirrer 15 and maintained at a desired temperature in a thermostat bath 18. The conditions of anodic oxidation of the aluminum film 4 should be suitably optimized so that the pores 6 are formed according to the tip diameter of the carbon nanotubes designed by a person ordinary skilled in the art. In the present embodiment, the designed tip diameter (average diameter) of the carbon nanotubes was 30 nm, and a constant voltage of 20 V was applied in a sulfuric acid solution at 0° C. so as to carry out anodic oxidation for 20 minutes. The anodic oxidation completely oxidized the aluminum film 4 of 2 μm thick, and produced the anodic aluminum oxide film 5 of 2.8 μm thick, having pores 6 with an average diameter of 30 nm and a density of around $10^{10}/cm^2$. The completion of anodic oxidation of the aluminum film 4 can be easily found from a current change as a function of time (measured with the ammeter 17), as shown in FIG. 9. FIG. 9 schematically depicts a change in current as a function of time in the anodic oxidation step. In FIG. 9, a first current-time characteristic 19 indicates the current-time characteristic of a bulk aluminum film (e.g., aluminum plate), and a second current-time characteristic 20 indicates the current-time characteristic (characteristic of anodic oxidation) of a thin film (deposited film), i.e., the aluminum film 4 of the present embodiment. The current-time characteristic 20 of the thin film aluminum film 4 shows such a characteristic that the current rises abruptly in response to application of a voltage before it levels off to a substantially constant rate. Upon near completion of the anodic oxidation of the thin film aluminum film 4, the current suddenly decreases to only several percent of the initially observed current value. The end point of the thin film aluminum film 4 is observable by visual inspection by observing a change in color of the surface of the aluminum film 4 from the original silver to the color of the underlying anodic oxidation stopping layer 3. On the other hand, the current-time characteristic 19 of the anodic oxidation of the bulk aluminum film shows an abrupt current increase in response to voltage application before it decreases at a substantially constant rate. In this manner, the current-time characteristic 20 of the anodic oxidation of the thin film aluminum film 4 and the current-time characteristic 19 of the anodic oxidation of the bulk aluminum film show completely different behaviors. Monitoring of the current-time characteristics of the anodic oxidation is desirable in managing the anodic oxidation step of the thin film aluminum film 4 of the present embodiment, and it contributes a great deal to reproducibility of the anodic oxidation. Note that, the current, instead of the voltage, may be held constant. In this case, a voltmeter, instead of the ammeter 17, can be used to monitor the current-time characteristics and to find the end point of the anodic oxidation.

Note that, in order to improve uniformity of the tubes 6 of the anodic aluminum oxide film 5, the anodic oxidation may be carried out in two steps. That is, in the first step, the aluminum film 4, about 0.5 μm thick, is subjected to anodic oxidation (for 5 minutes in a sulfuric acid solution at 0° C. under an applied voltage of 20 V), and the anodic oxidized film is subsequently detached by wet etching (in a 0.5 weight % hydrofluoric acid aqueous solution, at room temperature, for about 2 minutes). Subsequently, in the second step, remains of the aluminum film 4 is completely oxidized by further anodic oxidation (for 15 minutes in a sulfuric acid solution at 0° C. under applied voltage of 20 V). By experiment, this was proven to greatly improve uniformity of the pores 6 of the anodic aluminum oxide film 5. Another technique to uniformly form the tubes as in the forgoing method is taught in (H. Masuda et al., Appl. Phys. Lett., 71, 19, 2770 (1997)). Further, the chemical solution of anodic oxidation may be oxalic acid, phosphoric acid, or the like. Using oxalic acid in particular enables the pores to be formed in an average diameter of about 30 nm, as in the foregoing example, by the application of a voltage of around 25 V at room temperature.

Thereafter, the anodic aluminum oxide film is patterned so that the pores 6 reach the anodic oxidation stopping layer 3. Care must be taken for the patterning of the anodic aluminum oxide film 5 to avoid etching residue or pattern chipping or the like. In the present embodiment, the anodic aluminum oxide film 5 is patterned by a wet etching method in combination with an ultrasonic washing method. Examples of etchants used in the wet etching include: a hydrofluoric acid (HF) aqueous solution; an aqueous solution of a mixture of phosphoric acid ($H_3PO_4$) and hydrochloric acid (HCl); an aqueous solution of a mixture of phosphoric acid ($H_3PO_4$), nitric acid ($HNO_3$), and acetic acid ($CH_3COOH$); and a sodium hydroxide aqueous solution (NaOHaq), among which the aqueous solution of a mixture of phosphoric acid ($H_3PO_4$) and hydrochloric acid (HCl) is preferable. The weight concentration (weight of phosphoric acid and hydrochloric acid/total weight) of the aqueous solution of a mixture of phosphoric acid ($H_3PO_4$) and hydrochloric acid (HCl) is preferably 10 weight % to 80 weight %. With a weight concentration of the mixed acid aqueous solution at or above 80 weight %, resist damage is observed. With a weight concentration of the mixed acid aqueous solution at or below 10 weight %, etching residue of the anodic aluminum oxide film becomes prominent. In the present embodiment, the anodic aluminum oxide film 5 is wet etched with an etchant whose weight concentration of the mixed acid is 40 weight % (phosphoric acid ($H_3PO_4$)/hydrochloric acid (HCl)/pure water ($H_2O$)=3:1:6). Subsequent to the wet etching, ultrasonic washing (power: 100 W, frequency: 40 kHz) is carried out. The purpose of ultrasonic washing is to remove etching residue of the anodic aluminum oxide film 5. However, ultrasonic washing longer than 10 minutes causes pattern chipping. Experiments have shown that serious pattern chipping of the anodic aluminum oxide film occurs when the ultrasonic washing exceeds 5 minutes. The optimum balance of wet etching and ultrasonic washing should be attained by observing the state of etching residue and the state of pattern chipping of the anodic aluminum oxide film 5. In the present embodiment, the anodic aluminum oxide film 5 is patterned by etching for 5 minutes at 70° C., using a 40 weight % mixed acid of phosphoric acid ($H_3PO_4$) and hydrochloric acid (HCl) as an etchant, followed by ultrasonic washing for 1 minute.

Figure 4:
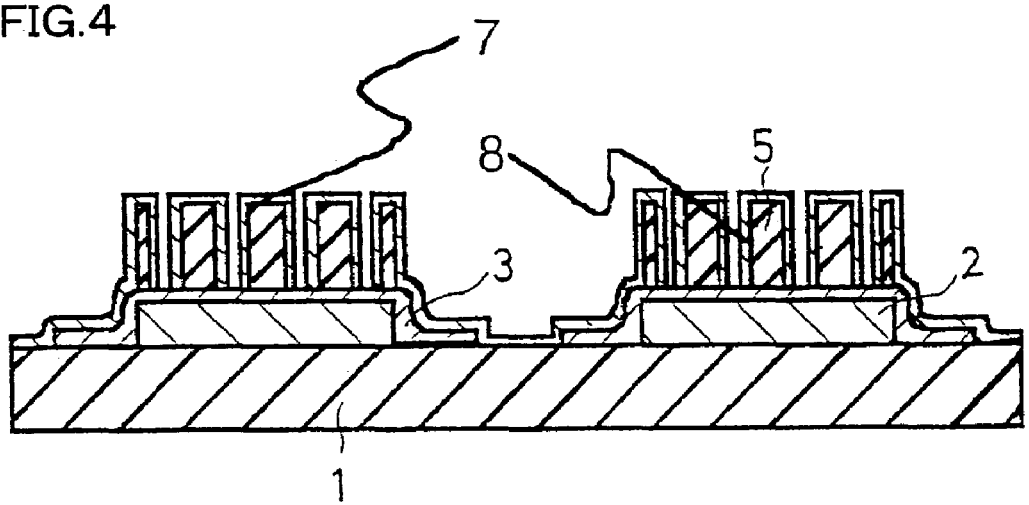

Thereafter, the anodic aluminum oxide film 5 is subjected to vapor-phase carbon deposition so as to form a carbon deposition film 7 within the tubes 6 of the anodic aluminum oxide film (template) 5, as shown in FIG. 4. The carbon deposition film 7 adheres to the inner wall of the pores 6 to form carbon nanatubes 8 having substantially the same outer diameter as that of the pores 6. The carbon nanatubes 8, though not shown, are hollow tubes with a closed end on the side of the anodic aluminum oxide film 5, and the entire end face on the side of the anodic aluminum oxide film 5 is in contact with a surface of the anodic aluminum oxide film 5. Further, as shown in FIG. 4, the carbon deposition film 7 adheres not only to the inner wall of the pores 6 but also to the surface of the anodic aluminum oxide film 5.

Figure 10:
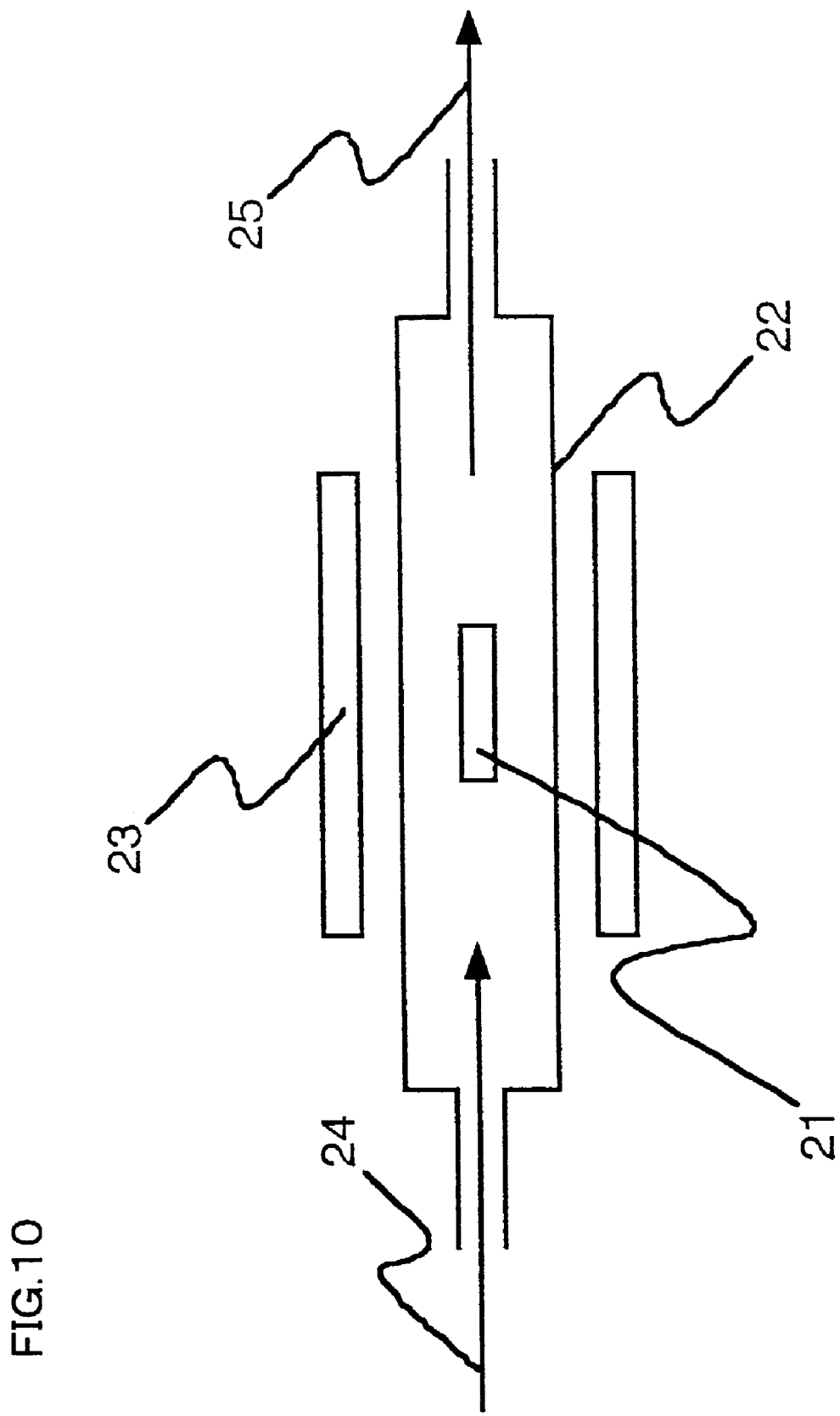
FIG. 10 is a drawing schematically showing an example of a vapor-phase carbon deposition device used in the present invention.

FIG. 4 is a cross sectional view showing the step of vapor-phase carbon deposition of the carbon deposition film 7 on the pores 6 of the anodic aluminum oxide film (template) 5. As a vapor-phase carbon deposition device, a heat CVD device of a basic structure as shown in FIG. 10 can be used. That is, the base substrate 1, the cathode electrode wiring 2, the anodic oxidation stopping layer 3, and the anodic aluminum oxide film 5 shown in FIG. 3 are used as a sample 21 and placed in a quartz reaction tube 22. The vapor-phase carbon deposition is carried out by heating the quartz reaction tube 22 with the sample 21 to a predetermined temperature using a heater 23, followed by charging the quartz reaction tube 22 with hydrocarbon gas as source gas 24 from one end of the quartz reaction tube 22. This sets off pyrolysis of the hydrocarbon gas (source gas 24) and generates carbon. The carbon deposits on the surface of the sample 21 and forms the carbon deposition film 7 thereon. The gas flown through the quartz reaction tube 22 is discharged out of the reaction system (out of the quartz reaction tube 22) as discharge gas 25. The vapor-phase carbon deposition device (FIG. 10) of the present embodiment is designed to satisfy such specifications that a constant temperature is maintained in the quarts reaction tube 22 at least in an area where the sample 21 is placed, and that a constant pressure is maintained inside the quartz reaction tube 22. The vapor-phase carbon deposition in the present embodiment was carried out under the following conditions: propylene was used as the source gas 24 (2.5% in nitrogen); the source gas 24 (propylene) was flown through the quartz reaction tube 22 for 3 hours; and inside the quartz reaction tube 22 was heated at a temperature of 800° C. The heating temperature inside the quartz reaction tube 22 in the vapor-phase carbon deposition should be a temperature that induces pyrolysis of the source gas (hydrocarbon) 24. When propylene is used as the source gas 24 as in the present embodiment, a temperature range of 600° C. to 900° C. is preferable. The source gas 24 is not just limited to propylene, and other kinds of hydrocarbon gas such as acetylene may be used as well. In the case of vapor-phase carbon deposition using plasma assist, the vapor-phase carbon deposition may be carried out with a mixture of methane gas and hydrogen gas at a temperature of about 650° C. Such vapor-phase carbon deposition using plasma assist was carried out in the following manner, for example. The sample 21 was heated to about 650° C. and a microwave of 2.45 GHz was generated in the quartz reaction tube 22. Inside the quartz reaction tube 22 was charged with a mixture of methane gas and hydrogen gas (methane:hydrogen=1:4) and a DC bias of about 150 V was applied inside the quartz reaction tube 22 to continue the process for 10 minutes. With such vapor-phase carbon deposition method using plasma assist, the carbon nanatubes 8 can be formed at a relatively low temperature.

Figure 5:
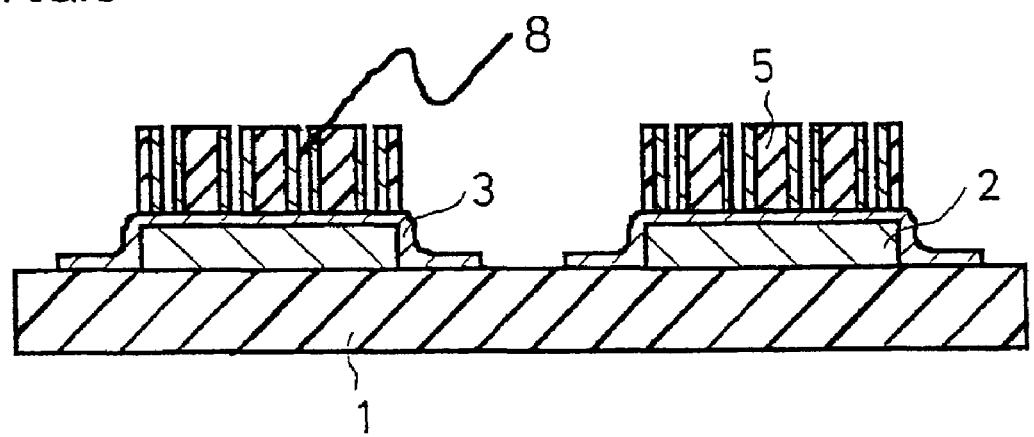

Subsequently, as shown in FIG. 5, the carbon deposition film 7 adhering on a surface of the anodic aluminum oxide film 5 was removed, so as to separate the carbon nanatubes 8 into individual pieces and to modify the surface on the tip of the carbon nanatubes 8. FIG. 5 is a cross sectional view showing the step of removing the carbon deposition film 7 adhering on a surface of the anodic aluminum oxide film 5 to separate the carbon nanatubes 8 into individual pieces.

The carbon deposition film 7 was removed by dry etching using plasma (hereinafter referred to as "plasma process"). By the plasma process, not only the carbon deposition film 7 on the anodic aluminum oxide film 5 is removed but the surface on the tip of the carbon nanatubes 8 is selectively modified. With the modification of the carbon nanatubes 8, the field emission characteristics of the carbon nanatubes 8 can be improved. It can be said that this improvement of field emission characteristics by the surface modification process is achieved for the first time by the arrangement of the present embodiment wherein side walls of the carbon nanatubes 8 are covered with the anodic aluminum oxide film 5, and it is the effect distinct to the carbon nanatubes 8 that are formed by the vapor-phase carbon deposition method using the template. Note that, in the present embodiment, the plasma process uses the reactive ion etching (RIE).

The etching gas that can be used for the plasma process includes oxygen, argon, helium, hydrogen, nitrogen, carbon trifluoride, and carbon tetrafluoride. The etching gas is preferably oxygen. Namely, the plasma process is preferably an oxygen plasma process. This is because the field emission characteristics of the carbon nanatubes 8 of the present embodiment become particularly effective when the oxygen plasma process is carried out, as clearly indicated by the field emission characteristics (I-V characteristics) of the plasma-treated carbon nanatubes 8 of FIG. 31 to be described later.

Note that, in order to perform surface modification only on the tip of the carbon nanatubes 8, it is preferable that the pores of the anodic aluminum oxide film 5 (template) have open ends. With the anodic aluminum oxide film 5 (template) having such a structure, side surfaces of the carbon nanatubes 8 are protected by the anodic aluminum oxide film 5 (template) and are uninfluenced at all by the surface modification process. In the present embodiment, the oxygen plasma process is carried out to perform surface modification only on the tip of the carbon nanatubes 8. With the absence of the anodic aluminum oxide film 5 (template) on side surfaces of the carbon nanatubes 8, a graphite layer (carbon network film) on the side surfaces is etched by the oxygen plasma and this prevents formation of an electron source structure. By thus covering side surfaces of the carbon nanatubes 8 with the anodic aluminum oxide film 5 (template) to carry out the surface process (oxygen plasma process) as in the present embodiment, only the tip edge of the carbon nanatubes 8 can be subjected to the surface modification.

Figure 6:
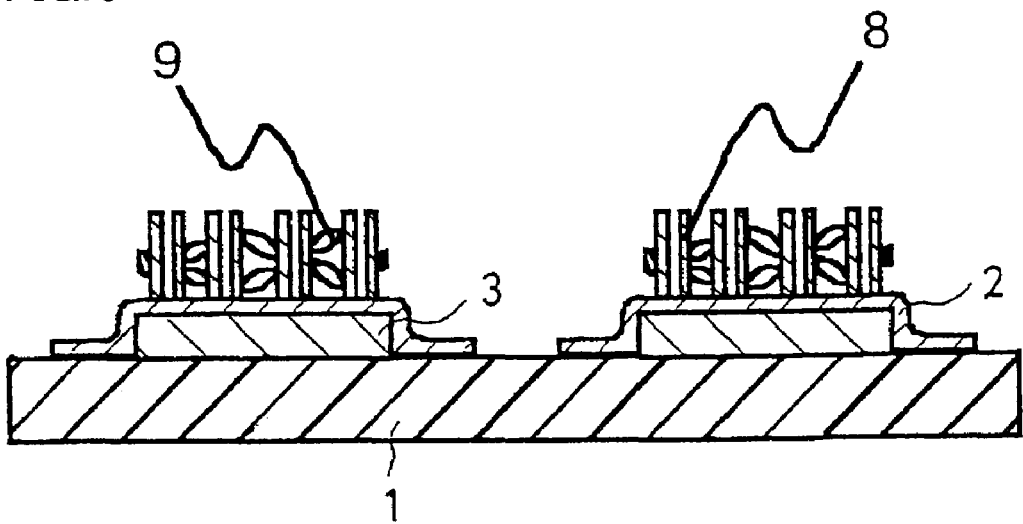
FIG. 6 is a cross sectional view showing the electron source of a bipolar tube structure obtained by the foregoing producing method.

Subsequently, as shown in FIG. 6, the anodic aluminum oxide film (template) 5 is partially removed, leaving the alumina particles 9, and the carbon nanotubes 8 are exposed. As a result, the carbon nanatubes 8 become disposed parallel to one another (orientation control) by the alumina particles 9 that are scattered between the carbon nanatubes 8. In addition, the side surfaces of adjacent carbon nanatubes 8 are bound to one another.

The anodic aluminum oxide film 5 is removed preferably by wet etching using an etchant such as an aqueous solution of alkali, phosphoric acid, or hydrofluoric acid. The type of etchant used in wet etching and the processing temperature should be selected according to the temperature of a heat treatment in the vapor-phase carbon deposition. That is, when the temperature of a heat treatment in the vapor-phase carbon deposition is around 800° C., heat alkali etching is preferable. When the temperature of a heat treatment in the vapor-phase carbon deposition is below 800° C., an alkali treatment or a hydrofluoric acid treatment at around room temperature may be carried out. In the case of a hydrofluoric acid treatment, because of its high etching rate, a dilute hydrofluoric acid aqueous solution diluted to 1 weight % or less is preferably used. When the etching time is short, the tips of the carbon nanatubes 8 cannot be exposed. On the other hand, when the etching time is too long, the carbon nanatubes 8 become disoriented and the field emission characteristics become poor. In the present embodiment, an aqueous solution of 20 weight % sodium hydroxide was used to carry out heat alkali etching for 2 hours at 150° C.

As noted above, the anodic aluminum oxide film (template) 5 has gone through the heat CVD process between the state shown in FIG. 4 and the state shown in FIG. 5, and a temperature range of the heat CVD process is from 600° C. to 900° C. The phase transition temperature of alumina from the amorphous phase to γ-alumina is known to be around 600° C. When the temperature of the heat CVD process is from 600° C. to 900° C., it is envisaged that the anodic aluminum oxide film 5, which is in the amorphous phase when it is formed, has partially made a transition to γ-alumina by the heat CVD process, by the time the process reaches the state of FIG. 5. In the present embodiment, it is believed that the γ-alumina phase after the transition remain in the anodic aluminum oxide film 5 as the alumina particles 9, which, because of its high selectivity ratio for the etchant (sodium hydroxide) used to remove the anodic aluminum oxide film 5, become the alumina particles 9 that anchor the carbon nanatubes 8.

Figure 11:
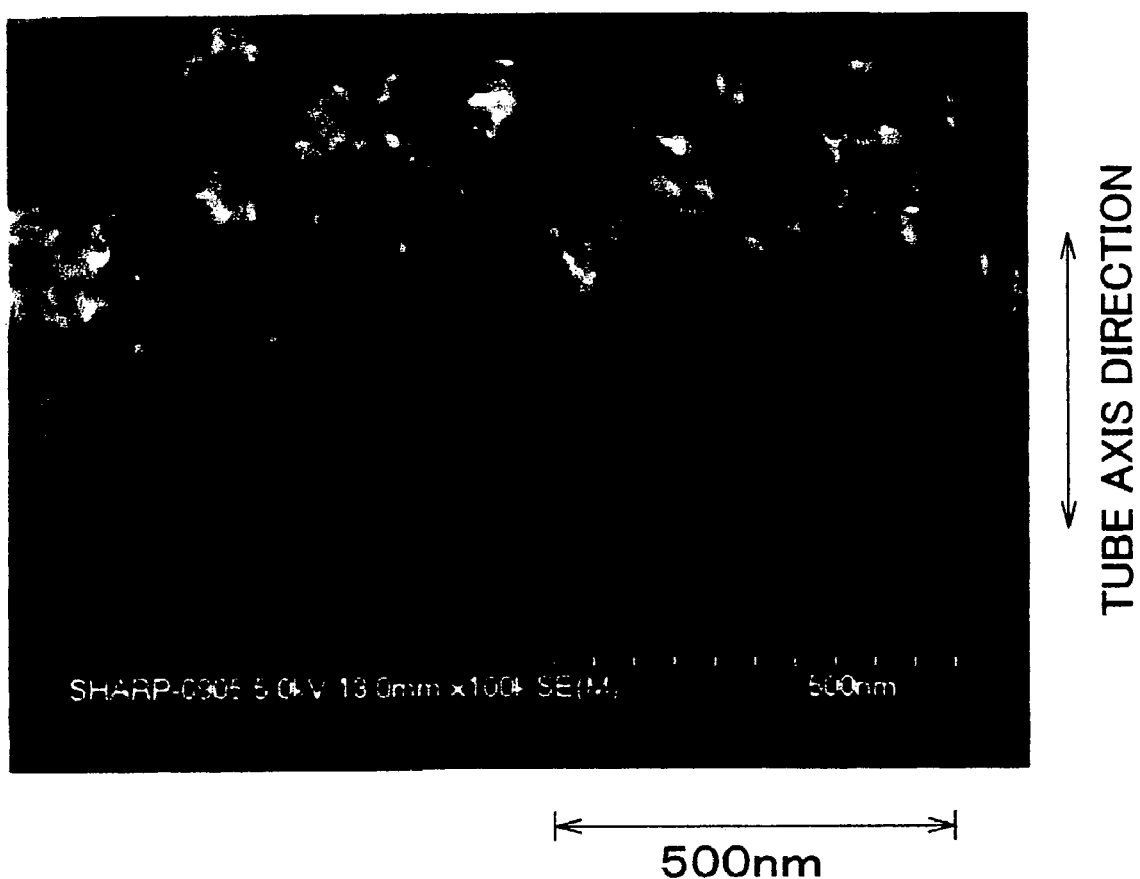
FIG. 11 is an SEM image showing carbon nanotubes that are anchored by particles according to the present invention, as viewed from above on a 45° angle.

The electron source of the present invention utilizes such alumina particles 9 as a constituting element. FIG. 11 (electron micrograph image viewed from side on an angle) and FIG. 12 (electron micrograph image viewed from top) clearly show that the alumina particles 9 anchor the carbon nanatubes 8 that are integrated. Proceeding the removal of the anodic alumina oxide film 5 causes the carbon nanatubes 8 to disorient themselves and the field emission characteristics suffer. Thus, the amount of anodic aluminum oxide film 5 removed should be optimized so that the field emission characteristics become optimal.

The carbon nanotube electron source of a bipolar tube structure as shown in FIG. 6 can be obtained in this manner. Such a carbon nanotube electron source can be used in vacuum micro devices, for example, such as a cold cathode ray tube and a fluorescent display tube.

Figure 7:
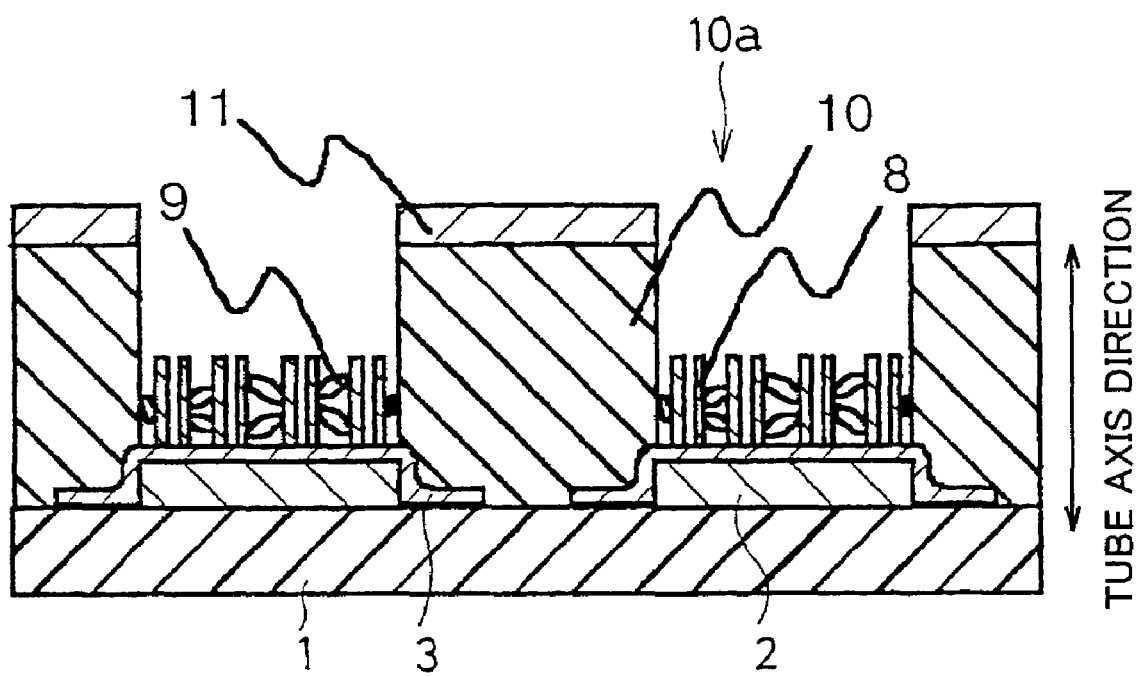
FIG. 7 is a cross sectional view showing an electron source of a tripolar tube structure which is obtained from the carbon nanotube electron source of the bipolar tube structure shown in FIG. 6.

Referring to FIG. 7, the following explains a producing method of a carbon nanotube electron source of a tripolar tube structure. FIG. 7 shows a carbon nanotube electron source of a tripolar tube structure. In a producing method of the carbon nanotube electron source of a tripolar tube structure of the present embodiment, an insulating substrate 10 provided beforehand with gate electrode wiring 11 on one side and a gate opening 10a is bonded, with the side of the gate electrode wiring 11 facing out, to the carbon nanotube electron source of the bipolar structure shown in FIG. 6. The gate opening 10a is provided over the area of the carbon nanotube electron source of the bipolar structure of FIG. 6 where the carbon nanatubes 8 are formed. The bonding can be made by a conventional method such as an electrostatic bonding method. Such a producing method is suitable to produce a carbon nanotube electron source of a large area, because it does not require a vacuum device or photolithography and thus enables a carbon nanotube electron source of a large area to be produced conveniently and inexpensively.

The material of the gate electrode wiring 11 may be molybdenum (Mo), tungsten (W), and niobium (Nb). The material of the insulating substrate 10 may be glass, ceramic, and organic polymers. The gate opening 10a may be processed in a size of about 50 μm. The diameter of the gate opening 10a is preferably several tens of microns to several hundreds of microns, depending on device design.

Note that, the carbon nanotube electron source of the tripolar tube structure can also be formed by a semiconductor process. A producing method of the tripolar tube structure using the semiconductor process will be described in detail in a Second Embodiment.

Figure 12:
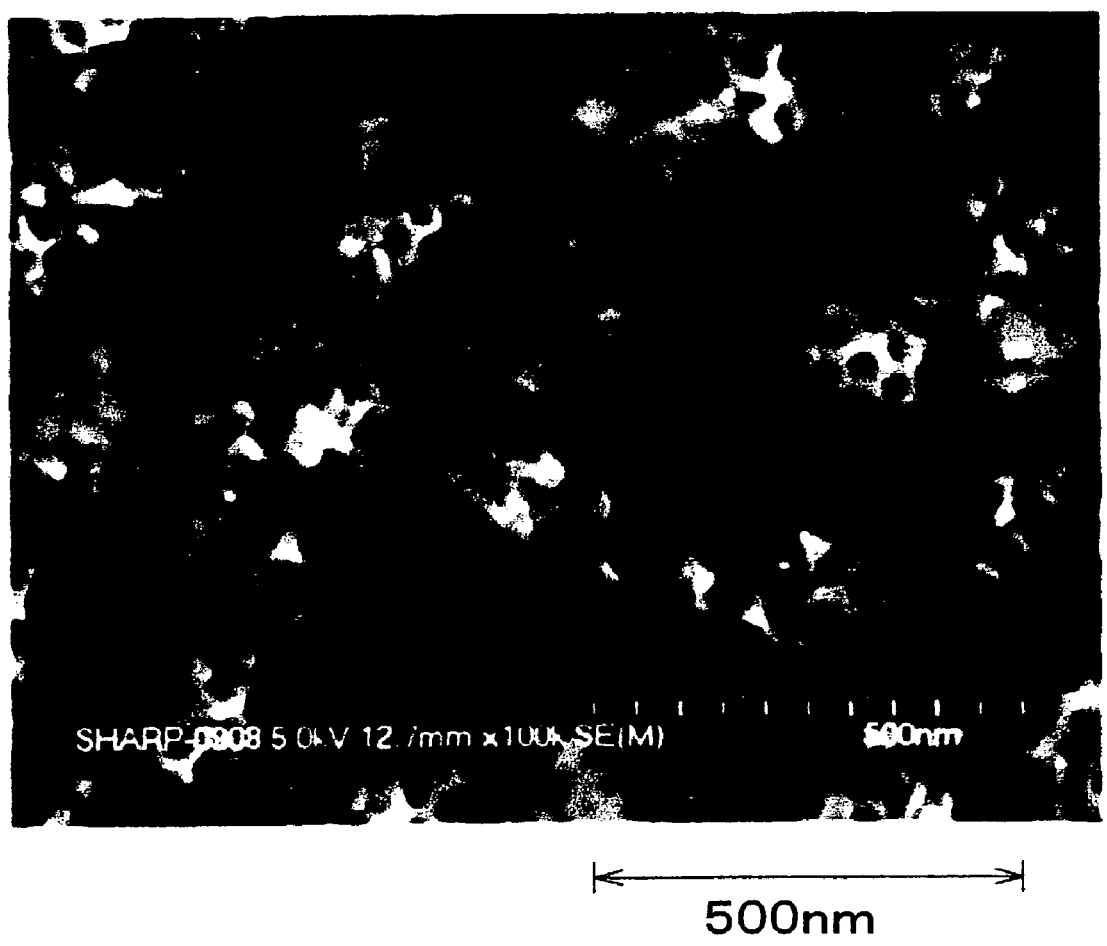
FIG. 12 is an SEM image showing carbon nanotubes that are anchored by particles according to the present invention, as viewed directly from above.

The carbon nanotube electron source which are anchored by the particles of the present embodiment produced in the described manner has a configuration as shown in FIG. 11 and FIG. 12. FIG. 11 is an image of a scanning electron microscope (hereinafter referred to as SEM) when the carbon nanotube electron source of the present embodiment is viewed from a 45° angle from above. FIG. 12 is a SEM image of the carbon nanotube electron source of the present embodiment viewed directly from above. As is clear from these SEM images, the carbon nanotube electron source of the present embodiment has a large number of carbon nanotubes that are highly integrated in an orientation-controlled arrangement, wherein the particles (γ-alumina; seen white in the SEM images) that are scattered between the carbon nanotubes bind side faces of the carbon nanotubes. Note that, the carbon nanotubes are carbon nanotubes of at least one layer of a cylindrical carbon network film, wherein the carbon network film has a polycrystalline structure of a plurality of divided crystal areas in a tube axis direction (see FIG. 7 and FIG. 11).

The carbon nanotube electron source as taught by W. A. de Heer is a casting film with carbon nanotubes and is not the carbon nanotube electron source of the controlled orientation. That is, when such a carbon nanotube electron source is used in a device, the problem of non-uniform field emission occurs. In contrast, the carbon nanotube electron source of the present embodiment, because of orientation control of the carbon nanotubes, has superior field emission uniformity.

In a carbon nanotube electron source of D. N. Davydov, the under layer of the anodic aluminum oxide film is aluminum, and therefore the anodic aluminum oxide film is easily detached by the heat process of forming the carbon nanotubes. In contrast, in the electron source of the present embodiment, the under layer of the anodic aluminum oxide film 5 is a non-doped sputter silicon film (anodic oxidation stopping layer 3) and therefore the anodic aluminum oxide film 5 is less likely to be detached from the under layer by the heat process of forming the carbon nanotubes. As a result, an electron source with high reliability can be provided.

Second Embodiment

An electron source of the present embodiment differs from that of the First Embodiment in that, unlike the First Embodiment in which the carbon nanotubes are anchored by the particles, a surface of the anodic aluminum oxide film is partially removed to make up a carbon nanotube array.

Figure 13:
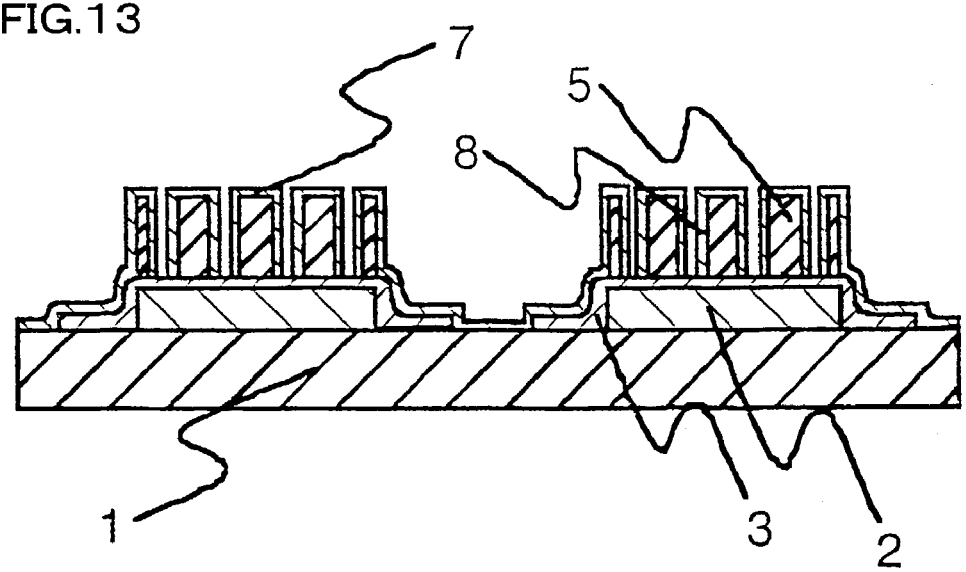
FIG. 13 through FIG. 15 are cross sectional views showing steps of one embodiment of a producing method of a carbon nanotube electron source, in which a surface of an anodic aluminum oxide film according to the present invention is partially removed.
Figure 14:
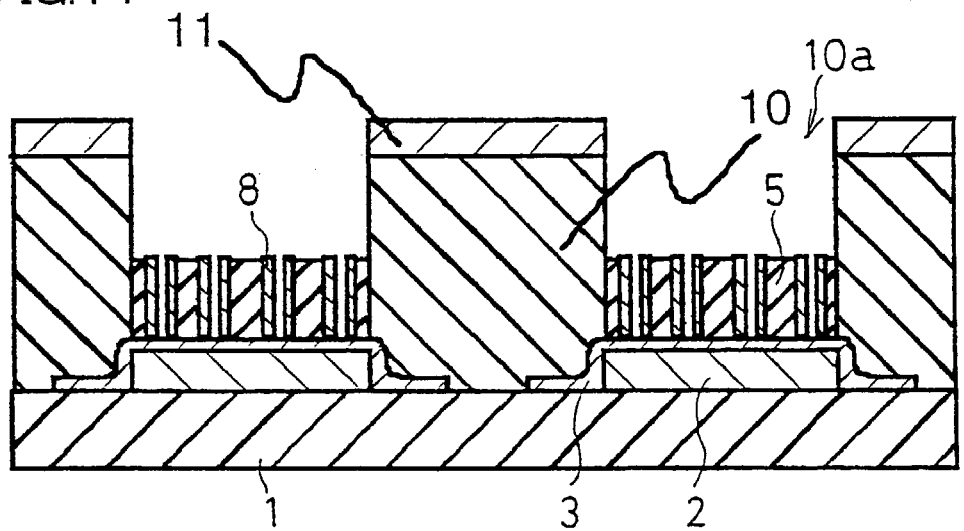
Figure 15:
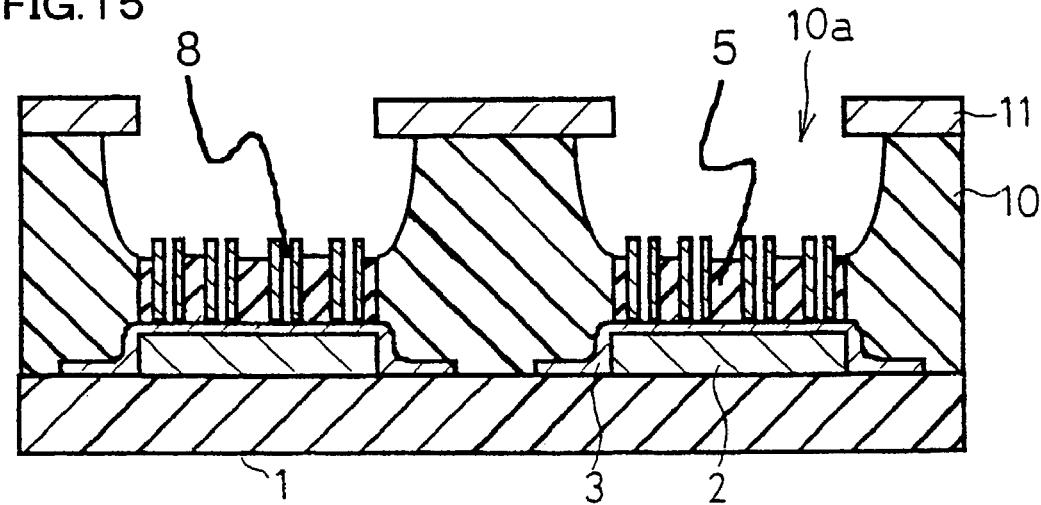

FIG. 13 through FIG. 15 show a producing method of a carbon nanotube electron source of the present embodiment. In the producing method of the tripolar tube structure of the present embodiment, a vacuum device and photolithography, which are known in a conventional silicon semiconductor process is used. However, the insulating substrate 10 provided with the gate electrode wiring 11 may be bonded, as explained with reference to FIG. 7 in the First Embodiment.

FIG. 13 is a cross sectional view showing a step of vapor-phase carbon deposition of a carbon deposition film 7 on pores 6 of an anodic aluminum oxide film (template) 5. Niobium (Nb) is formed as cathode electrode wiring 2 on a quartz substrate, i.e., a base substrate 1, and non-doped silicon (Si) is formed as an anodic oxidation stopping layer (high resistor layer) 3 on the cathode electrode wiring 2. On the anodic oxidation stopping layer 3 is provided the anodic aluminum oxide film (template) 5 which is formed by the anodic oxidation of an aluminum film 4. The carbon deposition film 7 adheres on surfaces of the anodic aluminum oxide film (template) 5 and on the inner wall of the pores.

FIG. 14 is a cross sectional view showing a step of forming a carbon nanotube electron source provided with a gate opening. First, the gate insulating layer 10 is formed using an insulating material such as glass, ceramic, organic polymers, mica, and crystalline quartz. In the present embodiment, the gate insulating film 10 was made from an SOG (Spin on Glass; coated glass) film. The gate insulating film 10 of SOG was formed by spin-coating an SOG film material (glass based paste material) dissolved in a solvent followed by baking. The thickness of the gate insulating film 10 made from an SOG film after baking was 1 μm. Note that, the gate insulating film 10 may be formed to a thickness of around 100 μm by screen printing a paste of a silicon oxide based insulating material several times. Then, a material of the gate electrode wiring 11 was deposited on the gate insulating film 10 to form a conductive layer. As a material of the gate electrode wiring 11, a metal material having a high melting point such as molybdenum (Mo), tungsten (W), or niobium (Nb) is preferable. In the present embodiment, niobium (Nb) was deposited to a thickness of 1500 Å. The gate electrode wiring 11 may also be formed by screen printing using a metal paste. Considering formation of the gate opening, it is preferable that the material of the gate electrode wiring 11 and the material of the gate insulating layer 10 are a combination of materials with a greatly differing etching selectivity ratio. In the present embodiment, a photoresist with an open window for the gate opening was formed. After exposure, hydrofluoric-nitric acid (a mixture of hydrofluoric acid and nitric acid) having a large selectivity ratio for the SOG was used to process (etch) a conductive film (material of the gate electrode wiring 11) at the gate opening, and dilute hydrofluoric acid (1 weight % to 5 weight % aqueous solution of hydrofluoric acid) was used to process (etch) the gate insulating film 10 at the gate opening, so as to form the gate opening (hole). Note that, the etching removal may be carried out by a combination of dry etching and wet etching, so as to minimize side etching within the gate opening. For example, after the majority of the gate insulating film 10 has been removed by dry etching, the gate insulating layer 10 of several nm may be removed by wet etching.

Subsequently, the carbon deposition film 7 on the surface of the anodic aluminum oxide film (template) 5 was removed. The carbon deposition film 7 was removed by reactive ion etching (RIE) using oxygen plasma, as in FIG. 5. Removal of the carbon deposition film 7 may be carried out before forming the gate opening. However, when the carbon deposition film 7 is to be removed before forming the gate opening, caution must be taken not to contaminate the tips of the carbon nanotubes.

FIG. 15 is a cross sectional view showing a step after the tips of the carbon nanotubes have been exposed. The carbon nanatubes 8 were exposed by wet etching using dilute hydrofluoric acid (1 weight % to 5 weight % aqueous solution of hydrofluoric acid). The etching amount of the anodic aluminum oxide film (template) 5 should be equal to or greater than the spacing between the carbon nanotubes. In the present embodiment, the spacing between the carbon nanotubes is 30 nm, and the etching amount of the anodic aluminum oxide film (template) 5 was about 50 nm (30 nm or greater is acceptable).

The present embodiment uses the glass based insulating material (SOG) as the gate insulating layer 10, and therefore there is a possibility of a side etching phenomenon whereby the gate insulating layer 10 is removed (etched) at the same time as the anodic aluminum oxide film 5 (porous alumina). The problem of side etching can be avoided by changing the material of the gate insulating layer 10 or by changing the etchant used to etch the anodic aluminum oxide film 5 to a material with a higher selectivity ratio for the gate insulating layer 10.

A feature of the carbon nanotube electron source of the tripolar tube structure thus prepared is the structure in which the diameter of the gate opening becomes smaller as it approaches to the electron source, and the field emission area (pixel in the case of a display) is made of an insulating material (anodic aluminum oxide film) different from the gate insulating layer 10.

Third Embodiment

The present embodiment describes a structure of a carbon nanotubes of the present invention. The structure of the carbon nanotubes was analyzed by characterization of crystallinity, which involved observation under a transmission electron microscope (hereinafter referred to as TEM), and analysis by X-ray diffraction (XRD) spectrometry and Raman spectrometry, and measurement of resistivity.

Figure 16:
FIG. 16 is a TEM image of the carbon nanotube according to the present invention.
Figure 17:
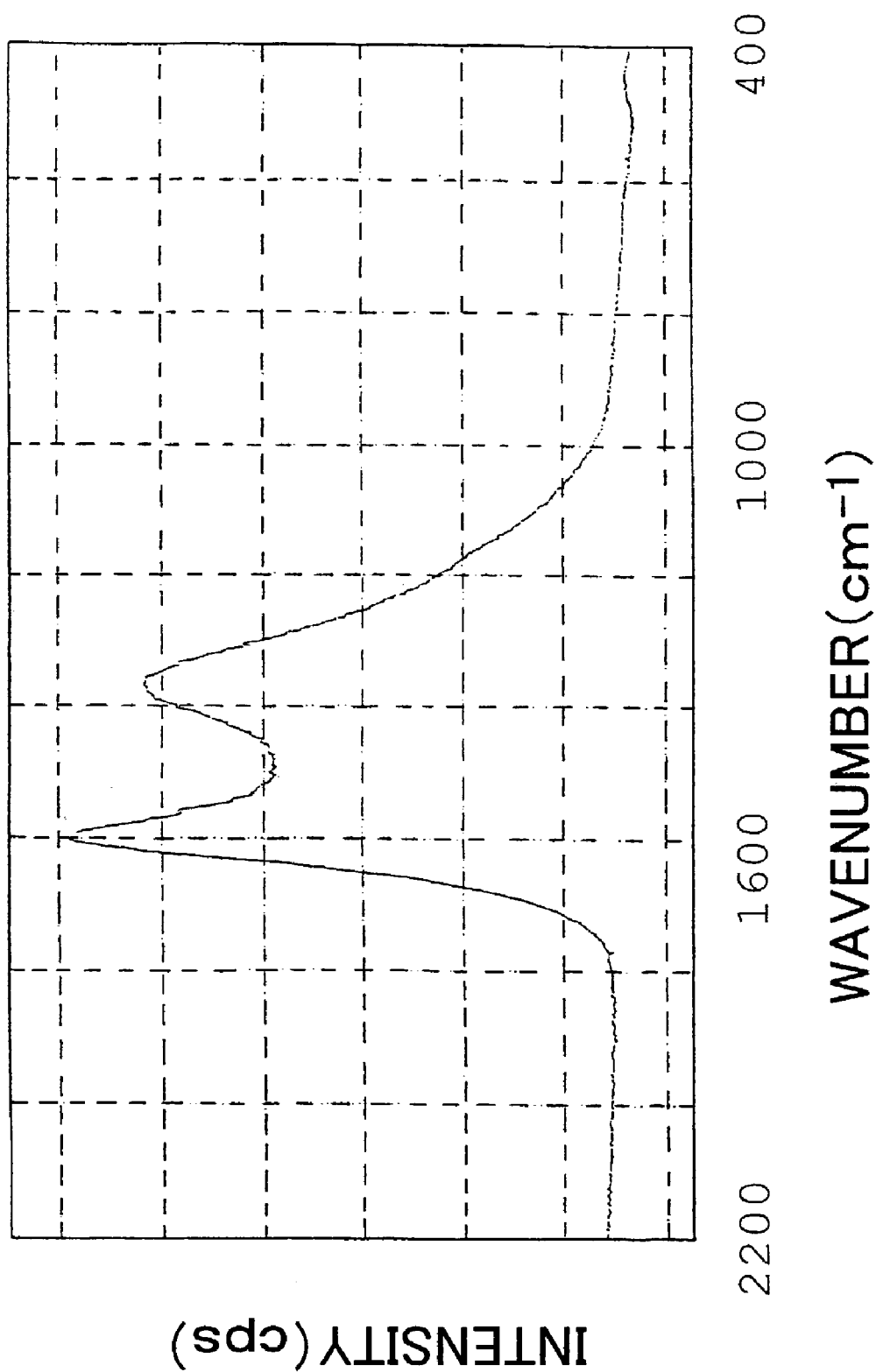
FIG. 17 is a graph showing a Raman spectrum of the carbon nanotube according to the present invention.
Figure 18:
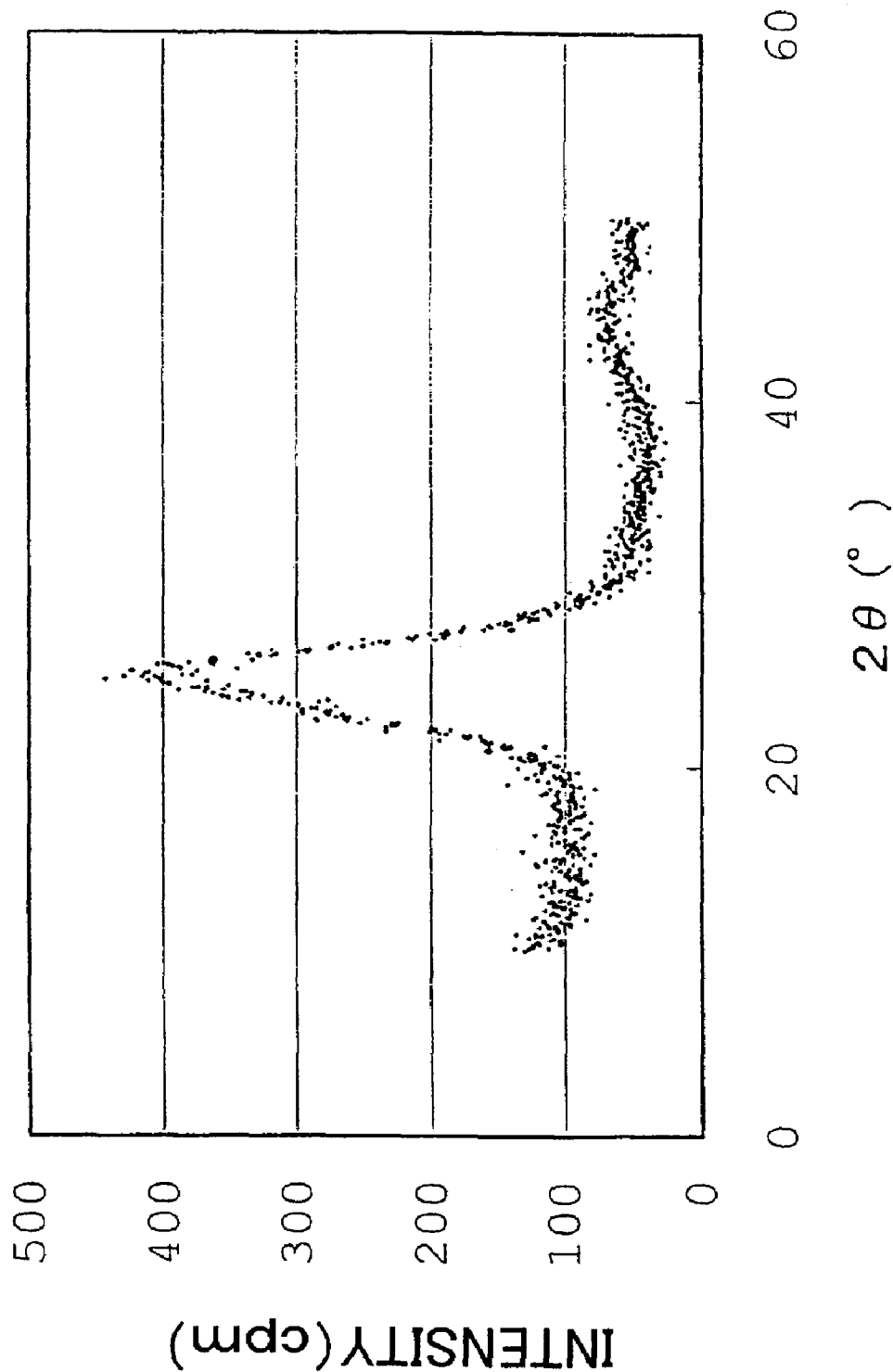
FIG. 18 is a graph showing an X-ray diffraction (XRD) spectrum of the carbon nanotube according to the present invention.
Figure 19:
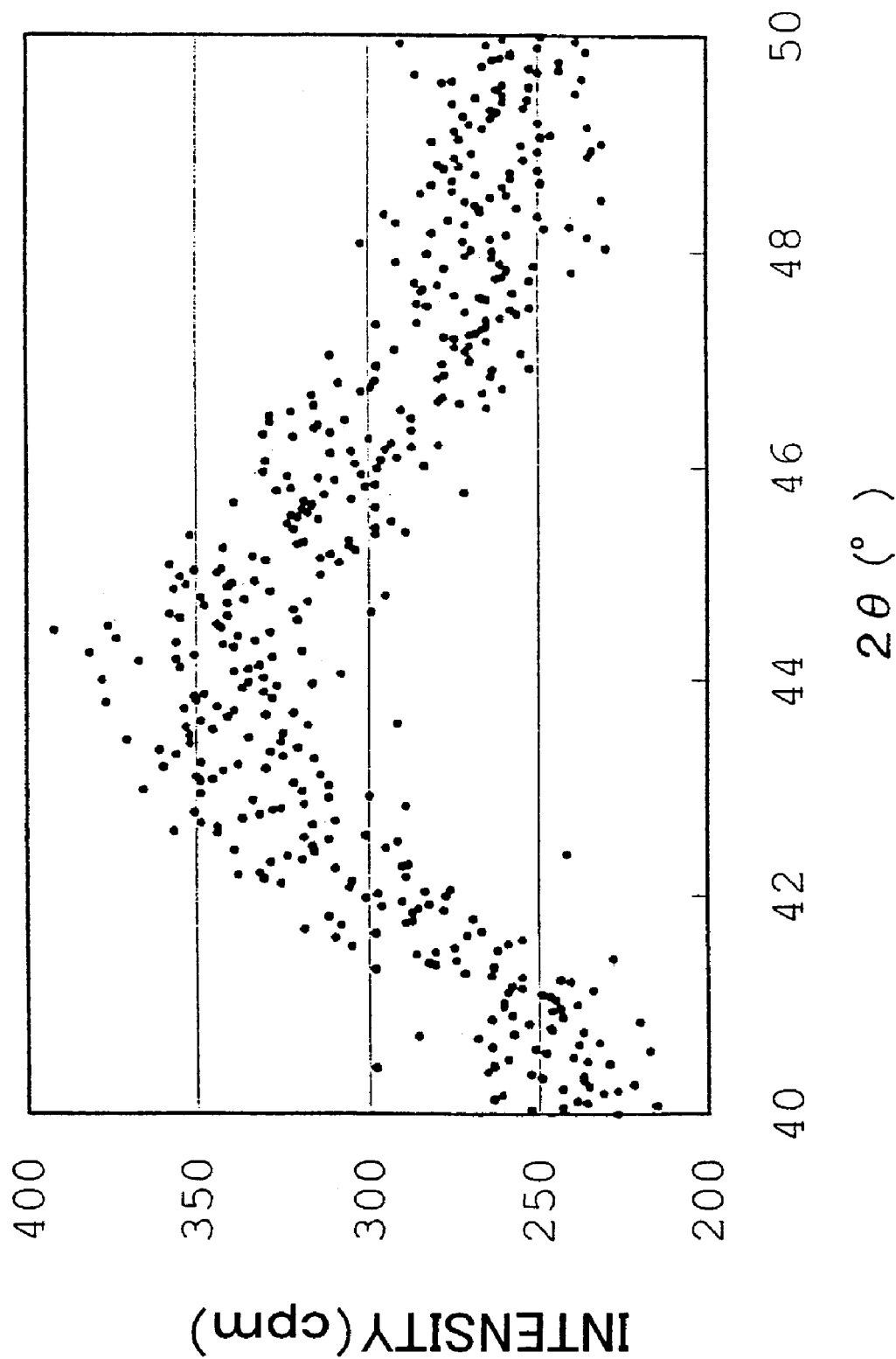
FIG. 19 is a graph showing an X-ray diffraction (XRD) spectrum of the carbon nanotube according to the present invention.

FIG. 16 is a TEM image of a carbon nanotube sample of the present embodiment; FIG. 17 is a Raman spectrum of a carbon nanotube sample of the present embodiment; and FIG. 18 and FIG. 19 are X-ray diffraction spectra of a carbon nanotube sample of the present embodiment.

The carbon nanotube sample for the analysis of the carbon nanotube structure was prepared in the following manner. An aluminum substrate that has been electropolished was subjected to anodic oxidation in a 20 weight % aqueous solution of sulfuric acid in an iced water bath (0° C.) under an applied voltage of 20 V for 2 hours, using an anodic oxidation device shown in FIG. 8, so as to form an anodic aluminum oxide film (porous anodic aluminum oxide film) with large numbers of pores. The current-time characteristics of anodic oxidation are as shown by current-time characteristics 19 in FIG. 9. The anodic aluminum oxide film (thickness of about 75 μm, and the diameter of pores of about 30 nm) thus prepared was removed from the aluminum substrate. The anodic aluminum oxide film can be removed by applying a reversed voltage of the applied voltage for 10 minutes to the aluminum substrate with the anodic aluminum oxide film in a sulfuric acid aqueous solution, using the anodic oxidation device shown in FIG. 8. The anodic aluminum oxide film thus removed was subjected to vapor-phase carbon deposition using a heat CVD device of FIG. 10 (anodic aluminum oxide film was set in a quartz tube) under the conditions of vapor-phase carbon deposition in the step shown in FIG. 4 of the First Embodiment (2.5% propylene in nitrogen, 800° C., 3 hours), so as to form carbon nanotubes in the pores of the anodic aluminum oxide film and thus obtain the carbon nanotube sample with the anodic aluminum oxide film (hereinafter referred to as carbon nanotube sample for structural analysis).

Note that, simultaneously with the formation of the carbon nanotubes, the carbon deposition film is formed on the surface of the anodic aluminum oxide film. The interface of the aluminum substrate and the anodic aluminum oxide film may be provided with an anhydrous alumina layer called a barrier layer (anodic oxidation stopping layer). In the case where the anhydrous alumina layer (barrier layer) is formed, the anodic aluminum oxide film that was removed is allowed to stand for an hour in a sulfuric acid solution so as to dissolve the barrier layer.

The anodic aluminum oxide film was completely removed by wet etching (150° C., 3 hours) using a 20 weight % sodium hydroxide aqueous solution with respect to the carbon nanotube sample for structural analysis, so as to isolate the carbon nanotube sample.

The carbon nanotube sample was then observed under TEM. FIG. 16 shows an image of the carbon nanotube sample observed under TEM. As is clear from FIG. 16, the carbon nanotubes of the present embodiment are multi-walled carbon nanotubes with multi-walls (multiple layers) having a diameter of about 26 nm and a thickness of about 6 nm. It can also be seen that the carbon network film making up the multi-walls has a polycrystalline structure with divided micro crystal areas interposed between amorphous areas. The micro crystal areas are disposed substantially one dimensionally in a tube axis direction and the size thereof in the tube axis direction is several nm. Such a structure is very different from that of conventional carbon nanotubes, which do not have the structure in which the carbon network film is divided into micro areas. The structural difference becomes even more prominent in bulk graphite.

In the description that follows, the carbon network film of the carbon nanotubes of the present embodiment is identified and the size of the small areas is quantified.

FIG. 17 is a Raman spectrum of the carbon nanotube sample for structural analysis (with the anodic aluminum oxide film). As clearly indicated by FIG. 17, the carbon nanotube of the present embodiment have Raman spectrum peaks in the vicinities of 1600 cm$^{-1}$ and 1360 cm$^{-1}$. Generally, the bulk graphite has a peak that belongs to the stretching vibration mode of a C=C bond in the vicinity of 1580 cm$^{-1}$ (G band, peak intensity $I_{1580}$). When disturbance occurs in the graphite structure, a peak in the vicinity of 1360 cm$^{-1}$ (D band, peak intensity $I_{1360}$) is observed. The carbon nanotubes of the present embodiment are characterized by its large peak at $I_{1360}$ (D band) and by its broad bands at $I_{1580}$ (G band) and $I_{1360}$ (D band), and by shifting of $I_{1580}$ (G band) to the high frequency side in the vicinity of 1600 cm$^{-1}$. This is the phenomenon that is observed when there is disturbance in the structure of graphite (monocrystal), i.e., lowering of crystallinity. Thus, the carbon nanotubes of the present invention have the carbon network film of graphite and has low crystallinity. Considering the TEM image of FIG. 16, it is believed that this low crystallinity is due to the structure of graphite that is divided into micro areas. Table 1 summarizes the result of FIG. 17 using the degree of graphitization $I_{1360}/I_{1600}$, which indicates crystallinity.

TABLE 1

| VAPOR-PHASE CARBON DEPOSITION TEMPERATURE | $I_{1360}/I_{1600}$ |
|---|---|
| 600° C. | 0.863 |
| 700° C. | 0.800 |
| 800° C. | 0.867 |
| 850° C. | 0.866 |

Table 1 indicates degrees of graphitization of the carbon nanotube sample for structural analysis at vapor-phase carbon deposition temperatures 600° C., 700° C., and 800° C. The degree of graphitization of the carbon nanotube of the present invention was 0.5 to 1, and that of the present embodiment in particular was around 0.8 to 0.9.

FIG. 18 and FIG. 19 are measurement results of X-ray diffraction (XRD) spectra with respect to the carbon nanotube sample for structural analysis, that were obtained by completely removing the anodic aluminum oxide film and by making the carbon nanotubes into a powder, as with the sample used for the TEM observation of FIG. 16. FIG. 18 shows the measured X-ray diffraction (XRD) spectrum with 2θ in the range of 0° to 50°, and FIG. 19 shows the measured X-ray diffraction (XRD) spectrum with 2θ in the range of 40° to 50°, respectively showing data that enable the crystallite size in the thickness direction and plane direction to be calculated. As FIG. 18 indicates, a sharp peak exists near 2θ=25°. The peak enables the plane interval (d(002)) of the graphite to be calculated. From FIG. 18 and the Bragg's equation, the plane interval (d(002)) of the carbon nanotubes of the present embodiment can be calculated. Table 2 shows plane intervals (d(002)) of the carbon nanotubes when the vapor-phase carbon deposition temperatures were 600° C., 700° C., and 800° C.

TABLE 2

| VAPOR-PHASE CARBON DEPOSITION TEMPERATURE | PLANE INTERVAL (d(002)) |
|---|---|
| 600° C. | 0.3915 nm |
| 700° C. | 0.3883 nm |
| 800° C. | 0.3596 nm |

The plane intervals of the carbon nanotubes were approximately from 0.34 nm to 0.40 nm. The plane interval (d(002)) of the graphite was about 0.3354 nm. The plane intervals of the carbon nanotubes were thus significantly larger than the place interval of the graphite.

The apparent size of the crystallite can be calculated from the Scherrer's equation. The peak of the X-ray diffraction (XRD) spectrum near 2θ=25° indicates a (002) plane and that near 2θ=45° indicates a (10) plane. These can be used to calculate the crystallite size Lc (FIG. 18) in the thickness direction (direction perpendicular to the tube axis) of the carbon network film and the crystallite size La (FIG. 19) in the plane direction (direction parallel to the tube axis) of the carbon network film. Table 3 shows Lc of the carbon nanotubes when the vapor-phase carbon deposition temperatures were 600° C., 700° C., and 800° C. Table 4 shows La of the carbon nanotubes when the vapor-phase carbon deposition temperatures were 600° C., 700° C., and 800° C.

TABLE 3

| VAPOR-PHASE CARBON DEPOSITION TEMPERATURE | CRYSTALLITE SIZE (Lc) IN THICKNESS DIRECTION |
|---|---|
| 600° C. | 1.26 nm |
| 700° C. | 1.55 nm |
| 800° C. | 1.89 nm |

TABLE 4

| VAPOR-PHASE CARBON DEPOSITION TEMPERATURE | CRYSTALLITE SIZE (La) IN PLANE DIRECTION |
|---|---|
| 600° C. | 3.20 nm |
| 700° C. | 3.99 nm |
| 800° C. | 5.26 nm |

The Lc of the carbon nanotubes of the present embodiment was 1 nm to 2 nm, and La was 3 nm to 6 nm. One can understand that these are significantly smaller than the crystallite size of graphite that ranges from several mm to several cm. It can be seen from the measurement results of these X-ray diffraction (XRD) spectra that the size of the micro areas of the carbon nanotubes of the present embodiment is 3 nm to 6 nm. It can also be seen from FIG. 16 that the carbon nanotubes have a diameter of about 26 nm. Thus, it can be seen that the carbon network film of the carbon nanotubes of the present embodiment is divided into micro areas which are smaller in size than the diameter of the carbon network film. The measurement results of the X-ray diffraction (XRD) spectra also made it clear that the micro areas of the carbon nanotubes of the present invention have a size of about several nm. The size of the carbon nanotubes along the tube axis direction is several tens of μm, and it thus can be seen that the carbon network film is divided into large numbers of areas in the tube axis direction.

The result of Raman spectrometry and the measurement result of the X-ray diffraction (XRD) spectra indicate low crystallinity (polycrystallinity, not monocrystal) of the carbon nanotubes of the present invention. A metal coating (platinum coating) was applied on the both sides of the carbon nanotube sample for structural analysis, and a bias was applied onto these surfaces so as to measure resistance. The result of measurement showed that the carbon nanotubes of the present invention had a resistivity of about 1 kΩ·cm to about 100 kΩ·cm. This is considerably higher than the resistance of conventional carbon nanotubes (carbon nanotubes that are synthesized by arc discharge) of about $5 \times 10^{-4}$ kΩ·cm. Thus, the carbon nanotubes of the present invention can be characterized to have low crystallinity also by electrical evaluation. Note that, in order to further reduce field emission current, carbon nanotubes with a resistivity of 50 kΩ·cm to 70 kΩ·cm was most suitable.

It was confirmed that such a structure of the low crystallinity carbon nanotubes was preferable in reducing the emission start voltage and the driving voltage. In conventional electron source structures, a high resistor layer was provided under the electron source. The electron source of the present invention does not require an additional high resistor layer because of a high resistivity of the carbon nanotubes itself, that is in a range of about 1 kΩ·cm to 100 kΩ·cm.

Fourth Embodiment

The present embodiment explains electrical characteristics, i.e., field emission characteristics of the carbon nanotubes of the present invention.

Figure 20:
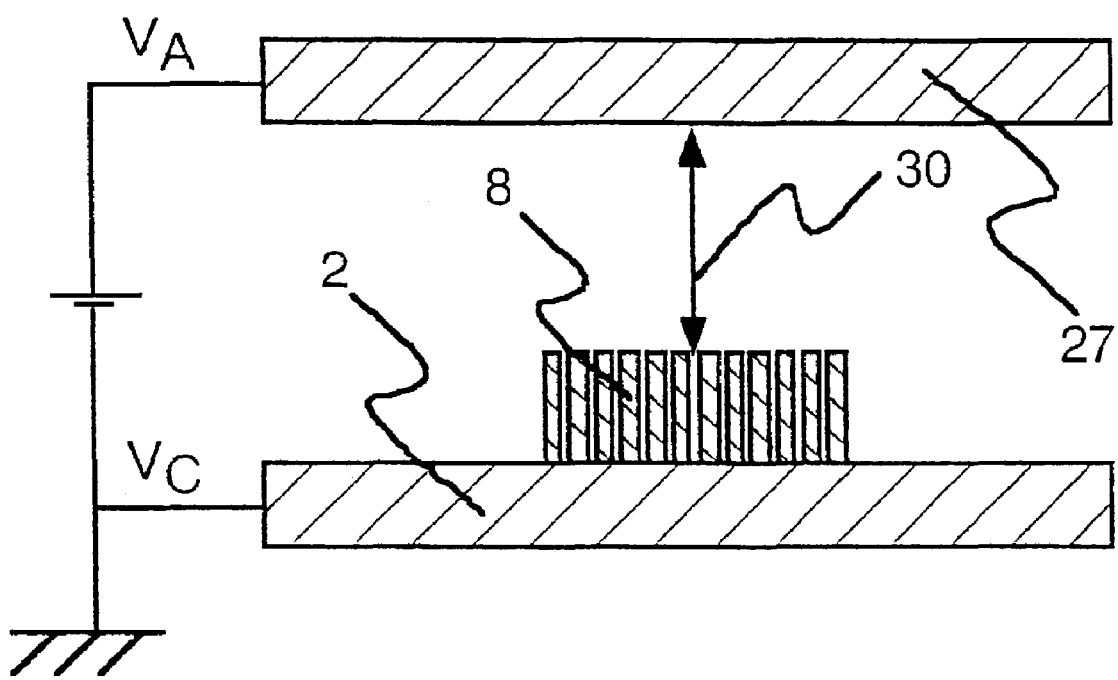
FIG. 20 is a drawing schematically showing a field emission characteristics evaluation device that is used to evaluate field emission characteristics of the carbon nanotube electron source according to the present invention.
Figure 21:
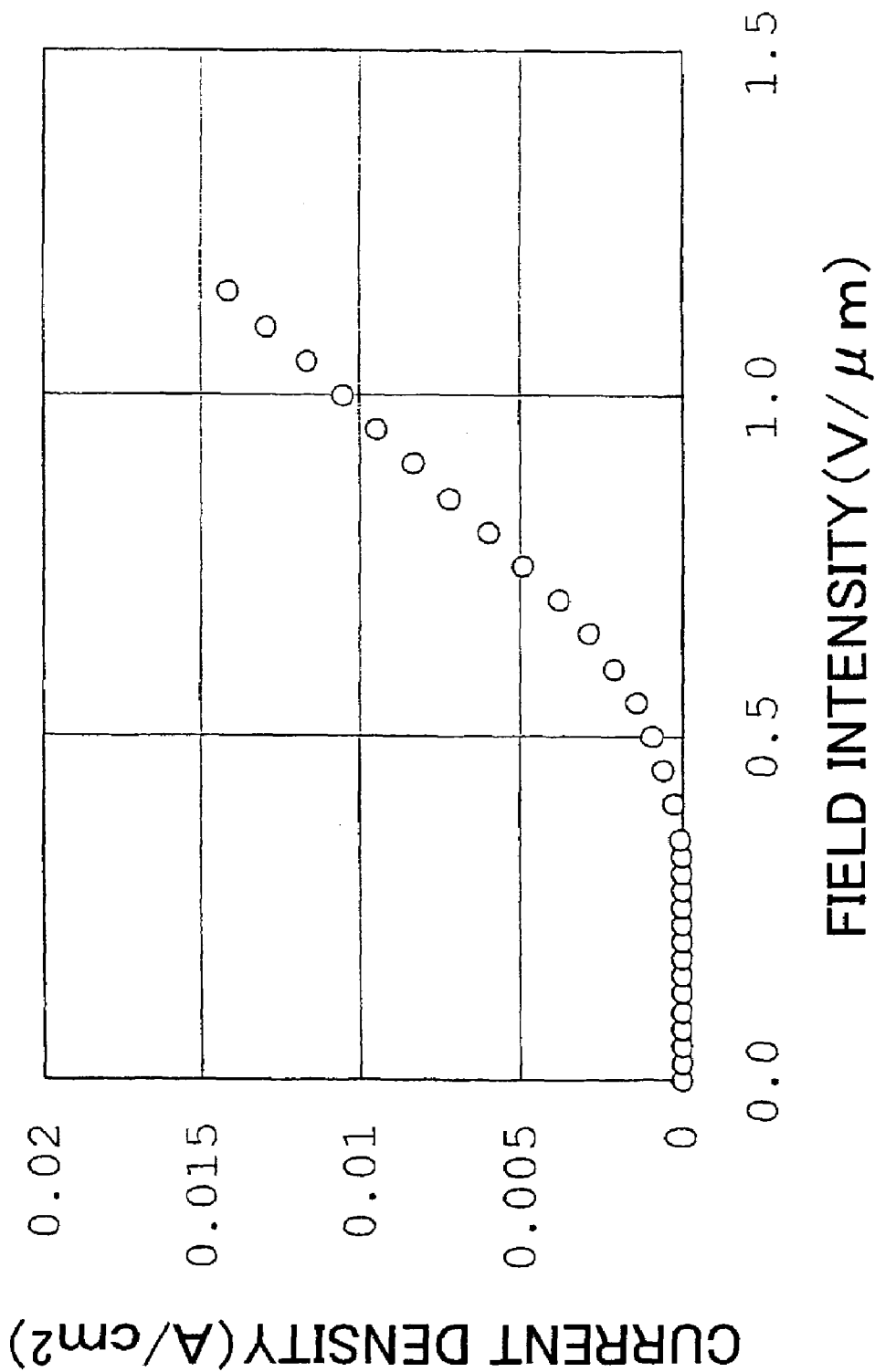
FIG. 21 is a graph showing an example of emission current—applied voltage characteristics of the carbon nanotube electron source according to the present invention.
Figure 22:
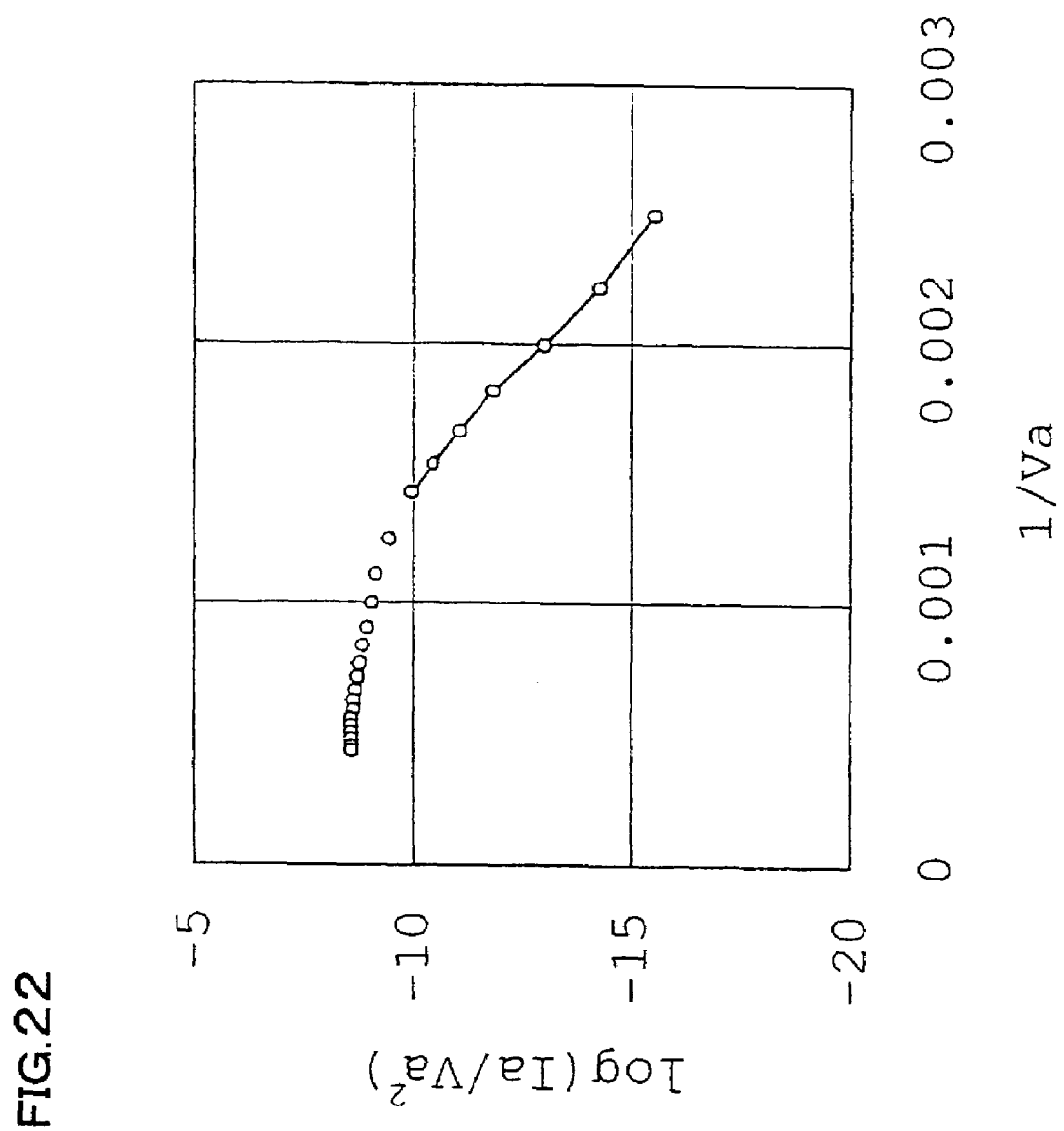
FIG. 22 is a graph showing a Fowler—Nordheim plot of the carbon nanotube electron source according to the present invention.

Carbon nanotubes were prepared as in the Third Embodiment and field emission characteristics of the bipolar tube structure were evaluated. FIG. 20 shows a field emission characteristics evaluation device of a carbon nanotube electron source of the present embodiment; FIG. 21 shows emission current—applied voltage characteristics ("I-V characteristics" hereinafter) of the carbon nanotube electron source of the present embodiment, and FIG. 22 is a Fowler—Nordheim plot of the carbon nanotube electron source of the present embodiment (R. H. Fowler and L. W. Nordheim, Proc. R. Soc. London, Ser. A119, 173 (1928)).

The carbon nanotube electron source of the present embodiment was prepared by detaching the anodic aluminum oxide film that is formed on the aluminum substrate, followed by vapor-phase carbon deposition (2.5% propylene in nitrogen, 800° C., 3 hours), as explained in the Third Embodiment. The anodic aluminum oxide film after vapor-phase carbon deposition was subjected to the oxygen plasma process (500 W, oxygen flow rate of 100 sccm, 10 Pa, 10 minutes) by reactive ion etching, so as to remove the carbon deposition film on the surface of the anodic aluminum oxide film. The anodic aluminum oxide film was removed by wet etching (20% sodium hydroxide aqueous solution, 150° C., 2 hours). The field emission characteristics evaluation device shown in FIG. 20 was used to evaluate field emission characteristics of the carbon nanotube electron source thus obtained. Referring to FIG. 20, the carbon nanotube electron source (carbon nanotube array in which a plurality of carbon nanatubes 8 are bound by the alumina particles) was bonded (anchored) on the cathode electrode wiring 2 (conductive substrate) using a conductive paste such as a silver paste or a carbon paste, so as to provide a cathode electrode that is provided with the carbon nanotubes. Note that, as the substrate for supporting the carbon nanotube electron source, an insulating substrate such as a glass substrate may be provided instead of the conductive substrate. In this case, the conductive paste can also serve as the cathode electrode wiring 2.

An anode electrode 27 is provided opposite the cathode electrode with the carbon nanotubes (cathode electrode wiring 2 and carbon nanatubes 8), and a spacer was inserted between the cathode electrode with the carbon nanotubes and the anode electrode 27, so as to form an electrode gap. In the field emission characteristics evaluation, the electrode gap was the distance between the tips of the carbon nanatubes 8 and the anode electrode 27. In the present embodiment, the electrode gap was 2 mm, and a driving voltage was applied between the anode electrode 27 and the cathode electrode wiring 2, so as to measure field emission current density. FIG. 21 shows I-V characteristics of field emission current of the carbon nanotube electron source of the present embodiment. Field emission of the carbon nanotube electron source of the present embodiment started when the intensity of the driving electric field was 0.25 V/μm, and at the intensity of the driving electric field 1 V/μm, a field emission current density at or greater than 10 mA/cm$^2$ (about 10.5 mA/cm$^2$) was observed.

Table 5 shows field emission start electric field intensity and operating electric field intensity (driving electric field intensity that is required to generate a field emission current of 10 mA/cm$^2$ current density) for the carbon nanotube electron source (Present Embodiment) of the present embodiment, a carbon nanotube electron source (Comparative Example 1) that was made by a conventional arc discharge technique, and a conventional Spindt type metal electron source (Comparative Example 2). Note that, the field emission start electric field intensity was determined from the graph of I-V characteristics. The field emission current that is generated when an electric field with the field emission start electric field intensity was applied is at the level of less than several tens of nA/cm$^2$. The field emission current required for a typical high voltage thin film image forming device can be designed with the field emission current density of about 10 mA/cm$^2$.

TABLE 5

|  | FIELD EMISSION START ELECTRIC FIELD INTENSITY | OPERATING ELECTRIC FIELD INTENSITY (10 mA/cm$^2$) |
|---|---|---|
| PRESENT EMBODIMENT | 0.25 V/μm | 1 V/μm |
| COMPARATIVE EXAMPLE 1 | 10 V/μm | 25 V/μm |
| COMPARTIVE EXAMPLE 2 | 100 V/μm | 140 V/μm |

Note that, the carbon nanotube electron source of Comparative Example 1 was prepared by a method in which the carbon nanotubes made by arc discharge were dispersed in ethanol and then anchored on a tetrafluoroethylene resin (product name "Teflon" provided by Du Pont) plate (W. A. de Heer et al., Science, 270, 1179 (1995)).

Figure 40:
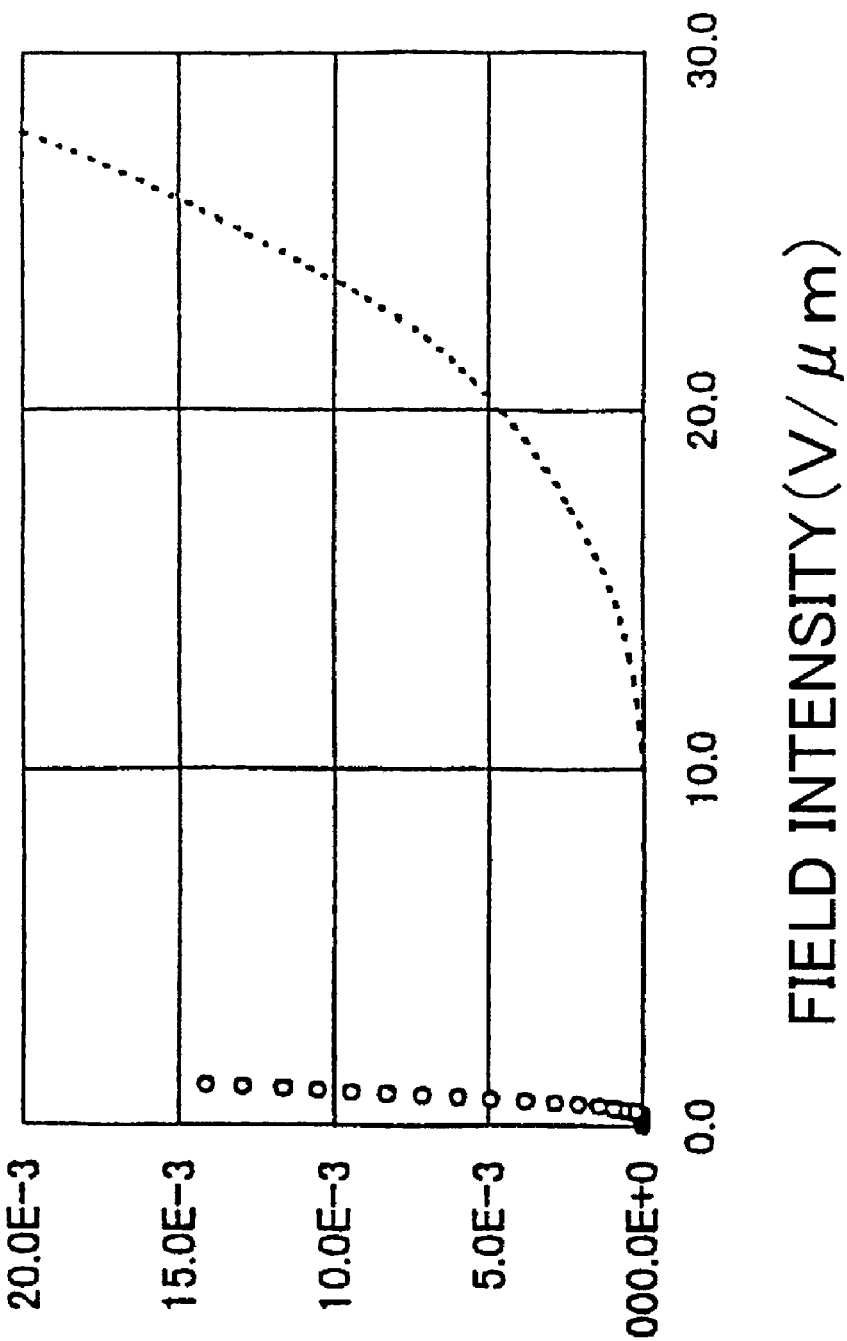
FIG. 40 is a graph comparing emission current—applied voltage characteristics of a carbon nanotube electron source according to one embodiment of the present invention and emission current—applied voltage characteristics of a conventional carbon nanotube electron source.

The field emission characteristics of the carbon nanotubes of Comparative Example 1 were measured as follows. First, a grid electrode was disposed on the carbon nanotube electron source of Comparative Example 1 so that a gap of 20 μm from the carbon nanotubes was provided. A voltage was applied between the grid electrode and the carbon nanotubes and the voltage was gradually increased so as to measure I-V characteristics. FIG. 40 shows the result of measurement. It can be seen from the graph of I-V characteristics of FIG. 40 that field emission starts when the electric field intensity reaches 10 V/μm (when the applied voltage reaches 200 V).

Note that, the carbon nanotube electron source of Comparative Example 1 is described as oriented carbon nanotubes in the document "W. A. de Heer et al., Science, 270, 1179 (1995)". However, the carbon nanotube electron source of Comparative Example 1 is actually a cast film (a film of carbon nanotubes whose tips (tube axes) direct not in a direction exactly perpendicular to the substrate but in other directions). It is therefore assumed that the carbon nanotube electron source of Comparative Example 1 has an inferior carbon nanotube orientation state than that of the carbon nanotube electron source of the present embodiment. The carbon nanotube electron source of the present embodiment differs from the carbon nanotube electron source of Comparative Example 1 in which individual pieces of carbon nanotubes are oriented. In the carbon nanotube electron source of the present embodiment, the carbon nanotubes are bound to one another by the fine particles of the anodic aluminum oxide film and the carbon nanotubes do not exist in separate pieces. Thus, a desirable orientation state (the axis direction of the carbon nanotubes is oriented in a direction perpendicular to the substrate) is maintained. The orientation state of the carbon nanotubes of the present embodiment is therefore far more superior than that of Comparative Example 1.

As is clear from Table 5, the field emission start electric field intensity of the carbon nanotube electron source of the present embodiment is 0.25 V/μm and is notably small, which is about 1/40 of that (10 V/μm) of the conventional carbon nanotube electron source (Comparative Example 1), and about 1/400 of that (100 V/μm) of the conventional metal electron source (Comparative Example 2). The operating electric field intensity (driving electric field intensity that is required to generate a field emission current of 10 mA/cm$^2$ current density) of the carbon nanotube electron source of the present embodiment is 1 V/μm, which is a significant drop to about 1/25 of that (25 V/μm) of the conventional carbon nanotube electron source (Comparative Example 1), and about 1/140 of that (140 V/μm) of the conventional metal electron source (Comparative Example 2). The carbon nanotube electron source of the present invention capable of low-voltage driving allows use of a conventional thin-film transistor (TFT) that is driven in a voltage range of about 20 V to 30 V, which enables the carbon nanotube electron source of the present invention to be installed in displays such as a field emission display. From a different perspective, in the carbon nanotube electron source of the present embodiment, the field emission current density when an electric field of 1 V/μm electric field intensity is applied is 10 mA/cm$^2$, which is higher than that of conventional carbon nanotube electron sources.

Note that, it is envisaged that the field emission start electric field intensity and the operating electric field intensity become weak when the density of the carbon nanotubes is reduced and the electric field is concentrated, as in the carbon nanotube electron source of the Japanese Patent Publication for Unexamined Patent Application No. 57934/2000 (Tokukai 2000-57934). It is therefore required that the field emission start electric field intensity and the operating electric field intensity be compared at the same density. The result of Table 5 is the result of measurement at a relatively high carbon nanotube density.

FIG. 22 is a Fowler—Nordheim plot of the I-V characteristics of FIG. 21. Typically, field emission characteristics are expressed by Fowler—Nordheim relations (R. H. Fowler and L. W. Nordheim, Proc. R. Soc. London, Ser. A119, 173 (1928)), and in a plot where the vertical axis represents 1/Va and the horizontal axis represents log ($Ia/Va^2$) (Ia: emission current, Va: applied voltage), the Fowler—Nordheim plot is linear, ascending to the left. FIG. 22 clearly indicates that the Fowler—Nordheim of the carbon nanotube electron source of the present embodiment has a good linear relationship, and it was confirmed that the I-V characteristics of the carbon nanotube electron source of the present embodiment as shown in FIG. 21 is the field emission characteristics.

Fifth Embodiment

Figure 29:
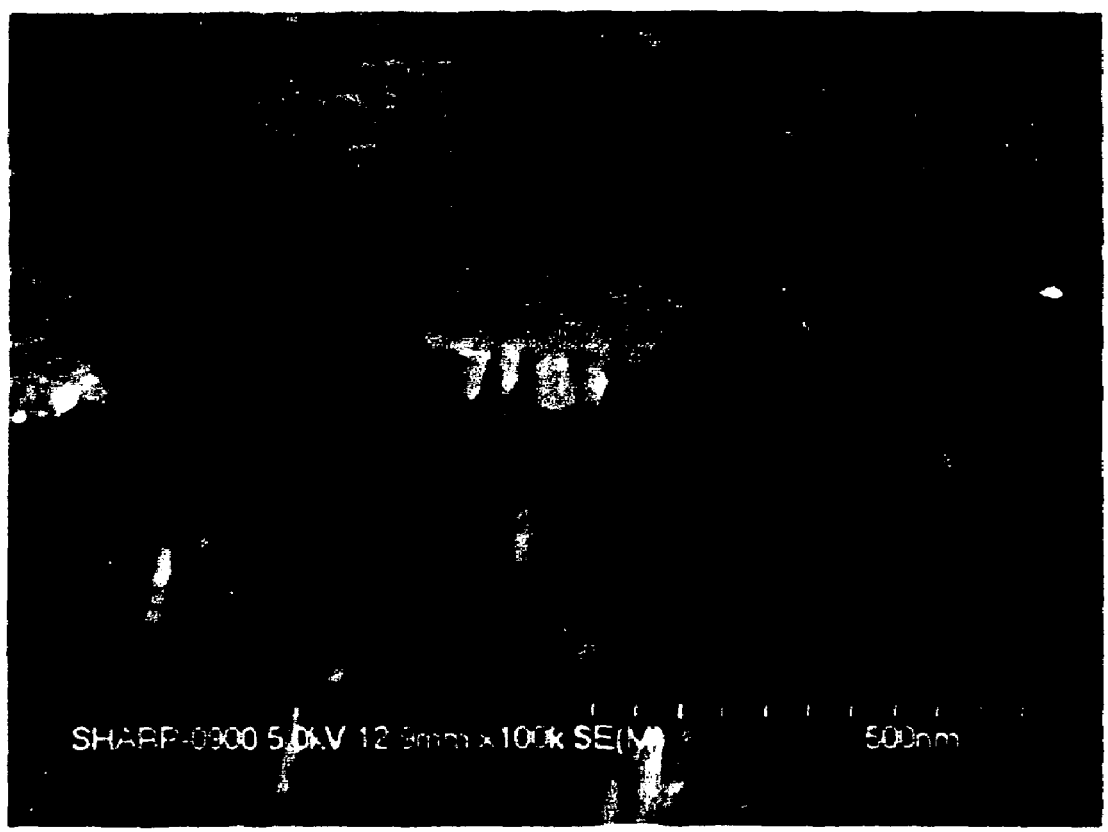
FIG. 29 is an SEM image of the carbon nanotube electron source according to the present invention before a plasma process, as viewed from above on a 45° angle.
Figure 30:
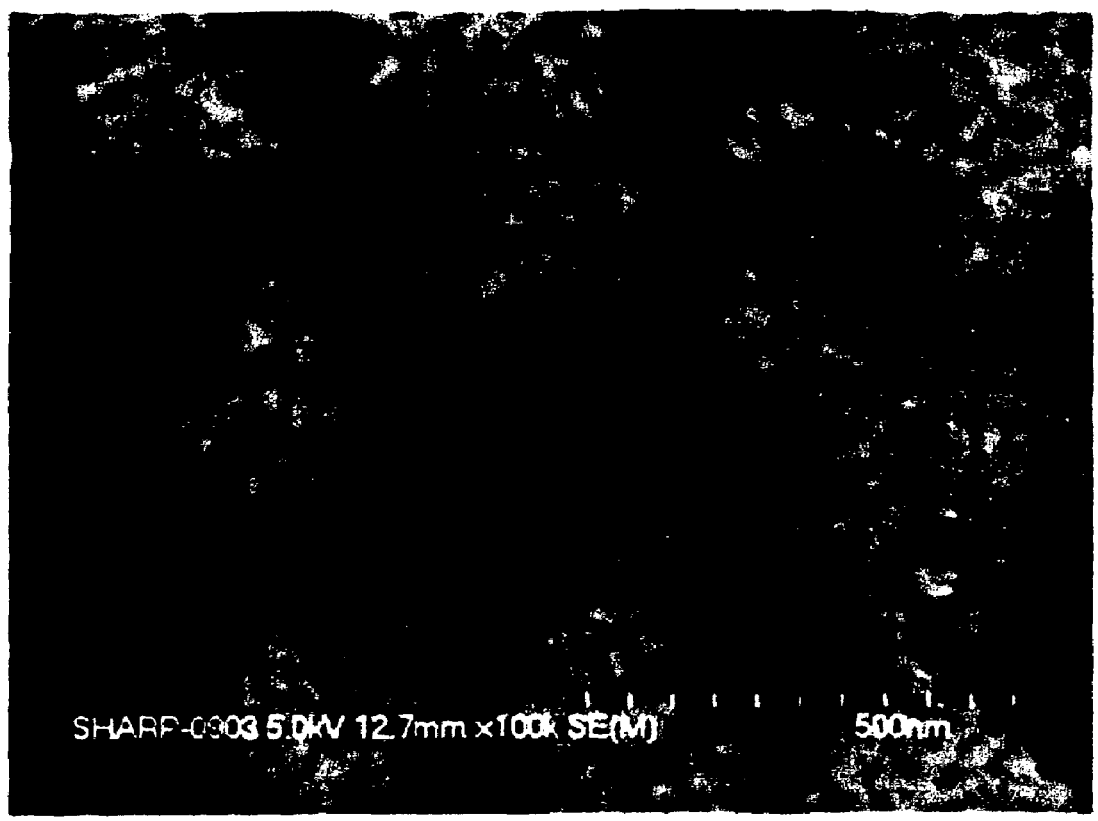
FIG. 30 is an SEM image of the carbon nanotube electron source according to the present invention before a plasma process, as viewed directly from above.
Figure 31:
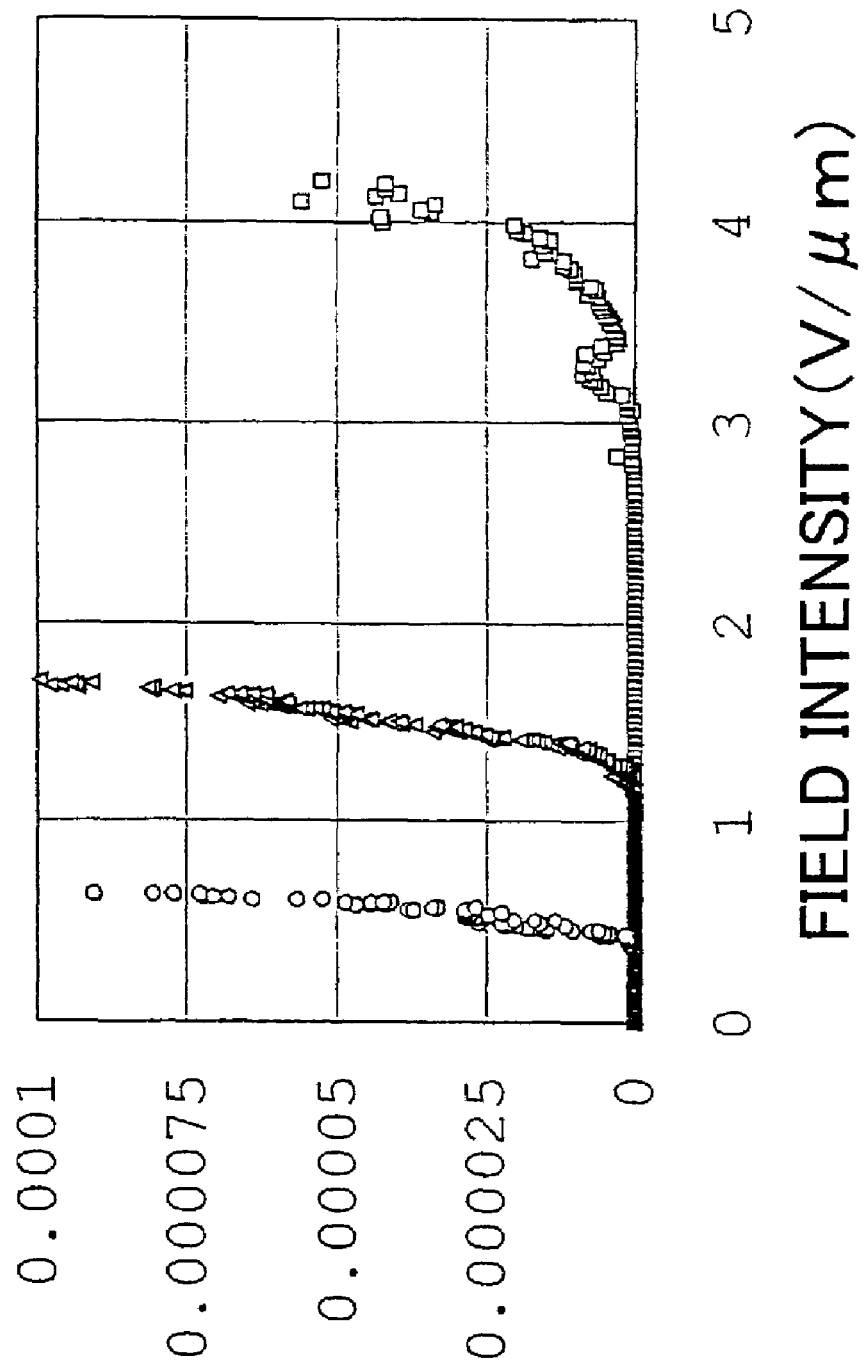
FIG. 31 is a graph explaining how emission current—applied voltage characteristics of the carbon nanotube electron source according to the present invention change depending on the presence or absence of the plasma process and the type of plasma process.

The present embodiment describes a structure of carbon nanotubes (surface modified carbon nanotubes) that are obtained by performing surface modification in a field emission area of the carbon nanotubes of the present invention, and field emission characteristics of such carbon nanotubes, with reference to the SEM images of FIG. 23 through FIG. 30, the field emission characteristics (I-V characteristics) of FIG. 31, and the results of surface analysis (results of measurement on X-ray photoelectron spectrometry (XPS) spectrum) shown in FIG. 32 through FIG. 35. The surface modified carbon nanotubes emit electrons at a lower voltage than the carbon nanotubes before the surface modification.

Figure 23:
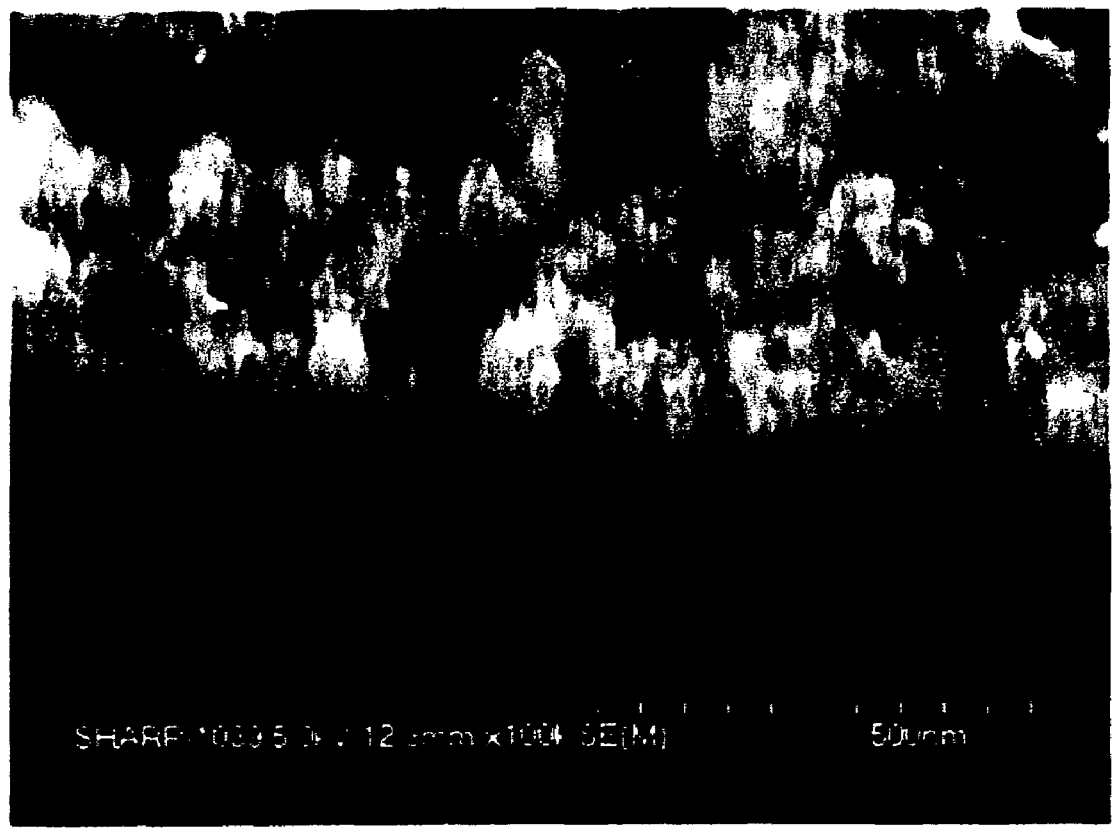
FIG. 23 is an SEM image of the carbon nanotube electron source according to the present invention after an $O_2$ plasma process, as viewed from above on a 45° angle.
Figure 24:
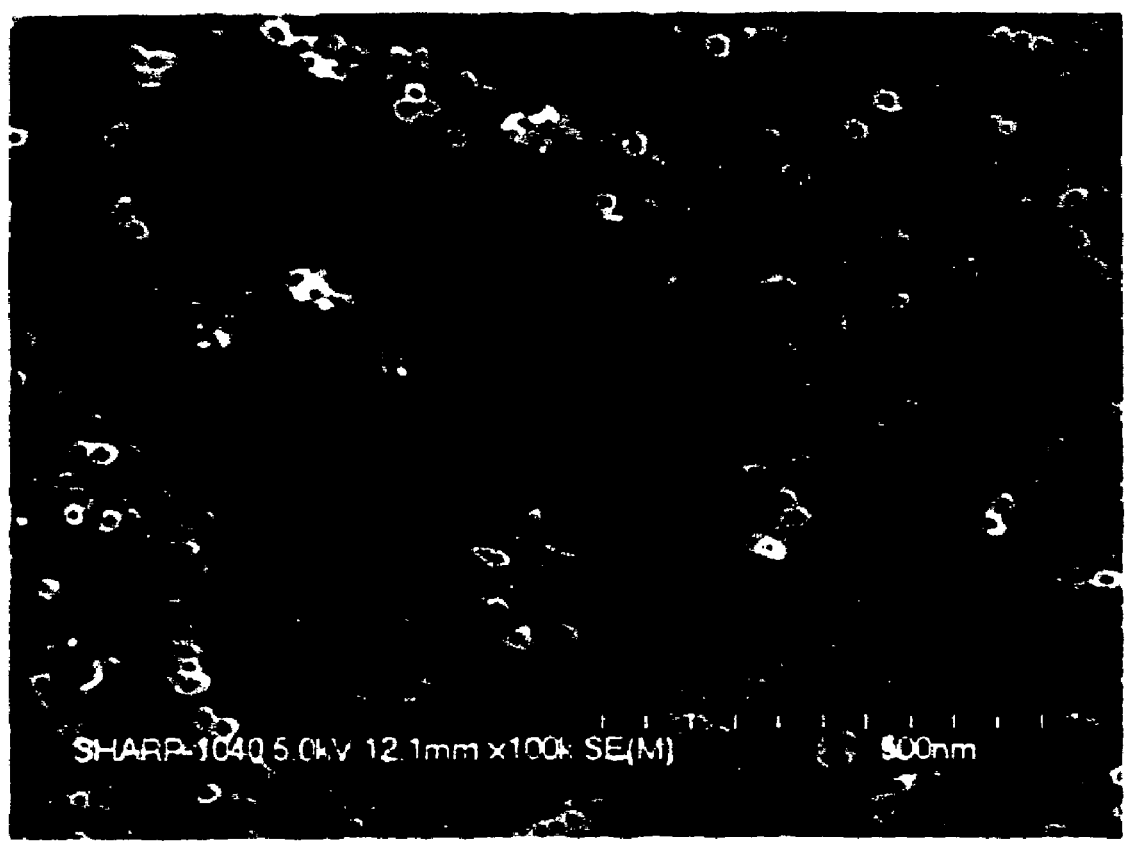
FIG. 24 is an SEM image of the carbon nanotube electron source according to the present invention after an $O_2$ plasma process, as viewed directly from above.
Figure 25:
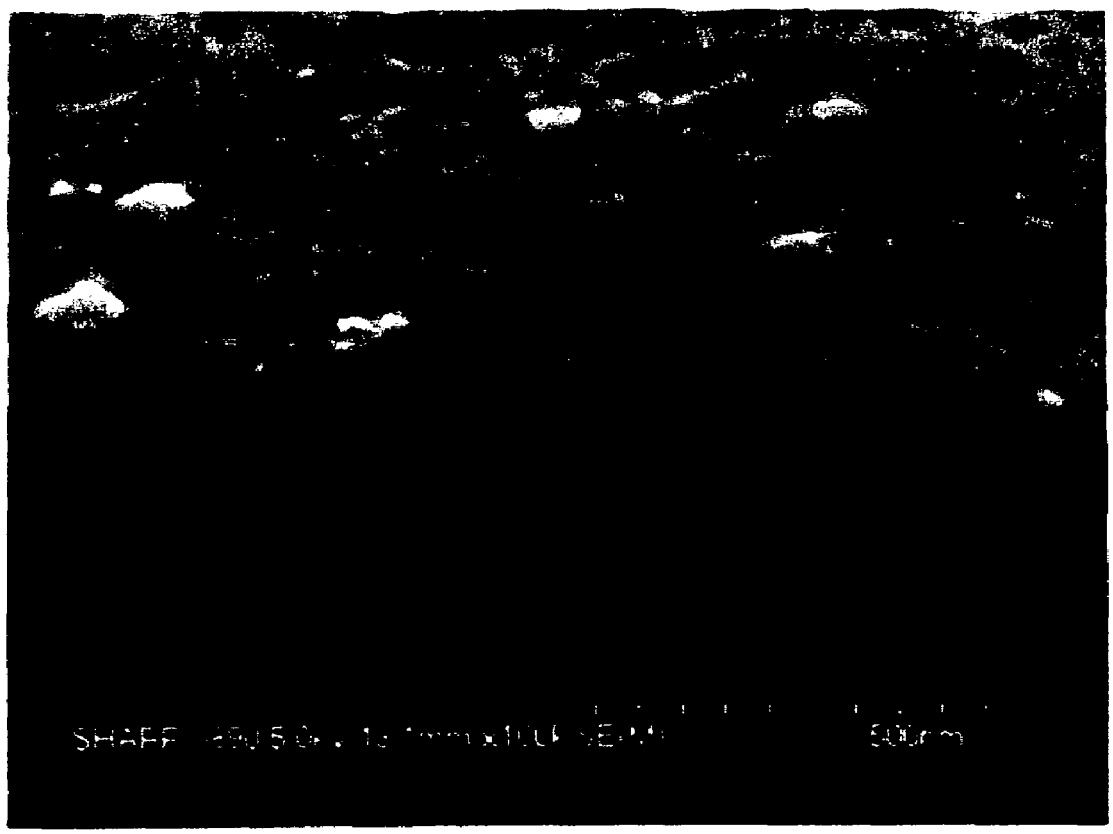
FIG. 25 is an SEM image of the carbon nanotube electron source according to the present invention after a $CHF_3$ plasma process, as viewed from above on a 45° angle.
Figure 26:
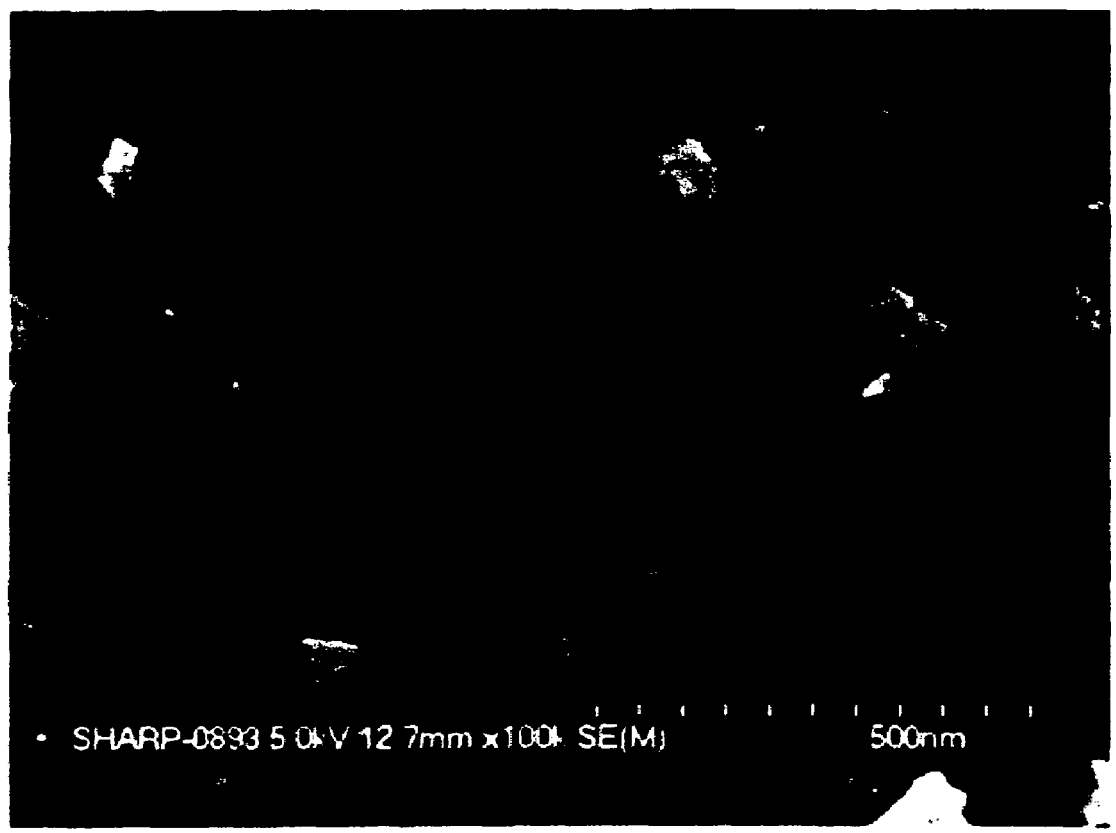
FIG. 26 is an SEM image of the carbon nanotube electron source according to the present invention after a $CHF_3$ plasma process, as viewed directly from above.
Figure 27:
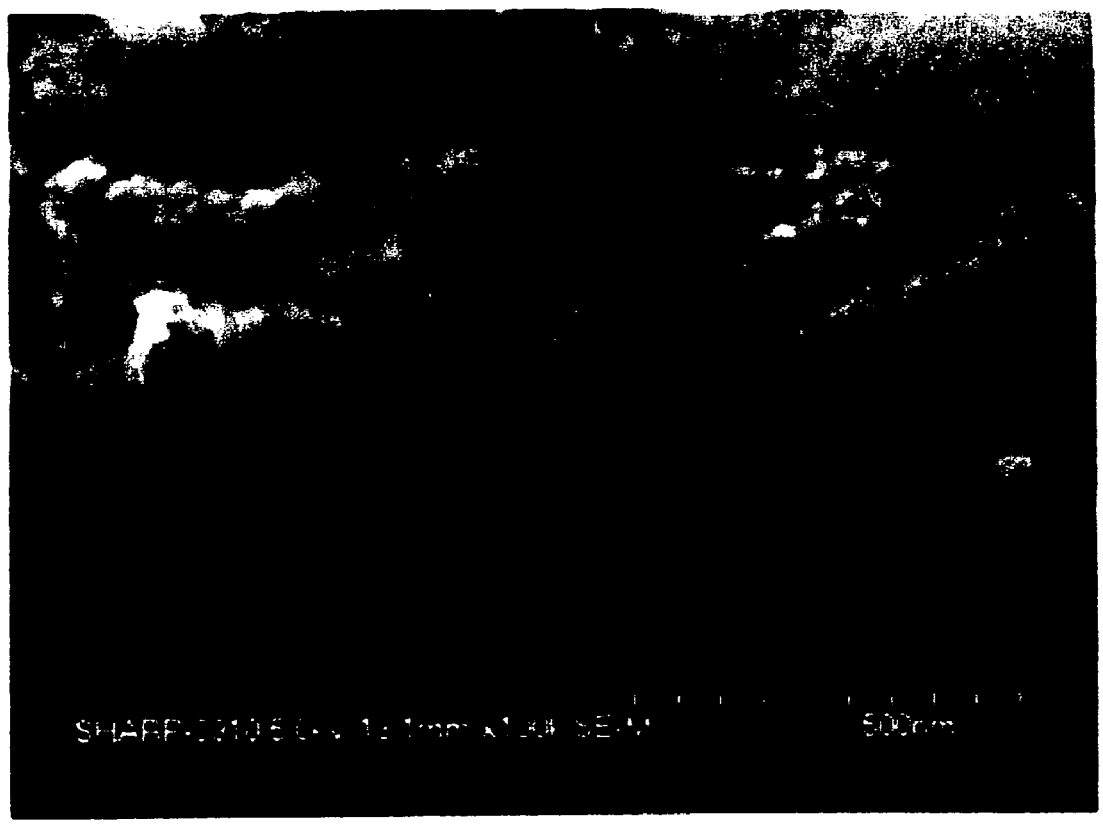
FIG. 27 is an SEM image of the carbon nanotube electron source according to the present invention after an Ar plasma process, as viewed from above on a 45° angle.
Figure 28:
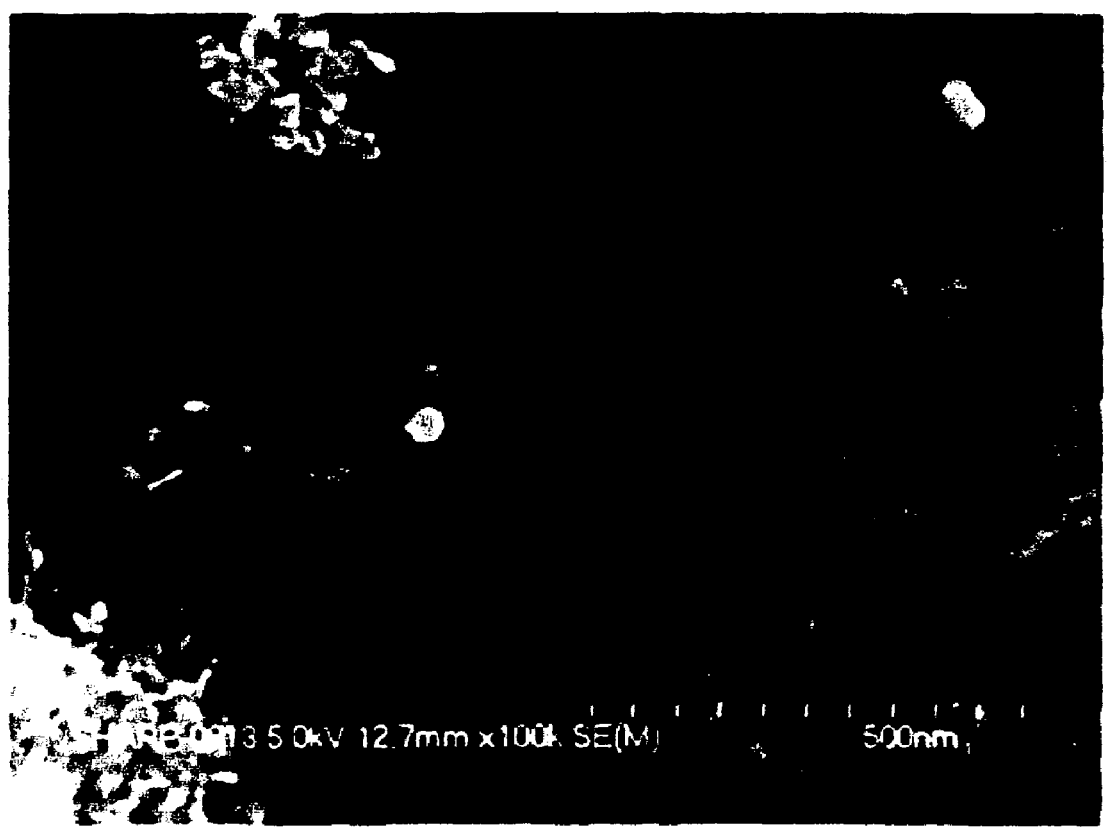
FIG. 28 is an SEM image of the carbon nanotube electron source according to the present invention after an Ar plasma process, as viewed directly from above.

FIG. 23 and FIG. 24 are SEM images of carbon nanotubes after an oxygen ($O_2$) plasma process (etching with oxygen plasma), in which FIG. 23 is the SEM image viewed diagonally from above on a 45° angle; and FIG. 24 is the SEM image viewed top down. FIG. 25 and FIG. 26 are SEM images of carbon nanotubes after a $CHF_3$ plasma process (etching with $CHF_3$ plasma), in which FIG. 25 is the SEM image viewed diagonally from above on a 45° angle; and FIG. 26 is the SEM image viewed top down. FIG. 27 and FIG. 28 are SEM images of carbon nanotubes after an Ar plasma process (etching with Ar plasma), in which FIG. 27 is the SEM image viewed diagonally from above on a 45° angle; and FIG. 28 is the SEM image viewed top down. FIG. 29 and FIG. 30 are SEM images of (untreated) carbon nanotubes without a plasma process, in which FIG. 29 is the SEM image viewed diagonally from above on a 45° angle; and FIG. 30 is the SEM image viewed top down. Note that, as the term is used herein, "diagonally from above on a 45° angle" and "top down" are with respect to the carbon nanotubes that are disposed with their exposed end surface facing up and with respect to the base substrate that is disposed horizontally, as shown in FIG. 7.

Figure 32:
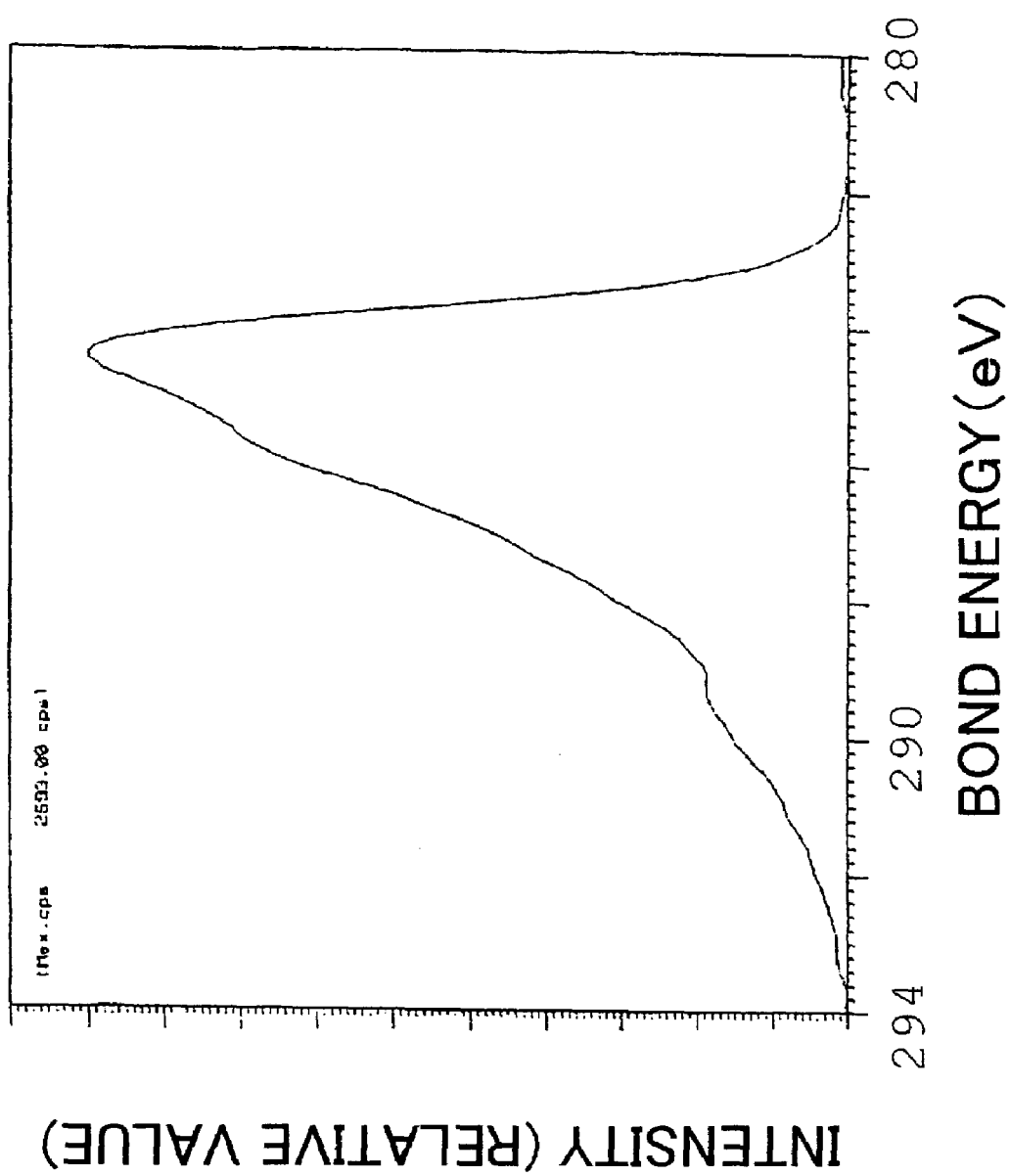
FIG. 32 is a graph showing an XPS spectrum of the carbon nanotube according to the present invention after an $O_2$ plasma process.

FIG. 31 shows field emission current—applied voltage characteristics of the carbon nanotube electron source after the $O_2$ plasma process, of the carbon nanotube electron source after the $CHF_3$ plasma process, of the carbon nanotube electron source after the Ar plasma process, and of the untreated carbon nanotube electron source. FIG. 32 shows the result of measurement on X-ray photoelectron spectrometry (XPS) spectrum of the carbon nanotubes after the $O_2$ plasma process.

In the present embodiment, the anodic aluminum oxide film formed on the aluminum substrate was detached and subjected to vapor-phase carbon deposition (2.5% propylene in nitrogen, 800° C., 3 hours), as in the Third Embodiment. The anodic aluminum oxide film after the vapor-phase carbon deposition was subjected to a plasma process by reactive ion etching (RIE), so as to remove the carbon deposition film on the surface of the anodic aluminum oxide film. The anodic aluminum oxide film was removed by wet etching (20 weight % sodium hydroxide aqueous solution, 150° C., 2 hours). In the present embodiment, various plasma processes ($O_2$ plasma process, $CHF_3$ plasma process, and Ar plasma process) were carried out to confirm the structure and field emission characteristics.

In the present embodiment, the plasma processes employed sputter etching. The sputter etching is a technique in which plasma is generated on a sample position and an electric field is applied to the sample, so as to cause bombardment of ions in the plasma on the sample. Among different types of sputter etching, those with a chemical reaction mechanism in which active ions are reacting species are called reactive ion etching (RIE). Among the foregoing three types of plasma processes, the $O_2$ plasma process and $CHF_3$ plasma process are reactive ion etching, and the Ar plasma process is physical sputter etching.

In the carbon nanotubes after the $O_2$ plasma process, as shown by the SEM images of FIG. 23 and FIG. 24, multi-walls on the end surface of the carbon nanotubes (surface modified area, the cross section at the top of the carbon nanotubes) can be clearly observed, thereby confirming the hollow structure.

In the carbon nanotubes after the $CHF_3$ plasma process, as clearly indicated in FIG. 25 and FIG. 26, the hollow structure of the carbon nanotubes cannot be observed. Rather, the end surface of the carbon nanotubes appears to be closed.

Further, as shown in FIG. 27 and FIG. 28, the wall was also observed on the end surface of the carbon nanotubes after the Ar plasma process, though not as clearly as that of the carbon nanotubes after the $O_2$ plasma process.

For comparison, SEM images of the carbon nanotubes untreated by the plasma process are shown in FIG. 29 and FIG. 30. It can be seen that the carbon deposition film adheres on the surface of the anodic aluminum oxide film. Particularly, as can be seen in FIG. 30 which shows the anodic aluminum oxide film as viewed directly from above, the carbon deposition film adheres to the extent where the pores of the anodic aluminum oxide film are buried.

Note that, the plasma process, as it is used in the producing process, is performed to remove the carbon (surface carbon) that has deposited on the surface of the anodic aluminum oxide film, so as to shape the carbon nanotubes. That is, without the plasma process, the carbon that has deposited on the surface of the anodic aluminum oxide film is not removed and the independent shapes of the carbon nanotubes cannot be obtained. In other words, the carbon nanotubes without the plasma process do not have the independent shapes.

The $O_2$ plasma process and the $CHF_3$ plasma process of the present embodiment are chemical etching in which oxygen radicals in the case of the former and fluorine radicals in the case of the latter react with carbon to proceed etching. On the other hand, the Ar plasma process is physical etching in which $Ar^+$ ions, which are inert ions, are sputtered to proceed etching. It is envisaged that the sharp end surface of the carbon nanotubes processed by $O_2$ plasma is due to oxidation of the carbon that makes up the tips of the carbon nanotubes and removal of the oxidized carbon in the form of a gas as a result of the $O_2$ plasma process. It is believed that the reason the end surface of the carbon nanotubes processed by $CHF_3$ plasma appears to be closed is that the carbon that makes up the tips of the carbon nanotubes reacts with fluorine radicals, and fluorides (fluorocarbon) are deposited on the tips (end surface) of the carbon nanotubes. On the other hand, the end surface of the carbon nanotubes processed by Ar plasma is physically sputtered by Ar ions and thus believed to have some irregularities as shown in FIG. 28. It is envisaged that dangling bonds exist in high density in the end surface.

FIG. 31 shows field emission characteristics (I-V characteristics; plotted by ○) of the carbon nanotubes processed by $O_2$ plasma, field emission characteristics (I-V characteristics; plotted by Δ) of the carbon nanotubes processed by $CHF_3$ plasma, and field emission characteristics (I-V characteristics; plotted by □) of the carbon nanotubes processed by Ar plasma. Note that, at an electric field intensity at or below 5 V/μm, field emission was not observed in the carbon nanotubes not processed by the plasma process. As is clear from FIG. 31, the field emission start electric field intensities of the carbon nanotubes were 0.25 V/μm, 1.25 V/μm, and 3.0 V/μm in the $O_2$ plasma process (○ plot), the $CHF_3$ plasma process (Δ plot), and the Ar plasma process (□ plot), respectively. Thus, it was found that the field emission start electric field intensity of the carbon nanotubes was lowest in the $O_2$ plasma process (○ plot), followed by the $CHF_3$ plasma process (Δ plot) (about 5 times greater than the $O_2$ plasma process) and the Ar plasma process (□ plot) (about 12 times greater than the $O_2$ plasma process). Note that, the field emission start electric field intensity of the carbon nanotubes processed by Ar plasma is about ⅓ of that of conventional carbon nanotubes, which is sufficiently low.

Figure 33:
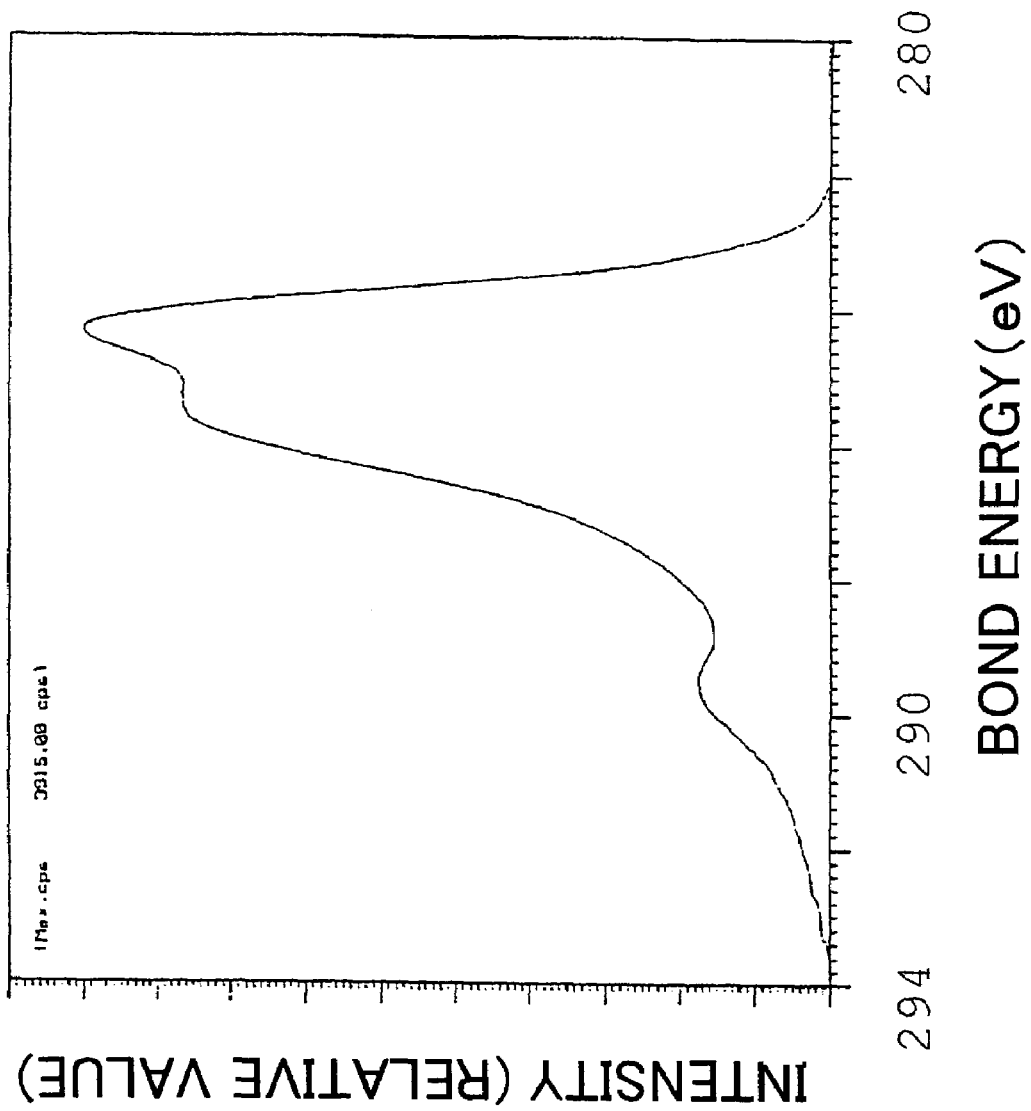
FIG. 33 is a graph showing an XPS spectrum of the carbon nanotube according to the present invention after a $CHF_3$ plasma process.
Figure 34:
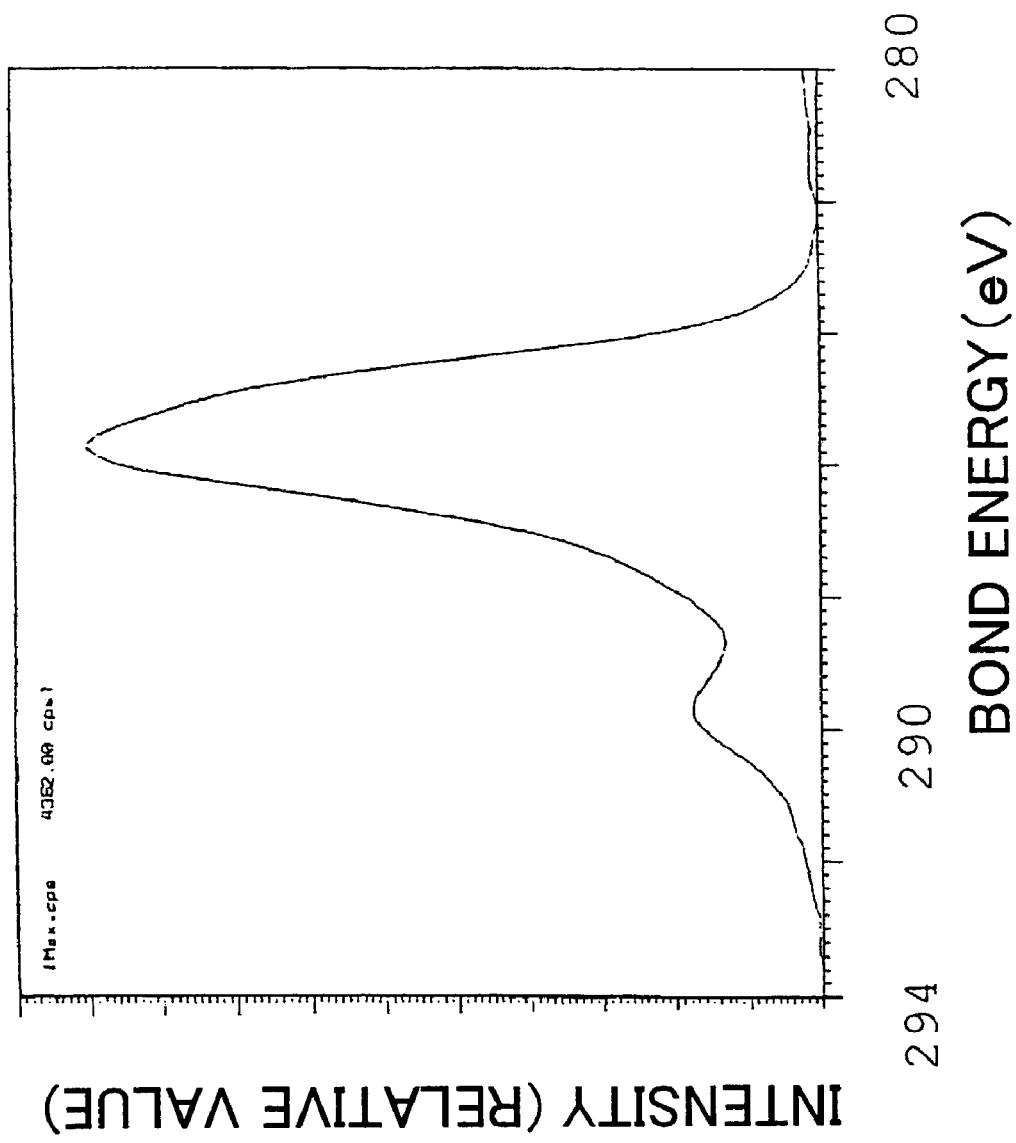
FIG. 34 is a graph showing an XPS spectrum of the carbon nanotube according to the present invention after an Ar plasma process.
Figure 35:
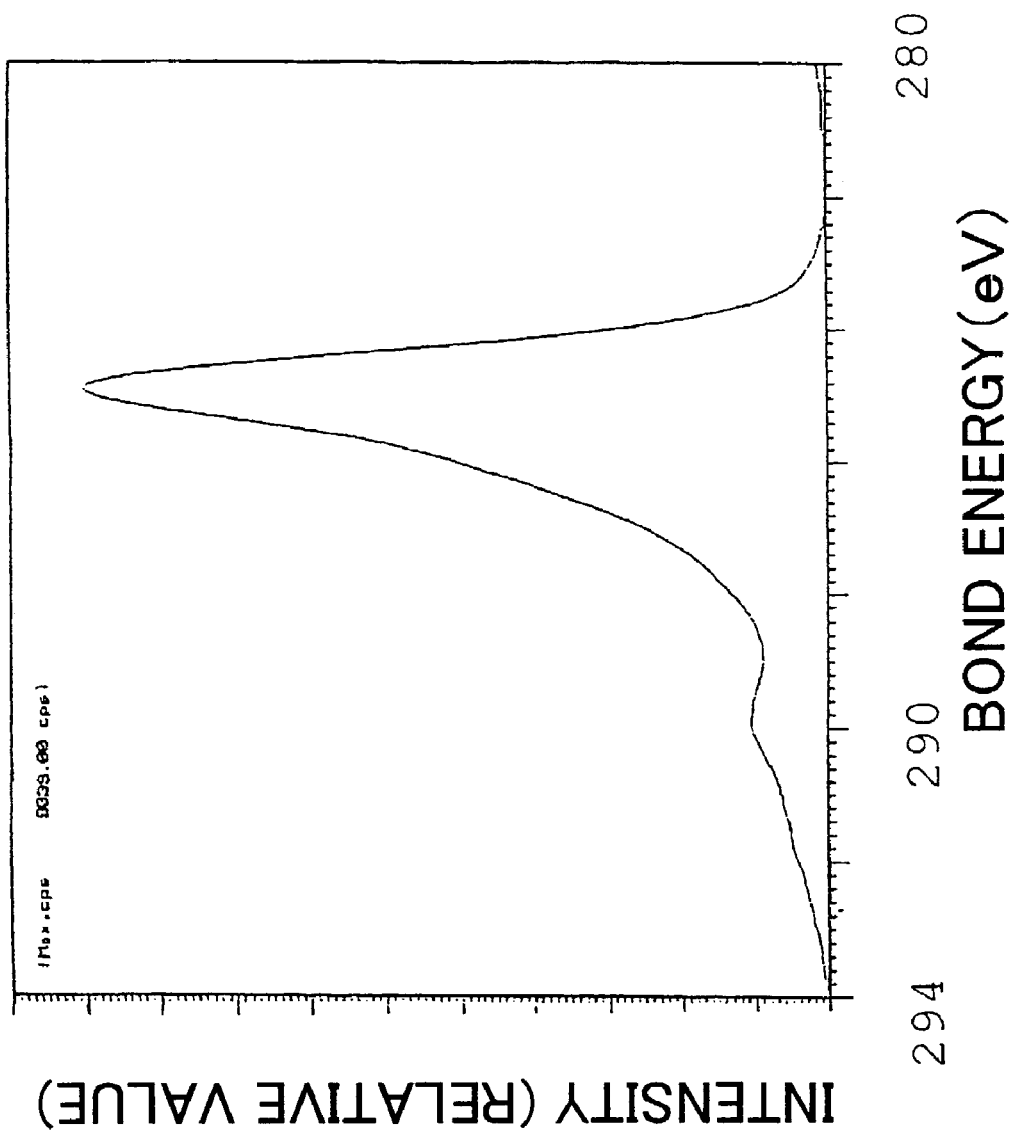
FIG. 35 is a graph showing an XPS spectrum of the carbon nanotube according to the present invention before a plasma process.

FIG. 32 through FIG. 35 are X-ray photoelectron spectrometry (hereinafter "XPS") spectra. Shown in FIG. 32 through FIG. 34 are measurement data of carbon nanotubes that are processed by $O_2$ plasma, $CHF_3$ plasma, and Ar plasma. Shown in FIG. 35 is measurement data of the carbon nanotubes before the plasma process (unprocessed by the plasma process). In the spectrum of the carbon nanotubes not processed by the plasma process as shown in FIG. 35, a sharp peak (C1s) that derives from the graphite structure forming hybrid $sp^2$ orbitals is observed at 284.6 eV. By comparing the plasma processed carbon nanotubes (FIG. 32 through FIG. 34) with the unprocessed carbon nanotubes (FIG. 35), it can be seen that the peaks of the plasma processed carbon nanotubes are broader than the peak of the unprocessed carbon nanotubes. Further, the XPS spectra of the carbon nanotubes processed by $O_2$ plasma (FIG. 32), $CHF_3$ plasma (FIG. 33), and Ar plasma (FIG. 34) have shoulder peaks in the vicinity of 290 eV. Further, the XPS spectra of the carbon nanotubes processed by $O_2$ plasma (FIG. 32) and $CHF_3$ plasma (FIG. 33) have large peaks in the vicinity of 286 eV. The peak in the vicinity of 286 eV can be attributed to the C—O bonds, and the peak in the vicinity of 290 eV can be attributed to the O=C—O bonds. The XPS spectrum of the carbon nanotubes processed by $O_2$ plasma has a broad peak shape (peak area) in a domain of 286 eV to 290 eV, and therefore it is envisaged that the covalent bonds that connects oxygen and carbon in high concentration have in some way influenced the low voltage field emission of the carbon nanotube electron source of the present invention. However, the composition ratio (O/C) of oxygen with respect to carbon in the field emission area of the carbon nanotubes of the present embodiment, that was found from the XPS spectra of FIG. 32 through FIG. 34, was around 0.1 to 0.3. Further, the peak in the vicinity of C1s (286.6 eV) was broader in order of no plasma process (half bandwidth of the 284.6 eV peak: 2.2 eV), the Ar plasma process (half bandwidth of the 284.6 eV peak: 3.0 eV), the $CHF_3$ plasma process (half bandwidth of the 284.6 eV peak: 3.0 eV), and the $O_2$ plasma process (half bandwidth of the 284.6 eV peak: 4.2 eV). It is envisaged from these X-ray diffraction (XRD) spectra that the oxygen connected to carbon has some influence on field emission. Also, the bonding state of carbon and oxygen may be related to field emission in some way.

Note that, the foregoing plasma processes may be plasma etching in which plasma of an active gas such as $O_2$ or $CHF_3$ is generated on a sample position so as to cause radials in the plasma to react with the sample, or reactive ion beam etching in which an ion beam of active ions generated from an active gas such as $O_2$ or $CHF_3$ is projected on a surface of the sample. Further, the plasma processes may be physical ion beam etching in which an ion beam of inert ions generated from an inert gas such as Ar is projected on a surface of the sample.

Sixth Embodiment

Figure 36:
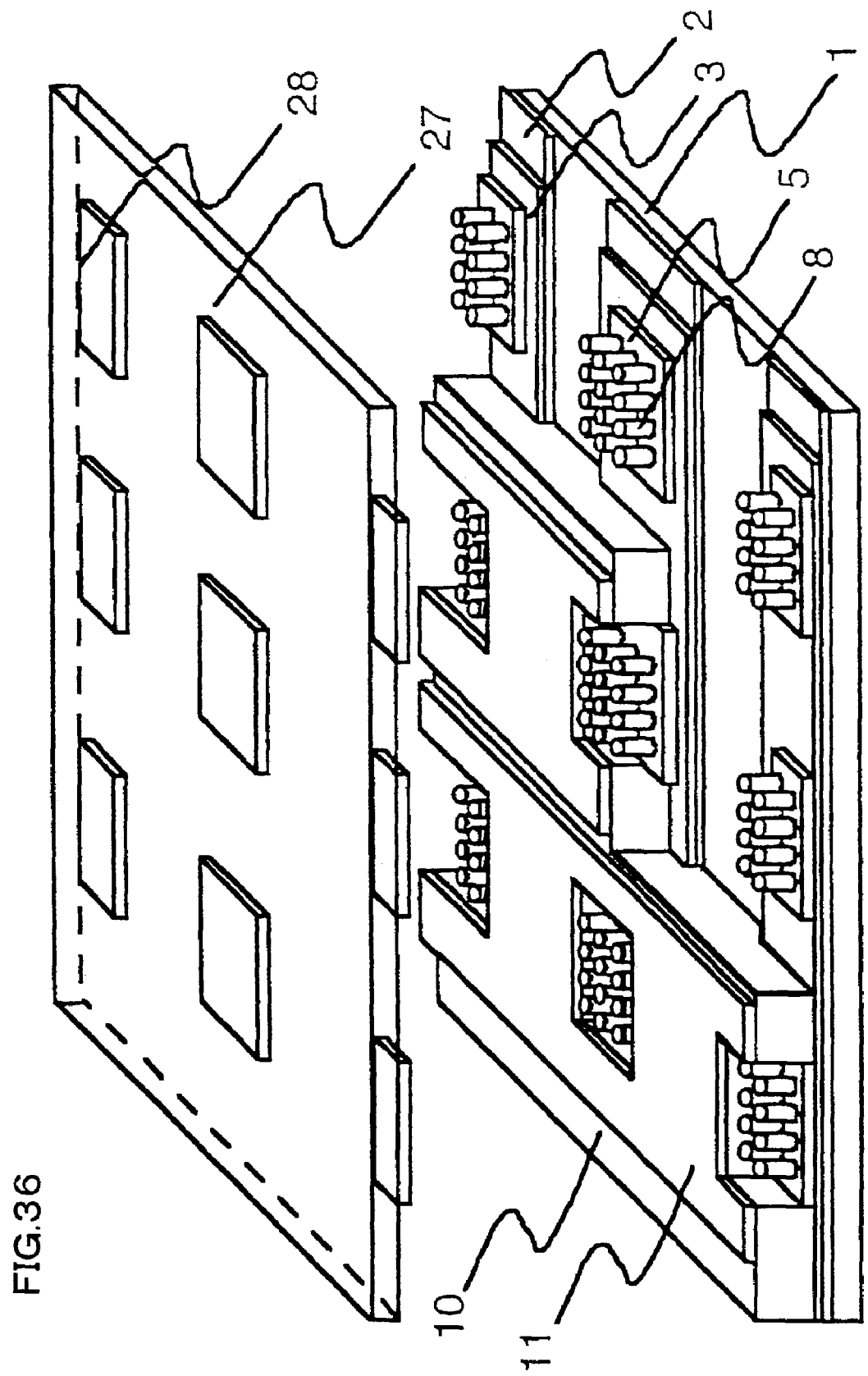
FIG. 36 is a perspective view showing one embodiment of a display provided with the carbon nanotube electron source according to the present invention.
Figure 37:
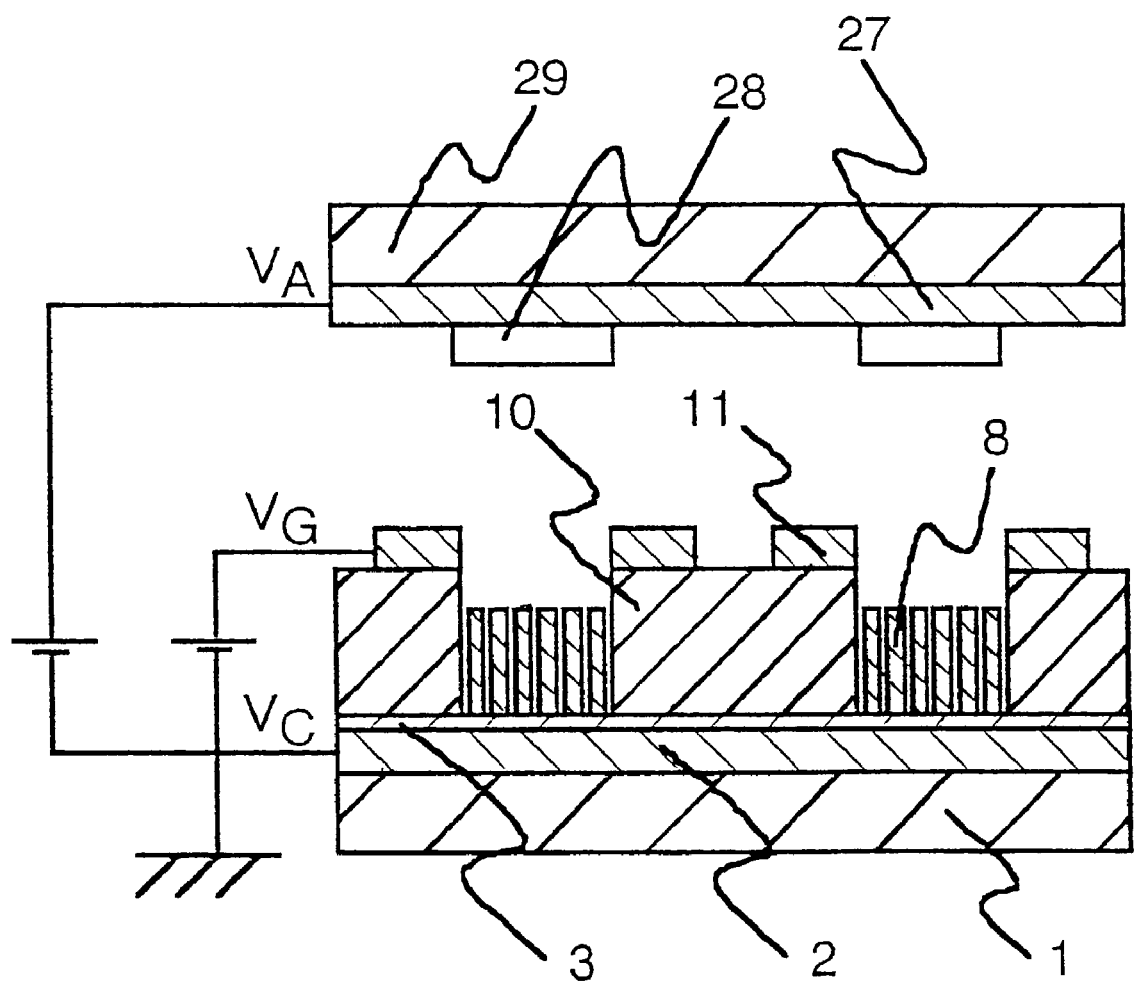
FIG. 37 is a cross sectional view showing one embodiment of a display provided with the carbon nanotube electron source according to the present invention.
Figure 38:
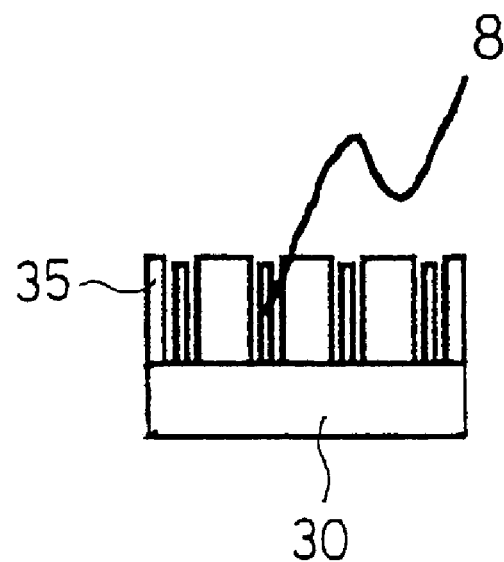
FIG. 38 is a cross sectional view schematically showing an arrangement of conventional carbon nanotubes that have grown from a metal catalyst as an origin of growth.
Figure 39:
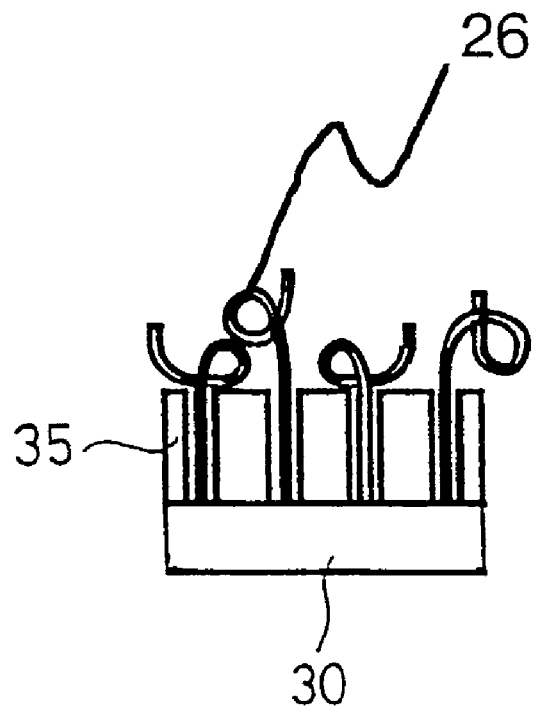
FIG. 39 is a cross sectional view schematically showing a random shape of conventional carbon nanotubes that have grown from a metal catalyst as an origin of growth.

Referring to FIG. 36 and FIG. 37, the following explains a field emission display (FED) in which the carbon nanotube electron source of the present invention is installed in a field emission part (pixel).

A plurality of cathode electrode wires 2 that are parallel to one another are formed on a base substrate 1 made of an insulating material such as a glass substrate or a ceramic substrate. On the cathode electrode wires 2 are formed an anodic oxidation stopping layer (high resistor layer) 3. The anodic oxidation stopping layer (high resistor layer) serves to limit the field emission current, and is made of silicon, silicon carbide, silicon oxide, silicon nitride, or a mixture of these compounds. On the anodic oxidation stopping layer (high resistor layer) 3 and the cathode electrode wires 2 are formed the field emission part, i.e., pixels, and the carbon nanatubes 8 are formed on the pixels. The carbon nanatubes 8 are anchored by the anodic aluminum oxide film 5. The anodic aluminum oxide film 5 is shown flat in FIG. 36, but an alternate arrangement, in which the carbon nanatubes 8 are anchored by particles, is also possible. The FED tested in the present embodiment is designed to have a 100 μm×100 μm pixel and to have about $10^6$ carbon nanatubes 8. Around the pixels are formed the gate insulating layer 10, and the gate electrode wires 11 are formed on the gate insulating layer 10 so as to be orthogonal to the cathode electrode wires 2. The pixels are XY addressed by the cathode electrode wires 2 and the gate electrode wires 11. In the present embodiment, a single gate opening of 100 μm×100 μm is provided to make up one pixel. However, a single pixel may be divided into a plurality of parts. For example, one hundred of 1 μm×1 μm gate openings may be provided to make up a pixel. By thus dividing the pixel into micro areas, redundancy of field emission can be obtained.

Further, in the carbon nanotube electron source of the present invention, the carbon nanatubes 8 are provided such that each carbon nanotube 8 is provided for each of large numbers of pores of the template (porous film). The template with large numbers of pores must satisfy the condition that the pore density is readily controlled. In the present invention, it is preferable that the template with large numbers of pores is the porous anodic aluminum oxide film. By controlling the pore density of the porous anodic aluminum oxide film to design the density of the carbon nanotubes, the electric field of the carbon nanotubes can be more concentrated and the efficiency of field emission can be improved (lower voltage is required for the field emission). The anodic aluminum oxide film 5 is described in more detail below. The anodic alumina oxide film 5 has an important role in designing the shape of the carbon nanatubes 8. That is, the length, diameter, and density of the carbon nanotubes 8 are dependent on the thickness of the anodic aluminum oxide film 5 and the diameter and density of the pores 6 of the anodic aluminum oxide film 5, respectively. As the anodic aluminum oxide film 5, an aluminum, film 4 that is formed by a sputtering method or a vapor deposition method is used, and the thickness of the anodic aluminum oxide film 5 is controlled. It was verified by experiment that the thickness of the anodic aluminum oxide film was about 1.5 times that of the aluminum film 4. However, when 10 μm or thicker thickness is required for the anodic aluminum oxide film 5, it is preferable that the anodic aluminum oxide film 5 be made by pasting aluminum foils. The diameter and density of the pores of the anodic aluminum oxide film can be easily be controlled by a chemical solution of the anodic oxidation or by applied voltage, etc. By forming the anodic aluminum oxide film 5 according to the device design and by using the corresponding carbon nanotubes as the electron source, carbon nanotubes 8 with superior field emission characteristics can be structured.

Further, the carbon nanotubes of the present invention can contain a conductive material inside the tubes. By containing a conductive material inside the tubes, the resistance of the electron source can be reduced and a carbon nanotube electron source capable of emitting large current electrons can be realized. An organic metal material such as iron can be readily introduced into the tubes in a vapor phase. In the present embodiment, iron was contained in the carbon nanotubes using ferrocene, so as to reduce resistance of the carbon nanotube electron source. As a result, large current field emission of around several A/cm$^2$ was observed.

A back plate having the described cathode structure and a face plate having a fluorescent material 28 on the anode electrodes 27 are disposed opposite to each other with a gap of 1 mm to 2 mm therebetween. A voltage of around 5 kV to 7 kV was applied to the anode electrodes 27 to cause the carbon nanotube electron source of the tripolar tube structure to emit electrons toward the fluorescent material 28. As a result, emission of light from the fluorescent material 28 was observed and the luminance of the light was 10,000 cd/m$^2$. Therefore, it was confirmed that the thin display having installed therein the carbon nanotube electron source of the present embodiment had superior device characteristics that consumes low power and produces high luminance.

Note that, the carbon nanotube electron source disclosed in Japanese Publication for Unexamined Patent Application No. 10-12124 has lead electrodes (grid) at the openings of the pores of the anodic aluminum oxide film, and therefore has a problem that manufacturing yield is low and the driving pulse signal waveform is susceptible to degradation by the thin electrodes that cannot be made thicker.

In contrast, in the carbon nanotube electron source of the present embodiment, the gate electrode wires 11 are formed not over the openings of the pores of the anodic aluminum oxide film 5 but in the vicinity of the openings of the pores of the anodic aluminum oxide film 5, without covering the openings. This enables production yield to be improved and the thickness of the electrodes to be increased, thereby preventing degradation of the driving pulse signal waveform.

The following explains a driving method of the electron source that can emit electrons at a low voltage. The driving method is not just limited to the carbon nanotube electron source of the present embodiment but is also applicable to, for example, a diamond electron source that has negative electron affinity.

FIG. 37 is a cross sectional view of the FED (display) of the present embodiment. The back plate (cathode side) includes the base (glass) substrate 1, the cathode electrode wiers 2, the anodic oxidation stopping layer 3 (high resistor layer), the carbon nanatubes 8, the gate insulating layer 10, and the gate electrode wires 11. The gate electrode wires 11 extend into the plane of the paper in the drawing, and the cathode electrode wires 2 extend from the right toward the left of the drawing. The face plate (anode side) is made up of the base substrate 29, the anode electrode 27, which is a transparent electrode made of indium tin oxide or the like, and the fluorescent material 28. The panel size was diagonally 5 inches, the number of pixels was 320×240, and a getter was disposed with a degree of vacuum at 10$^{-8}$ Torr.

In the FED (display) of the present embodiment, the cathode electrode wiers 2, the gate electrode wires 11, the anode electrode 27, and a power supply which applies a voltage to these elements make up electric field applying means that applies an electric field to the carbon nanatubes 8.

In the display using the carbon nanotube electron source of the present embodiment, the driving electric field intensity $E_A$ between the anode electrode 27 and the carbon nanatubes 8 is greater than the driving electric field intensity $E_G$ between the gate electrode wires 11 and the carbon nanatubes 8. That is, $$E_A=(V_A-V_C)/G_A>E_G=(V_G-V_C)/G_G$$

where $V_A$ is the anode voltage, $V_G$ is the gate voltage, $V_C$ is the cathode voltage, $G_A$ is the gap between the anode electrode 27 and the carbon nanatubes 8, and $G_G$ is the gap between the gate electrode wires 11 and the carbon nanatubes 8.

In the present embodiment, when the anode voltage $V_A$ is 5 kV, the cathode voltage $V_C$ is grounded, and the gap $G_A$ between the anode electrode 27 and the carbon nanotubes 8 is 1 mm, $E_A=5\times10^4$ V/cm.

The carbon nanatubes 8 of the present embodiment was driven by the driving method of the present embodiment. The fluorescent material 28 on the face plate emitted light when the gate voltage $V_G=0$ V, and the light from the fluorescent material 28 diminished when the gate voltage $V_G$ was increased (e.g., when the gap $G_G$ between the gate electrode wires 11 and the carbon nanatubes 8 was 6 μm, and the gate voltage $V_G$ was 30 V). This is because the decrease (OFF) of the electric field intensity $E_G$ between the gate electrode wires 11 and the carbon nanatubes 8 reduces the field emission current. Driving of the display was enabled in this manner.

It was also confirmed by simulation that with the driving method of the present embodiment, the emitted electron beam was able to converge, making it possible to prevent crosstalk without providing a converging electrode.

For example, a conventional carbon nanotube electron source with an emission start electric field intensity of several V/cm, when it is designed with essentially the same structure as that of the present embodiment, would require a higher anode voltage V of several tens of kV or a smaller gap of several hundreds of µm, which is not practical. Further, the gate voltage $V_G$ needs to be increased to several hundreds of volt and a high resistant driver will be required.

The foregoing problem of the conventional carbon nanotube electron source can be solved effectively with the use of the low voltage driving carbon nanotube electron source of the present embodiment as described above. The use of the carbon nanotube electron source of the present embodiment not only enables the device to be designed with a resistant margin of applied voltage but also allows use of a low voltage driver such as a TFT driver, thus reducing cost of the device.

Seventh Embodiment

A carbon nanotube of the present embodiment partially has amorphous areas in its structure, and is produced by a method as described in the First Embodiment.

An SEM observed image has shown that the carbon nanotube of the present embodiment has a diameter of 30 nm and a length of 75 µm. The SEM observed image has also shown that the carbon nanotube of the present embodiment had superior orientation and notably high density. Further, the carbon nanotube of the present embodiment, because it is formed by using pores with open ends as a template, contained only carbon atoms without a metal catalyst or the like.

Characteristics of conventional carbon nanotubes are explained below. Conventional carbon nanotubes are formed by an arc discharge method or a CVD method using a metal catalyst such as cobalt, iron, or nickel. Conventional carbon nanotubes formed by arc discharge had a closed end and non-uniform diameter and length. Further, conventional carbon nanotubes formed by a CVD method, because they had a closed growth end and used a metal catalyst such as cobalt, iron, or nickel, contained a catalyst metal as constituting atoms. Detailed description of a growth model of such a carbon fiber using catalyst metal has been given by Endo et al. (Morinobu, ENDO, *Solid State Physics*, 12, 1(1977)).

The biggest difference in the shape of the carbon nanotubes of the present embodiment and that of the conventional carbon nanotubes is the presence or absence of micro crystal defects (amorphous areas) in the carbon nanotubes. The inventors of the present invention have proven by experiment that this difference has the largest influence on field emission characteristics such as the field emission start voltage and driving voltage.

The carbon nanotube of the present embodiment partially has micro crystal defects (amorphous areas), which appear as "joints" under TEM. In the carbon nanotube of the present embodiment, a graphite layer observed under TEM extends in the lengthwise direction of the tube and is divided into micro areas and is discontinuous (intermittent). This characteristic structure of the carbon nanotubes of the present embodiment is obtained by the carbonization reaction that takes place on the inner wall of the template (porous alumina) without using a metal catalyst for the growth of the carbon nanotubes. The carbon nanotubes of the present embodiment are the result of carbonization on the inner wall of the pores of the template, and the carbon nanotubes grow as they impart a huge stress on the inner wall of the pores. It is believed that the discontinuous graphite structure is the result of the influence of such a stress on graphite layer formation.

On the other hand, the conventional carbon nanotubes that are formed by arc discharge, as shown by the TEM observed image in the publication Y. Saito, Ultramicroscopy, 73, 1(1998)), do not have the "joints" associated with the amorphous areas observed in the present embodiment. Rather, the graphite layer is continuously formed in the lengthwise direction of the tubes.

Note that, it is believed that the carbon nanotubes with the amorphous areas (crystal defects) can also be produced by causing crystal defects to generate on carbon nanotubes that were formed by a conventional method using arc discharge or a method using a metal catalyst, by bombardment of ions of an inert gas such as argon or helium. However, the carbon nanotubes obtained in this manner may not have the graphite areas (micro crystal areas) of equal interval along the lengthwise direction of the tubes as the carbon nanotubes of the present embodiment.

Eighth Embodiment

A carbon nanotube of the present embodiment partially has amorphous areas in its structure, and is produced by a method as described in the First Embodiment.

FIG. 40 compares a carbon nanotube electron source of the present embodiment and the conventional carbon nanotube electron source of arc discharge with respect to their field emission characteristics (I-V curve). It can be seen that the carbon nanotube electron source (○ plot in the drawing) has a significantly lower field emission start voltage than the conventional carbon nanotube electron source (broken line in the drawing). It can also be seen that the carbon nanotube electron source of the present embodiment has a steep rise of field emission current and the field emission current is obtained at a low driving voltage.

Note that, in the described embodiments, the vapor-phase carbon deposition method (pyrolysis of hydrogen carbide) was used to deposit carbon in the pores. However, the method of depositing carbon in the pores is not particularly limited and it is also possible to employ an arc discharge method in which arc discharge is induced between two carbon electrodes to generate carbon vapor, or a laser vaporization method in which a carbon rod is irradiated with a laser to generate carbon vapor. Regardless of the arc discharge method or laser vaporization method, the temperature in the growing space of the carbon nanotubes (not in the vicinity of the carbon rod but in the vicinity of the surface where the carbon deposition film is formed) is preferably 600° C. to 900° C.

Further, the foregoing embodiments used the multi-walled carbon nanotubes. However, the present invention can also be realized by single-walled carbon nanotubes.

The invention being thus described in the specific embodiments or examples in the best mode for carrying out the invention section, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICATIONS OF THE PRESENT INVENTION

As described, a carbon nanotube of the present invention has an arrangement in which a carbon network film has a polycrystal structure which is divided into a plurality of crystal areas in a tube axis direction. In this way, a carbon nanotube that can emit large current electrons at a low voltage can be provided.

As described, an electron source of the present invention includes the carbon nanotube of the foregoing arrangement as a field emission part. In this way, an electron source that can emit large current electrons at a low voltage can be provided.

A display of the present invention includes an electron source which has a plurality of carbon nanotubes of the foregoing arrangement as a field emission part, and electric field applying means for applying an electric field to each carbon nanotube so as to cause each carbon nanotube to emit electrons. In this way, a display capable of carrying out low power display can be provided.

As described, a producing method of a carbon nanotube of the present invention is a method in which carbon is deposited in the absence of a metal catalyst in the pores. In this way, a carbon nanotube that can emit large current electrons at a low voltage can be provided.

As described, a producing method of an electron source of the present invention is a method in which a porous material with large numbers of pores is used an a support member, and carbon is deposited inside the pores of the porous material in the absence of a metal catalyst, so as to form a carbon deposition film of a cylindrical shape. In this way, an electron source that can emit large current electrons at a low voltage can be provided. Further, unlike a producing method that uses a metal catalyst, there is no shape non-uniformity, which is dependent on the growth of the carbon nanotube, and therefore uniformity of field emission in the field emission area and the device plane can be improved.

As described, a producing method of a carbon nanotube of the present invention is a method in which, a carbon deposition film, after it is formed, is plasma etched so as to modify the field emission area. By thus modifying the field emission area, a carbon nanotube that can emit large current electrons at a low voltage can be provided.

As described, a producing method of an electron source of the present invention is a method in which a porous material with large numbers of pores is used as a support member and carbon is deposited inside the pores of the porous material so as to form a carbon deposition film of a cylindrical shape, and thereafter the carbon deposition film is plasma etched to modify the tip of the carbon deposition film. In this way, the field emission area of the carbon nanotube can be modified, and thereby provide an electron source that can emit large current electrons at a low voltage.

As described, the electron source and display of the present invention have an arrangement that further includes particles, dispersed between carbon nanotubes, that bind side surfaces of the carbon nanotubes adjacent to one another. In this way, the electric field concentrates on the carbon nanotubes more easily. As a result, it is possible to provide an electron source that can emit large current electrons at a low voltage and a display capable of carrying out low power display.

As described, the electron source and display of the present invention have an arrangement in which the support member is a porous layer, formed on a substrate, having large numbers of through-pores, and the carbon nanotube is formed in a cylindrical shape inside the pores so that one end of the carbon nanotube is closed on the side of the substrate and an end face of the carbon nanotube on the side of the substrate adheres to a surface of the substrate. As a result, an electron source and a display with the carbon nanotubes firmly adhering to the support member can be realized with highly reliable electrical connections between the carbon nanotubes and the support member.

As described, the electron source and display of the present invention have an arrangement in which the carbon nanotube is at least partially connected to the inner wall of the pores. In this way, the bond strength between the carbon nanotube and the support member can be increased and the electron source and display can be realized with high reliability.

As described, the electron source and display of the present invention have an arrangement in which the emission start electric field intensity is in a range of from 0.25 V/µm to 0.5 V/µm. In this way, it is possible to provide an electron source that can emit large current electrons at a low voltage and a display capable of low power display.

As described, the electron source and display of the present invention have an arrangement in which an emission current density in response to an applied electric field intensity of 1 V/µm is in a range of 10 mA/cm$^2$ to 100 mA/cm$^2$. In this way, it is possible to provide an electron source that can emit large current electrons at a low voltage and a display capable of low power display.

As described, a producing method of an electron source of the present invention includes the steps of forming on a base substrate an anodic oxidation stopping layer for stopping anodic oxidation of the base substrate, prior to the anodic oxidation step of the base layer. In this way, an electron source with superior uniformity of emission characteristics in the device plane or field emission area (pixels) can be provided.

As described, the electron source of the present invention has an arrangement in which the carbon nanotube partially has an amorphous area in its structure. Further, the electron source of the present invention has an arrangement in which the carbon nanotube is discontinuous graphite that is divided into micro areas in the tube axis direction. With these arrangements, the emission start voltage and operating voltage (device driving voltage) can be reduced.

As described, a producing method of an electron source of the present invention includes the steps of: forming a cathode electrode wiring on a substrate; forming a high resistor layer on the cathode electrode wiring; forming an inorganic material thin film in a field emission area on the high resistor layer; forming pores through the inorganic material thin film; disposing the carbon nanotube inside the pores; and modifying a surface of the carbon nanotube. By modifying the surface of the field emission area according to this method, a low voltage driving electron source can be provided.

As described, the electron source of the present invention can emit large current electrons at a low voltage. This enables a TFT driver that is used in conventional devices such as a liquid crystal device to be used, thereby providing an ultralow power consuming and ultrahigh luminance display.

What is claimed is:
1. A display comprising:
an electron source which includes a plurality of carbon nanotubes as a field emission part; and
electric field applying means for applying an electric field to each carbon nanotube so as to cause each carbon nanotube to emit electrons,
wherein:
each carbon nanotube is at least one layer of a cylindrical carbon network film, and the carbon network film has a polycrystal structure which is divided into a plurality of crystal areas in a tube axis direction, and wherein an end face of the cabon network film is modified such that field emission efficiency is increased.

2. The display as set forth in claim 1, wherein a size of each crystallite in a film thickness direction of the carbon network film falls within a range from 1 nm to 2 nm.

3. The display as set forth in claim 1, wherein oxygen is introduced in the modified end face of the carbon network film, so that a composition ratio of oxygen to carbon (O/C) falls within a range from 0.15 to 0.2.

4. The display as set forth in claim 1, wherein the carbon nanotube has a resistivity of 1 kΩ·cm to 100 kΩ·cm.

5. The display as set forth in claim 1, further comprising particles, dispersed between the carbon nanotubes, binding side surfaces of the carbon nanotubes adjacent to one another.

6. The display as set forth in claim 5, wherein the particles are γ-alumina.

7. The display as set forth in claim 1, further including a support member for supporting the carbon nanotubes comprising a porous layer, formed on a substrate, having large numbers of through-pores, wherein each carbon nanotube is formed in a cylindrical shape inside one of the pores so that one end of each carbon nanotube is closed on the side of the substrate and an end face of the carbon nanotube on the side of the substrate adheres to a surface of the substrate.

8. The display as set forth in claim 1, wherein an emission start electric field intensity of the electron source is in a range of from 0.25 V/μm to 0.5 V/μm.

9. The display as set forth in claim 1, wherein emission current density of the electron source when an electric field with an electric field intensity of 1 V/μm is applied is in a range of from 10 mA/cm$^2$ to 100 mA/cm$^2$.

10. The display as set forth in claim 1, wherein a length of each crystallite in the tube axis direction is in a range of from 3 nm to 6 nm.

* * * * *